(12) United States Patent
Wright

(10) Patent No.: US 12,502,631 B2
(45) Date of Patent: Dec. 23, 2025

(54) FILTER ELEMENT ASSEMBLY

(71) Applicant: Parker Hannifin Manufacturing (UK) Ltd., Hertfordshire (GB)

(72) Inventor: Kenneth Wright, Tyne and Wear (GB)

(73) Assignee: Parker Hannifin Manufacturing (Uk) Limited, Hertfordshire (GB)

( * ) Notice: Subject to any disclaimer, the term of this patent is extended or adjusted under 35 U.S.C. 154(b) by 531 days.

(21) Appl. No.: 17/898,918

(22) Filed: Aug. 30, 2022

(65) Prior Publication Data

US 2022/0410053 A1 Dec. 29, 2022

Related U.S. Application Data

(63) Continuation of application No. PCT/EP2021/055438, filed on Mar. 4, 2021.

(51) Int. Cl.
*B01D 46/00* (2022.01)
*B01D 46/24* (2006.01)
*B01D 46/42* (2006.01)

(52) U.S. Cl.
CPC ..... *B01D 46/0031* (2013.01); *B01D 46/0004* (2013.01); *B01D 46/2414* (2013.01); *B01D 46/42* (2013.01); *B01D 2275/10* (2013.01)

(58) Field of Classification Search
CPC ............ B01D 46/0031; B01D 46/0004; B01D 46/2414; B01D 46/42; B01D 2275/10; B01D 2265/025; B01D 46/60
USPC .......................................................... 95/273
See application file for complete search history.

(56) References Cited

U.S. PATENT DOCUMENTS 4,818,257 A 4/1989 Kennedy
2007/0028571 A1* 2/2007 Barratt ............... B01D 46/2411
55/423

FOREIGN PATENT DOCUMENTS

| DE | 3125001 A1 | 1/1983 | |
|---|---|---|---|
| GB | 2261830 A * | 6/1993 | ......... B01D 46/0031 |
| KR | 10-2011-0929095 | 8/2011 | |
| WO | 2014059184 A1 | 4/2014 | |
| WO | 2021175978 A2 | 9/2021 | |

OTHER PUBLICATIONS

Communication pursuant to Article 94(3) EPC for EP 23 154 457.8 dated Jan. 17, 2024.
(Continued)

*Primary Examiner* — Jennifer Dieterle
*Assistant Examiner* — Qianping He

(57) ABSTRACT

A filter element assembly (10) is disclosed comprising: a filter element (11) for location in a housing (12) of a filter (14), comprising a wall (15) of a filtration medium which defines a hollow space (16), for a gas stream to flow from the space through the wall, the filtration medium including a filtration layer (18), and a drainage layer (20) located outside the filtration layer, first (22) and second (24) end caps at opposite ends of the wall, one including a port (26) for a gas stream which communicates with the space; and a drainage promoter (56) comprising a fin (58) which can be fitted to the filter element so that it extends at least part way along the element, and compresses the drainage layer along at least part of its length, to promote drainage of liquid which has collected in the drainage layer.

68 Claims, 22 Drawing Sheets

(56) References Cited

OTHER PUBLICATIONS

Communication pursuant to Article 94(3) EPC for European Application 21 708 672.7 dated Dec. 19, 2023.
International Preliminary Report on Patentability for PCT/EP2021/055441 dated Sep. 6, 2022.

* cited by examiner

FILTER ELEMENT ASSEMBLY

This invention relates to a filter element assembly for removing material that is entrained in a gas stream. The invention also relates to a drainage promoter, and a drainage promoter fin for a filter element, as well as to a filter element itself.

Filtration of gas in a compressed gas system is generally required so that the gas is sufficiently clean for a subsequent application or to minimise adverse effects of impurities on components of the system. For example, removal of compressor oil can be required to minimise chemical contamination and accumulation on valves which might lead to malfunction of the valves.

There are many known filter elements for use in a filter assembly in gas systems. Such filter elements generally comprise a cylindrical filtration layer or "coalescing layer" and a cylindrical anti-re-entrainment barrier or "drainage layer" surrounding the filtration layer on the outside of the filter element. Such filter elements further comprise a bottom end cap having a trough in which the coalescing and drainage layers are retained. Such filter elements are generally positioned to be vertical when in use. A filter element of this general kind is disclosed in GB-A-2261830. A gas stream enters the tubular filter element through an inlet port and flows through the cylindrical walls of the filter element, generally radially outward from the inside of the filter element to the outside. When the assembly is used to collect liquid droplets in the gas stream (for example which is carried in the stream as an aerosol), the filtration/coalescing layer will cause liquid droplets to coalesce for collection. The coalesced liquid will be carried by the flow of gas to the drainage layer where the liquid can collect. The drainage layer is configured to ensure that re-entry of the liquid into the gas stream is minimised. The liquid will sink to the bottom of the drainage layer from which it can drain into a reservoir where it can collect prior to disposal.

If the liquid does not drain from the drainage layer into the reservoir at least as quickly as liquid is supplied to the drainage layer, the liquid can tend to collect at the base of the drainage layer, where it forms a 'wet band' in which the material of the drainage layer is saturated with the liquid.

After prolonged use of the filter element, the depth of the wet band can increase to the extent that gas flowing through the element wall will pass through the wet band. This can increase the resistance to flow of gas through the filter element, and therefore give rise to an increase in pressure drop across the filter element. This can result in increased operating costs. Furthermore, gas flowing through or near a saturated part of the drainage layer can draw droplets of liquid from the drainage layer into the gas flow, thereby re-contaminating the gas as it is discharged from the filter element. It can therefore be seen that significant accumulation of liquid in a wet band can reduce the operating efficiency of the filter element. When the operating efficiency is significantly reduced, the filter element in the filter assembly must be replaced, giving rise to expense and possibly also a requirement for the system in which the assembly is used to be shut down.

International Patent Publication no. WO-A-2006/013328 discloses a filter assembly in which the drainage layer in a filter element is compressed between an end cap on a filter element and the wall of a housing in which the element is located when in use, by means of at least one longitudinally extending fin. Liquid which collects in the drainage layer is encouraged to drain from it for collection as a result of the localised compression by the or each fin. Liquid can tend to drain from the drainage layer along the or each fin.

There is provided a filter element assembly comprising:
a. a filter element for location in a housing of a filter, comprising a wall of a filtration medium which defines a hollow space, for a gas stream to flow from the space through the wall to be filtered, the filtration medium including a filtration layer, and a drainage layer located outside the filtration layer in which liquid separated from the gas stream can collect, and first and second end caps at opposite ends of the wall, the first end cap including a port for a gas stream which communicates with the space within the wall, and
b. a drainage promoter comprising at least one fin which can be fitted to the element so that it extends at least part way along the element, and which then compresses the drainage layer along its length to promote drainage of liquid which has collected in the drainage layer,
c. in which the filter element and the drainage promoter may be capable of being connected to one another so that the filter element and the drainage promoter can be manipulated by a user as a unitary component for positioning in a housing of a filter.

The drainage promoter can be fitted to a filter element so that drainage of liquid which has collected in the drainage layer is promoted when the element is in use. The element can then be used in a housing which does not have fins formed in its internal wall for compressing the drainage layer of an element.

In a first aspect of the present disclosure, there is provided a filter element assembly comprising:
a. a filter element for location in a housing of a filter, comprising a wall of a filtration medium which defines a hollow space, for a gas stream to flow from the space through the wall to be filtered, the filtration medium including a filtration layer, and a drainage layer located outside the filtration layer in which liquid separated from the gas stream can collect, and first and second end caps at opposite ends of the wall, the first end cap including a port for a gas stream which communicates with the space within the wall; and
b. a drainage promoter comprising at least one fin which can be fitted/configured to be connected to the filter element so that it extends at least part way along the element, and which then compresses the drainage layer along its length to promote drainage of liquid which has collected in the drainage layer;
c. in which the drainage promoter further comprises a support, the at least one fin being coupled to the support via a hinge so that the fin can be pivoted between a disengaged position, and an engaged position in which the fin can engage the filter element so that the fin is fitted to the filter element, the at least one fin comprising a latch feature for engaging the filter element.

The filter element and the drainage promoter may be capable of being connected to one another, or configured to be connected, so that the filter element and the drainage promoter can be manipulated by a user as a unitary component for positioning in a housing of a filter.

The drainage promoter forming part of the filter element assembly of the first aspect may provide the advantage that it can be quickly and easily connected to the filter element, to fit the at least one fin to the element. This may be achieved by introducing the support to the filter element with the at least one fin in its disengaged position, and then pivoting the fin (via the hinge) to its engaged position, to cause the fin to engage the filter element.

The drainage promoter may be a unitary or one-piece body comprising the support and the at least one fin. This may provide the advantage that the drainage promoter can be formed as a single part defining both the support and the at least one fin. The drainage promoter may be moulded, for example injection moulded. The drainage promoter may be of a polymeric material. Suitable materials may include Nylon, ABS (Acrylonitrile Butadiene Styrene), Polypropylene and Acetal (POM, PolyOxyMethylene).

The support may be adapted to be fitted to the filter element, optionally to one of the first and second end caps, such as to an end or outer surface of the end cap (which may be an axially outer end or axially outer surface). The support may be configured to abut the end cap. The support may comprise at least one engaging feature, for engaging a cooperating engaging feature on the filter element (suitably on an end cap), which may facilitate fitting of the support to the filter element. The engaging features on the support and on the filter element may cooperate to restrict movement of the support relative to the filter element, which may be movement in at least one direction. The engaging features may cooperate to restrict rotation of the support relative to the filter element. The support may comprise one of a male engaging feature and a female engaging feature. The filter element may comprise the other one of the male and female engaging features. The female engaging feature may be configured to receive the male engaging feature to facilitate connection of the drainage promoter and the filter element. A mixture of male and female engaging features may be provided on each of the support and the filter element. The male engaging feature may be a protrusion, such as a tooth or a key. The female engaging feature may be a recess, channel or aperture shaped to receive the male engaging feature. There may be a plurality of male engaging features, and a plurality of corresponding female engaging features, which engaging features may be spaced apart around a perimeter/circumference of the support and the filter element. The support and/or the filter element end cap may be generally castellated so as to define the engaging features.

The support may define an abutment surface (or surfaces) which faces towards the filter element, suitably towards an end cap of the filter element, when the drainage promoter is connected to the filter element. When the drainage promoter is connected to the filter element, an end cap of the filter element may be located between the latch feature of the at least one fin and the support and may be sandwiched or clamped between the latch feature and the support. The end cap may be located between the latch feature and an abutment surface or surfaces of the support. The drainage promoter may be arranged so that, when the promoter is connected to the filter element, the latch feature and the support (optionally the abutment surface or surfaces) cooperate to exert a compressive loading or clamping force on an end cap of the filter element, which may facilitate connection of the drainage promoter and the filter element.

The support may comprise an outer periphery, which may be a radially outer periphery. The support may be generally annular, or ring shaped and may have an outer periphery which is generally circular in plan view. The at least one fin may extend from the support at the outer periphery. There may be a plurality of fins, each fin extending from the support at a different location around its outer periphery. The hinge may be formed between the support and an end of the fin and is suitably provided at or adjacent the outer periphery of the support. Where there is a plurality of fins, each fin may be coupled to the support via a respective hinge. The hinge may be a living hinge defined by the drainage promoter. In their disengaged positions, the fins may be generally radially arranged, and may fan generally radially outwardly from the support. The fins may each be arranged so that, in their disengaged positions, they are substantially aligned with a respective radius of the support. With the fins in their disengaged position, the drainage promoter may form a spider, or may be generally spider shaped. The support may define or may be disposed generally in a plane. When the fin is in its disengaged position, the fin may be disposed substantially in the plane. When the fin is in its engaged position, the fin may be disposed transverse to the plane, optionally substantially perpendicular to the plane.

The latch feature may be resiliently deformable, which may serve for engaging the filter element in a snap-fit. A portion of the fin defining the latch feature may be resiliently deformable, to facilitate engagement of the filter element. The latch feature may be configured to engage an edge surface of one of the end caps, which edge surface may be disposed axially inwardly from an end of the filter element defined by the end cap. The latch feature may be tapered, inclined, angled and/or chamfered, to facilitate engagement of the filter element. The latch feature may define or may have a surface which faces towards the filter element, when the fin is fitted to the element, and the surface may be tapered, inclined, angled and/or chamfered. The latch feature may project along the length of the fin in a direction towards the support. The latch feature may project or extend away from a main part of the fin, optionally inwardly, and suitably radially inwardly, when the fin is fitted to the filter element. An axial distance between an end of the latch feature, when the fin is in its engaged position, and the abutment surface of the support adjacent to the fin, may be less than an axial length of the end cap that the support is coupled to. This may provide the snap-fit, through an interference fit between the latch feature and the end cap. When the surface of the latch feature is brought into abutment with the end cap of the filter element, the surface may facilitate deflection/deformation of the latch feature to provide the snap-fit. The latch feature may define a recess, channel or the like for receiving a part of the filter element, optionally the edge surface of one of the end caps, when the fin is fitted to the element. The recess may be disposed outwardly of (suitably radially outwardly) and/or behind the latch feature, when the fin is fitted to the element. When the fin is fitted to the filter element, the latch feature may be disposed inwardly (suitably radially inwardly) of the edge surface of the end cap. The edge surface of the end cap may be disposed within the recess.

The latch feature may be a finger, arm, tooth, rib or the like. The latch feature may comprise an abutment surface which abuts the filter element, suitably an end cap of the filter element, when the fin is in the engaged position. Contact between the latch feature abutment surface and the filter element may secure the fin to the element.

In a second aspect of the present disclosure, there is provided a drainage promoter which can be connected to a filter element so that the filter element and the drainage promoter can be manipulated by a user as a unitary component for positioning in a housing of a filter, the drainage promoter comprising:

a. at least one fin which can be fitted to the filter element so that it extends at least part way along the element, to compress a drainage layer of the filter element along its length and promote drainage of liquid which has collected in the drainage layer: and b. a support, the at least one fin being coupled to the support via a hinge so that the fin can be pivoted between a disengaged position, and an engaged position in which the fin can engage the filter element so that the fin can be fitted to the filter element, the at least one fin comprising a latch feature for engaging the filter element.

Further features of the drainage promoter of the second aspect may be derived from the text set out elsewhere in this document, particularly in or with reference to the filter element assembly of the first aspect.

In a third aspect of the present disclosure, there is provided a filter element assembly comprising:

a. a filter element for location in a housing of a filter, comprising a wall of a filtration medium which defines a hollow space, for a gas stream to flow from the space through the wall to be filtered, the filtration medium including a filtration layer, and a drainage layer located outside the filtration layer in which liquid separated from the gas stream can collect, and first and second end caps at opposite ends of the wall, the first end cap including a port for a gas stream which communicates with the space within the wall; and b. a drainage promoter comprising a plurality of fins, in which the fins can each be fitted/configured to be connected to the element so that they extend at least part way along the element and compress the drainage layer along their lengths to promote drainage of liquid which has collected in the drainage layer;

c. in which the drainage promoter comprises a support, the fins being coupled to the support and extending in a direction along the filter element when the drainage promoter is connected to the filter element, the fins being at least partially resiliently deformable so that they can pass over one of the end caps for fitting the fins to the filter element, and the fins comprising a latch feature for engaging the filter element.

The filter element and the drainage promoter may be capable of being connected to one another, or configured to be connected, so that the filter element and the drainage promoter can be manipulated by a user as a unitary component for positioning in a housing of a filter.

The drainage promoter of the third aspect may provide the advantage that it can be quickly and easily connected to the filter element, to fit the fins to the element. This may be achieved by introducing the drainage promoter to an end cap of the filter element and pressing the end cap into a space defined by or between the fins, to cause the fins to engage the filter element.

The drainage promoter may be generally cup-shaped or cage-shaped. The drainage promoter may form a cup or cage. The drainage promoter may have a base defined by the support, and a side or sides defined by the fins. The support and the plurality of fins extending from the support may together define the cup or cage. A space may be defined by or between the fins, which space may be shaped to receive the filter element, suitably one of the end caps. The drainage promoter may have a rest or undeformed state, which it may adopt in the absence of a force which is imparted on the fins during connection of the drainage promoter to the filter element (which may resiliently deform the fins). The fins may be configured so that they are resiliently deformed when they are fitted to the filter element, so that they press against the drainage layer of the element. The space may have a maximum dimension, in the rest state of the drainage promoter. The maximum dimension may be a width and may be a diameter. The space may be defined or described by the fins. The maximum dimension of the space, in the rest state, may be less than an outer dimension defined or described by the filter element. In this way, the fins may be caused to compress the drainage layer when they are fitted to the filter element. The outer dimension of the filter element may be an outer diameter. The outer dimension of the filter element may be defined or described by the drainage layer. The maximum dimension of the drainage promoter, in the rest state, may be less than an outer dimension defined or described by the end cap (which may be a diameter) to which the drainage promoter is fitted, and over which the fins pass for fitting to the element.

The fins may be elongate and may have a first end and a second end. The fins may be coupled to the support at, adjacent, or near to their first ends. The second ends of the fins may be free ends. When the drainage promoter is connected to the filter element the fins, optionally their second free ends, may be deflected outwardly so that the fins can pass over the end cap. The fins may bend or deform away from positions which they adopt in the rest state of the drainage promoter.

The drainage promoter may be a unitary or one-piece body comprising the support and the fins. This may provide the advantage that the drainage promoter can be formed as a single part defining both the support and the fins. The drainage promoter may be moulded, for example injection moulded. The drainage promoter may be of a polymeric material. Suitable materials may include Nylon, ABS (Acrylonitrile Butadiene Styrene), Polypropylene and Acetal (POM, PolyOxyMethylene).

The drainage promoter may be adapted to be fitted to the filter element, optionally to one of the first and second end caps, so that a space or gap exists between an end or outer surface of the end cap (which may be an axially outer end or axially outer surface) and the support. This space or gap may facilitate drainage of liquid from the drainage layer. The support may define a surface (or surfaces) which faces towards the filter element, suitably towards an end cap of the filter element, when the drainage promoter is connected to the filter element. The space or gap may be defined between the end surface of the end cap and the surface of the support. The end cap may be located between the latch features and a surface or surfaces of the support.

The support may be adapted to be fitted to the filter element, optionally to one of the first and second end caps, such as to an end or outer surface of the end cap (which may be an axially outer end or axially outer surface). The support may be configured to abut the end cap. The support may define an abutment surface (or surfaces) which faces towards the filter element, suitably towards an end cap of the filter element, when the drainage promoter is connected to the filter element. When the drainage promoter is connected to the filter element, an end cap of the filter element may be located between the latch features of the fins and the support and may be sandwiched or clamped between the latch features and the support. The end cap may be located between the latch features and an abutment surface or surfaces of the support. The drainage promoter may be arranged so that, when the promoter is connected to the filter element, the latch features and the support (optionally the abutment surface or surfaces) cooperate to exert a compressive loading or clamping force on an end cap of the filter element, which may facilitate connection of the drainage promoter and the filter element.

The latch feature may be spaced along a length of the fin from the support, such as from its surface.

The support may comprise an outer periphery. The support may be generally annular, or ring shaped and may have an outer periphery which is generally circular in plan view.

The fins may extend from the support at the outer periphery. The fins may each extend from the support at a different location around its outer periphery and may be substantially equally spaced.

The support may define or may be disposed generally in a plane. The fins may be disposed transverse to the plane and may be disposed substantially perpendicular to the plane.

In a fourth aspect of the present disclosure, there is provided a drainage promoter which can be connected to a filter element so that the filter element and the drainage promoter can be manipulated by a user as a unitary component for positioning in a housing of a filter, the drainage promoter comprising:

a. a plurality of fins which can each be fitted to the filter element so that they extend at least part way along the element, to compress a drainage layer of the filter element along their lengths and promote drainage of liquid which has collected in the drainage layer; and b. a support, the fins being coupled to the support and extending in a direction along the filter element when the drainage promoter is connected to the filter element, the fins being at least partially resiliently deformable so that they can pass over an end cap of the filter element for fitting the fins to the filter element, and the fins comprising a latch feature for engaging the filter element.

Further features of the drainage promoter of the fourth aspect may be derived from the text set out elsewhere in this document, particularly in or with reference to the filter element assembly of the third aspect.

In a fifth aspect of the present disclosure, there is provided a filter element assembly comprising:

a. a filter element for location in a housing of a filter, comprising a wall of a filtration medium which defines a hollow space, for a gas stream to flow from the space through the wall to be filtered, the filtration medium including a filtration layer, and a drainage layer located outside the filtration layer in which liquid separated from the gas stream can collect, and first and second end caps at opposite ends of the wall, the first end cap including a port for a gas stream which communicates with the space within the wall; and b. a drainage promoter comprising at least one fin which can be fitted/configured to be connected to the element so that it extends at least part way along the element, and which then compresses the drainage layer along its length to promote drainage of liquid which has collected in the drainage layer;

c. in which the at least one fin comprises a surface which faces generally towards the filter element when the fin is fitted to the filter element, and a detent in the surface, the detent being configured so that one of the end caps is a snap-fit in the detent when the drainage promoter is fitted to the element.

The drainage promoter of the filter element assembly of the fifth aspect may provide the advantage that it's at least one fin can be quickly and easily fitted to the filter element. This may be achieved by introducing the at least one fin to said end cap of the filter element, so that the end cap is snap-fitted into the detent.

The surface of the at least one fin may be an inner surface. At least part of the surface may be profiled and/or may comprise at least one protrusion. A portion of the surface may define the detent and said portion may be substantially flat or free from protrusions. The portion of the surface defining the detent may have a shape or profile which matches or conforms to an outer surface of the end cap. The outer surface of the end cap may be a radially outer surface. The outer surface of the end cap may be generally curved or actuate.

The detent may be configured so that one of the end caps is a snap-fit in the detent when the drainage promoter is slid on to the element, over that end cap. The drainage promoter (in particular it's at least one fin) may be adapted to be connected to said end cap in a sliding fit. The at least one fin may be at least partially resiliently deformable and may comprise a latch feature for engaging said end cap in the snap-fit. The at least one fin may comprise a restraint feature which can engage said end cap to restrict further sliding movement of the fin. The latch feature and the restraint feature may be spaced apart along the length of the fin, and the detent may be disposed between the features. The latch feature and the restraint feature may straddle said end cap when the fin is fitted to the element.

The detent may be configured so that one of the end caps is a snap-fit in the detent when the drainage promoter is push fitted to the end cap in a substantially radial insertion direction, or in an insertion direction comprising a radial component of movement. The at least one fin may be at least partially resiliently deformable and may comprise a latch feature for engaging said end cap in the snap-fit. The at least one fin may comprise a restraint feature which can engage said end cap to restrict sliding movement of the fin, in at least one direction. The latch feature and the restraint feature may be spaced apart along the length of the fin, and the detent may be disposed between the features. The latch feature and the restraint feature may straddle said end cap when the fin is fitted to the element. In a radial push-fit of the at least one fin, at least lateral edge portions of the fin may be resiliently deformable. The fin may be dimensioned to provide such a snap-fit, for example by making a fitting portion of the fin comprising the detent wider than a groove, channel or recess of the end cap shaped to receive the fin.

The drainage promoter may be adapted to be slid on to the element, over the end cap.

The at least one fin may have a first end and a second end. When the drainage promoter is connected to the filter element, the at least one fin may be connected to said end cap at or towards the first end. The second end may then be a free end. The detent may be provided closer to the first end than to the second end.

A distance between the latch feature and the first end of the fin may be smaller than a distance between the restraint feature and the first end. The latch feature may therefore be disposed closer to the first end of the fin than the restraint feature. A distance between the restraint feature and the second end of the fin may be smaller than a distance between the latch feature and the second end. The restraint feature may therefore be disposed closer to the second end than the latch feature. This arrangement of the latch and restraint features may be suited to a sliding-fit of the fin to the end cap in an insertion direction taken from the drainage layer of the filter element towards the end cap. The restraint feature may be configured to restrict sliding motion, or further sliding motion of the fin in one direction. The direction may be the insertion direction of the fin.

A distance between the latch feature and the second end of the fin may be smaller than a distance between the restraint feature and the second end. The latch feature may therefore be disposed closer to the second end of the fin than the restraint feature. A distance between the restraint feature and the first end of the fin may be smaller than a distance between the latch feature and the first end. The restraint feature may therefore be disposed closer to the first end than the latch feature. This arrangement of the latch and restraint features may be suited to a sliding-fit of the fin to the end cap in an insertion direction taken from the end cap of the filter element towards the drainage layer. The restraint feature may be configured to restrict sliding motion, or further sliding motion of the fin in one direction. The direction may be the insertion direction of the fin.

A portion of the fin comprising the latch feature may be resiliently deformable. Said portion may be resiliently deformed during slide-fitting of the drainage promoter to the end cap. Alternatively, or in addition, the latch feature itself may be resiliently deformable.

The latch feature may be a finger, tooth, rib or the like. The latch feature may comprise a surface which abuts the filter element, suitably an end cap of the filter element, when the fin is in the engaged position. Contact between the latch feature surface and the filter element may secure the fin to the element.

The restraint feature may comprise a surface which is adapted to abut the filter element, suitably an end cap of the element, to restrict sliding movement, or further sliding movement. The restraint feature may comprise or may be defined by a protrusion such as a finger, arm or rib. The restraint feature may be disposed on or in an inner surface of the fin.

In a sixth aspect of the present disclosure, there is provided a drainage promoter which can be connected to a filter element so that the filter element and the drainage promoter can be manipulated by a user as a unitary component for positioning in a housing of a filter, the drainage promoter comprising:
  a. at least one fin which can be fitted to the filter element so that it extends at least part way along the element, to compress a drainage layer of the filter element along its length and promote drainage of liquid which has collected in the drainage layer;
  b. in which the at least one fin comprises a surface which faces towards the filter element when the fin is fitted to the filter element, and a detent in the surface, the detent being configured so that it can receive an end cap of the filter element in a snap-fit when the drainage promoter is fitted to the element.

Further features of the drainage promoter of the sixth aspect may be derived from the text set out elsewhere in this document, particularly in or with reference to the filter element assembly of the fifth aspect.

In a seventh aspect of the present disclosure, there is provided a filter element assembly comprising:
  a. a filter element for location in a housing of a filter, comprising a wall of a filtration medium which defines a hollow space, for a gas stream to flow from the space through the wall to be filtered, the filtration medium including a filtration layer, and a drainage layer located outside the filtration layer in which liquid separated from the gas stream can collect, and first and second end caps at opposite ends of the wall, the first end cap including a port for a gas stream which communicates with the space within the wall; and
  b. a drainage promoter comprising at least one fin which can be fitted to the element so that it extends at least part way along the element, and which then compresses the drainage layer along its length to promote drainage of liquid which has collected in the drainage layer;
  c. in which the drainage promoter is adapted to be connected to an end cap of the filter element in a push fit, the fin being at least partially resiliently deformable and comprising a latch feature for engaging said end cap in a snap-fit, and a restraint feature which can engage said end cap to restrict sliding movement of the fin, the latch feature and the restraint feature being spaced apart along the length of the fin so that the features straddle said end cap when the fin is fitted to the element.

The filter element and the drainage promoter may be capable of being connected to one another, or configured to be connected, so that the filter element and the drainage promoter can be manipulated by a user as a unitary component for positioning in a housing of a filter.

The drainage promoter of the filter element assembly of the seventh aspect may provide the advantage that it's at least one fin can be quickly and easily fitted to the filter element. This may be achieved by introducing the at least one fin to said end cap of the filter element, so that the latch feature engages said end cap in the snap-fit.

The at least one fin may comprise a surface which faces generally towards the filter element when the fin is fitted to the filter element, and a detent in the surface, the detent being configured to receive said end cap. The latch feature may provide a snap-fit of the end cap into the detent when the drainage promoter is fitted to the element. The surface of the at least one fin may be an inner surface. At least part of the surface may be profiled and/or may comprise at least one protrusion. A portion of the surface may define the detent and said portion may be substantially flat or free from protrusions. The portion of the surface defining the detent may have a shape or profile which matches or conforms to an outer surface of the end cap. The outer surface of the end cap may be a radially outer surface. The outer surface of the end cap may be generally curved or actuate. The latch feature and the restraint feature may be spaced apart along the length of the fin, and the detent may be disposed between the features.

The at least one fin may be adapted to be connected to said end cap in a sliding push fit, by sliding the fin in an axial direction relative to the end cap. The at least one fin may be adapted to be connected to said end cap in a substantially radial insertion direction, or in an insertion direction comprising a radial component of movement. The at least one fin may have a first end and a second end. When the drainage promoter is connected to the filter element, the at least one fin may be connected to said end cap at or towards the first end. The second end may then be a free end. The detent may be provided closer to the first end than to the second end.

A distance between the latch feature and the first end of the fin may be smaller than a distance between the restraint feature and the first end. The latch feature may therefore be disposed closer to the first end of the fin than the restraint feature. A distance between the restraint feature and the second end of the fin may be smaller than a distance between the latch feature and the second end. The restraint feature may therefore be disposed closer to the second end than the latch feature. This arrangement of the latch and restraint features may be suited to a sliding-fit of the fin to the end cap in an insertion direction taken from the drainage layer of the filter element towards the end cap. The restraint feature may be configured to restrict sliding motion, or further sliding motion of the fin in one direction, which may be the insertion direction of the fin.

A distance between the latch feature and the second end of the fin may be smaller than a distance between the restraint feature and the second end. The latch feature may therefore be disposed closer to the second end of the fin than the restraint feature. A distance between the restraint feature and the first end of the fin may be smaller than a distance between the latch feature and the first end. The restraint feature may therefore be disposed closer to the first end than the latch feature. This arrangement of the latch and restraint features may be suited to a sliding-fit of the fin to the end cap in an insertion direction taken from the end cap of the filter element towards the drainage layer. The restraint feature may be configured to restrict sliding motion, or further sliding motion of the fin in one direction, which may be the insertion direction of the fin.

A portion of the fin comprising the latch feature may be resiliently deformable. Said portion may be resiliently deformed during sliding-fitting of the drainage promoter to the end cap. Alternatively, or in addition, the latch feature itself may be resiliently deformable.

The latch feature may be a finger, arm, tooth, rib or the like. The latch feature may comprise a surface which abuts the filter element, suitably an end cap of the filter element, when the fin is in the engaged position. Contact between the latch feature surface and the filter element may secure the fin to the element.

The restraint feature may comprise a surface which is adapted to abut the filter element, suitably an end cap of the element, to restrict further sliding movement. The restraint feature may comprise or may be defined by a protrusion such as a finger, arm or rib. The restraint feature may be disposed on or in an inner surface of the fin.

The drainage promoter may be adapted to be connected to the end cap in a substantially radial insertion direction, or in an insertion direction comprising a radial component of movement.

In an eighth aspect of the present disclosure, there is provided a drainage promoter which can be connected to a filter element so that the filter element and the drainage promoter can be manipulated by a user as a unitary component for positioning in a housing of a filter, the drainage promoter comprising:

a. at least one fin which can be fitted to the filter element so that it extends at least part way along the element, to compress a drainage layer of the filter element along its length and promote drainage of liquid which has collected in the drainage layer;

b. in which the drainage promoter is adapted to be fitted to an end cap of the filter element in a push fit, the at least one fin comprising a resiliently deformable latch feature for engaging said end cap in a snap-fit, and a restraint feature which can engage said end cap to restrict sliding movement of the fin, the latch feature and the restraint feature being spaced apart along the length of the fin so that the features can straddle the end cap when the drainage promoter is connected to said end cap.

Further features of the drainage promoter of the eighth aspect may be derived from the text set out elsewhere in this document, particularly in or with reference to the filter element assembly of the seventh aspect.

Optional further features of the filter element assemblies and/or drainage promoters of the fifth, sixth, seventh and/or eighth aspects of the invention are as follows.

The end cap that the drainage promoter is connected to may comprise a groove, channel or recess which is shaped to receive the fin. The drainage promoter may comprise a plurality of fins and said end cap may comprise a plurality of grooves, channels or recesses, each of which is configured to receive a respective fin. The grooves may be spaced apart around a perimeter of said end cap, which may be a circumference, and may be substantially evenly spaced. Said end cap may comprise an upper edge surface and a lower edge surface (which may be at a lowermost edge of the cap), and the groove may extend through the end cap from the upper edge surface to the lower edge surface. This may enable insertion of the fin into the groove from either direction. The groove, channel or recess may have a width, taken in a direction around a perimeter of the end cap, which may be a circumference. The width may decrease in an outward direction, which may be a generally radially outward direction. This may facilitate retention of the fin in the groove, by restricting movement of the fin out of the groove in the outward direction. The groove may taper and may narrow in an outward direction.

Potential advantages and optional further features of the filter element assemblies and/or drainage promoters defined in the first to eighth aspects of the invention are as follows.

In at least some of the filter element assemblies disclosed in this document, the provision of a drainage promoter which can be connected to a filter element may provide the advantage that the drainage promoter can be connected to filter elements of known types, with no (or minimal) modification being required to the filter element and its manufacturing process. This may avoid, or at least limit, potentially expensive re-tooling of components used to manufacture the filter element(s).

Connection of the drainage promoter to the filter element may be relatively quick and easy to achieve. Once connected, the filter element (with the drainage promoter attached) can easily be manipulated so that it can be positioned in the filter housing. Connection of the drainage promoter to the filter element may therefore be achievable without overly complicating subsequent positioning of the element in the filter housing.

In applicable embodiments, the latch feature may serve to restrict, and optionally to prevent, inadvertent release of the drainage promoter from the filter element.

Provision of a filter element assembly comprising a drainage promoter which can be connected to a filter element, and which comprises such a fin or fins, may provide the advantage that a drainage promotion effect can be achieved without having to modify a filter housing which receives the filter element (such as by providing the housing with integral fins).

The fin or fins of the drainage promoter may serve to break a surface tension in an outer surface of the drainage layer, at a point or points at which the fin(s) contacts the outer surface. This may serve to promote the flow of liquid which has collected in the drainage layer out of the drainage layer and on to the fin or fins, for subsequent discharge from the filter element assembly.

Reference is made in this document to a fin which compresses a drainage layer of a filter element along its length. It will be understood that the fin will not necessarily compress the drainage layer along its entire length, and thus that a compressive effect of the fin on the drainage layer may occur along only a part of the length of the fin. The fin may overlap the drainage layer along a part of its length, and a compressive effect may be provided along the part which overlaps the drainage layer, and optionally the entire part which overlaps.

The drainage promoter may be capable of being connected to either one of the first and second end caps of the filter element. This may enable fitting of the fin or fins to the filter element at or adjacent either end cap. The port defined by the first end cap may define an inlet for the flow of gas into the filter element. The filter element may be disposed, in use, in a substantially vertical orientation, and the first end cap may be an upper end cap, and/or may be located above the second end cap. In this way, gas passing into the filter element may flow from the port and down into the hollow space before passing through the wall. The drainage promoter may be connected to the filter element at or adjacent the second end cap. This arrangement of the end caps may apply to a pressurised system, in which fluid is forced through the filter element under pressure. The second end cap may be a closed end cap, and the drainage promoter may therefore be connected to the closed end cap. In a variation, the first end cap may be a lower end cap, and/or may be located below the second end cap. This arrangement of the end caps may apply to a vacuum system, in which a vacuum is employed to draw the gas through the port and into the hollow space, for passage through the wall. The drainage promoter may therefore be connected to the end cap of the filter element which defines the port.

The drainage promoter may comprise a plurality of fins, which may be spaced apart around a perimeter of the drainage promoter, optionally around the support in applicable embodiments. The number of fins that are provided may be selected according to factors including: a dimension of the filter element, in particular a diameter and/or circumference of the filter element (where it is generally cylindrical in shape); a drainage promotion effect that it is desired to provide on the drainage layer; and/or a desired flow path for gas around an external surface of the filter element when the element is located in the filter housing, the flow path being defined between an inner surface of the housing and an outer surface of the filter element (including the drainage promoter).

Where the drainage promoter comprises a plurality of fins, only some of the fins may comprise a latch feature. At least one fin may therefore be provided which does not comprise a latch feature.

A portion of the at least one fin may define the latch feature. The portion of the fin defining the latch feature may be resiliently deformable. The entire fin, including the portion defining the latch feature, may be resiliently deformable. The latch feature may be resiliently deformable. Optionally, a remainder of the fin may then be non-resiliently deformable or may be substantially rigid, so that the latch feature is deformed when the drainage promoter is connected to the filter element.

The latch feature may be a finger, arm, tooth, rib or the like. The latch feature may comprise a surface which abuts the filter element, suitably an end cap of the filter element, when the fin is in the engaged position. Contact between the latch feature surface and the filter element may secure the fin to the element. In applicable embodiments, the latch feature may be spaced along a length of the fin from the support, such as from its abutment surface.

In applicable embodiments, the restraint feature may comprise a surface which is adapted to abut the filter element, suitably an end cap of the element, to restrict sliding movement, or further sliding movement. The restraint feature may comprise or may be defined by a protrusion such as a finger, arm or rib. The restraint feature may be disposed on or in an inner surface of the fin.

The latch feature may be resiliently deformable, which may serve for engaging the filter element in a snap-fit. A portion of the fin defining the latch feature may be resiliently deformable, to facilitate engagement of the filter element. The latch feature may be configured to engage an edge surface of one of the end caps, which edge surface may be disposed axially inwardly from an end of the filter element defined by the end cap. The latch feature may be tapered, inclined, angled and/or chamfered, to facilitate engagement of the filter element. The latch feature may define or may have a surface which faces towards the filter element, when the fin is fitted to the element, and the surface may be tapered, inclined, angled and/or chamfered. The latch feature may project or extend in a direction along the length of the fin. The latch feature may project or extend inwardly away from a main part of the fin. When the surface of the latch feature is brought into abutment with the end cap of the filter element, the surface may facilitate deflection/deformation of the latch feature to provide the snap-fit. The latch feature may define a recess, channel or the like for receiving a part of the filter element, optionally the edge surface of one of the end caps, when the fin is fitted to the element. The recess may be disposed outwardly of the latch feature, when the fin is fitted to the element. When the fin is fitted to the filter element, the latch feature may be disposed inwardly, optionally radially inwardly, of the edge surface of the end cap. The edge surface of the end cap may be disposed within the recess.

The drainage promoter may comprise a drainage channel associated with the at least one fin, to facilitate drainage of liquid from the fin. This may in turn promote drainage of liquid from the drainage layer. The drainage channel may be provided in or may communicate with an inner surface of the at least one fin, which may face towards the filter element when the drainage promoter is connected to the element. Where the drainage promoter comprises, a support coupled to the at least one fin, the drainage channel may be defined at least partly by the support. The drainage channel may be defined partly by the support and partly by the fin. The drainage channel may extend through the support so that liquid can run off the fin and through the support for discharge from the filter element assembly. The at least one fin may be elongate, comprising a longitudinal axis, and the drainage channel may be substantially parallel to the longitudinal axis. This may facilitate the flow of liquid from the fin for subsequent discharge. The drainage channel may be disposed inwardly (optionally radially inwardly) of the fin, suitably inwardly of an inner surface of the fin.

The at least one fin may comprise a surface which faces towards the filter element when the fin is fitted to the filter element, and a detent in the surface, the detent being configured so that one of the end caps is a snap-fit in the detent when the drainage promoter is fitted to/slid on to the element, over that end cap.

The at least one fin may comprise a surface which faces generally towards the filter element when the fin is fitted to the element. The surface may be an inner surface. The at least one fin may comprise a first part defining a first portion of the surface, and a second part defining a second portion of the surface. The second part may extend inwardly towards the drainage layer, relative to or away from the first part, when the fin is fitted to the filter element. The second part may extend substantially radially inwardly. The at least one fin may comprise a drainage protrusion, which may define the second part of the surface. The drainage protrusion may extend into an outer surface of the drainage layer when the fin is fitted to the filter element. The drainage layer may describe an outer perimeter, which may be an outer circumference. When the at least one fin is fitted to the filter element, the drainage protrusion may extend inwardly so that an inner extent of the protrusion (which may be a radially inner extent) is located within the outer perimeter described by the drainage layer. Where there is a plurality of fins, the inner extents of the drainage protrusions of the fins may intersect with a circle having a diameter which is smaller than the outer diameter described by the drainage layer. The drainage protrusion may form the latch feature.

The at least one fin, in particular a drainage protrusion of the fin, may comprise an inclined or tapered lead-in surface. The surface may be provided at or towards an upper or leading end of the fin, which may be a free end. The surface may aid fitting of the fin to the end cap, contact between the inclined surface and the end cap serving to deflect the fin radially outwardly so that it can pass over the end cap.

The at least one fin may comprise at least one drainage channel or passage, which may extend at least part way along a length of the fin. The at least one drainage channel or passage may be disposed on or in, or may be defined by, a/the surface of the fin which faces generally towards the filter element when the fin is fitted to the element. This may provide the advantage that liquid which has drained from the drainage layer on to the fin may pass into the drainage channel or passage for discharge from the fin. As the drainage channel or passage is on or in the inwardly facing surface, this may shield the liquid from gas flowing around the filter element, resisting re-entrainment of the liquid in the gas flow. The at least one fin may comprise a recess in its surface which forms the drainage channel or passage. The at least one fin may comprise a protrusion which extends inwardly towards the filter element (when the fin is fitted to the filter element), the protrusion having at least one flank, and optionally first and second flanks, extending in a direction along a length of the fin. A drainage channel may be defined between a flank of the protrusion and an adjacent portion of the fin. Drainage channels may be provided which are defined between each flank of the protrusion and adjacent portions of the fin. The at least one fin may comprise a flow diverter, which may take the form of curved ramp, for deflecting liquid flowing under gravity along the channel and off the fin.

The at least one fin may comprise a surface which faces generally away from the filter element, when the fin is fitted to the filter element. The surface may be an outer surface. The surface may be configured to cooperate with the filter housing, suitably an internal wall of the housing, so that the fin is urged inwardly to compress the drainage layer (or to enhance a compressive loading applied to the drainage layer by the fin) when the fin is fitted to the filter element. Where there is a plurality of fins, outer extents of the fins defined by the outer surfaces may intersect with a circle having a diameter which is larger than an internal diameter described by an adjacent portion of the filter housing. This may provide an interference fit which urges the fins inwardly.

The at least one fin may comprise at least one abutment portion which extends away from the outwardly facing surface, suitably radially outwardly, the abutment portion defining an outer abutment surface of the fin. The abutment surface may be configured to cooperate with the filter housing, suitably an internal wall of the housing, so that the fin is urged inwardly to compress the drainage layer (or to enhance a compressive loading applied to the drainage layer by the fin) when the fin is fitted to the filter element. The abutment portion may be a protrusion which defines the abutment surface. The abutment portion may extend at least part way along a length of the fin and may extend along the fin from a free end.

The at least one fin, or at least a portion of said fin defining the drainage channel or passage, may be generally or at least partly T-shaped, W-shaped, or V-shaped in cross-section.

Where the at least one fin (or a portion of the fin) is generally or at least partly T-shaped, the fin may comprise an outer portion which may define a top of the T, and an inner portion connected to the outer portion which may define a leg of the T. The inner portion may be disposed transverse (suitably substantially perpendicular) to the outer portion. The inner portion may define the protrusion which extends inwardly towards the filter element. A first drainage channel or passage may be defined at an intersection between a first flank of the inner portion and the outer portion. A second drainage channel or passage may be defined at an intersection between the second flank of the inner portion and the outer portion. A part or parts of the outer portion adjacent to the flank or flanks may be substantially flat or planar, but may be curved or recessed, which may help to prevent re-entrainment of liquid.

Where the at least one fin (or a portion of the fin) is generally or at least partly W-shaped, the fin may comprise a centre portion, a first outer portion connected to a first side of the centre portion and defining a first drainage channel or passage, and a second outer portion connected to a second side of the centre portion and defining a second drainage channel or passage. The centre portion may extend generally inwardly (when the fin is fitted to the filter element) and may be generally V-shaped. An apex of the centre portion may therefore face inwardly. The first and second outer portions may extend generally outwardly and may be generally V-shaped. Apexes of the outer portions may therefore face outwardly. The drainage channels or passages may be defined by the outer portions. The centre portion may define the protrusion which extends inwardly towards the filter element. The first and second outer portions may define respective first and second abutment portions.

Where the at least one fin (or a portion of the fin) is generally or at least partly V-shaped, the fin (or said portion of the fin) may extend generally outwardly, when the fin is fitted to the filter element, so that an apex of the V-shaped fin (or said portion of the fin) faces generally outwardly. Flanks of the fin (or said portion of the fin) may define protrusions which extend inwardly towards the filter element. An apex of the V-shaped fin (or said portion of the fin) may define an abutment portion.

The width of the at least one fin which at its edge contacts the drainage layer, when the drainage promoter is fitted to the element, may be less than its width at its opposite edge.

In a ninth aspect of the present disclosure, there is provided a filter element for location in a housing of a filter, the filter element comprising:
 a. a wall of a filtration medium which defines a hollow space, for a gas stream to flow from the space through the wall to be filtered, the filtration medium including a filtration layer, and a drainage layer located outside the filtration layer in which liquid separated from the gas stream can collect;
 b. first and second end caps at opposite ends of the wall, one of the end caps including a port for a gas stream which communicates with the space within the wall; and
 c. at least one engaging feature on one of the end caps which is configured to cooperate with an engaging feature on a drainage promoter, to restrict relative movement between the filter element and the drainage promoter.

The engaging feature on the end cap may be configured to cooperate with an engaging feature on a support of the drainage promoter, the drainage promoter comprising the support and at least one fin. The at least one fin of the drainage promoter may be coupled to the support via a hinge so that the fin can be pivoted between a disengaged position, and an engaged position in which the fin can engage the filter element. The at least one fin may comprise a latch feature for engaging the filter element.

The movement may be in at least one direction. The end cap may comprise one of a male engaging feature and a female engaging feature. Where a female engaging feature is provided, it may be configured to receive a male engaging feature of the drainage promoter. Where a male engaging member is provided, it may be configured to engage in a female engaging feature of the drainage promoter. A mixture of male and female engaging features may be provided on the end cap, which may each be configured to cooperate with a corresponding engaging feature of the drainage promoter.

Optional further features of the filter element of the ninth aspect may be derived from the text relating to the filter element assembly and/or drainage promoter of the first and second aspects.

In a tenth aspect of the present disclosure, there is provided a filter element for location in a housing of a filter, the filter element comprising:
  a. a wall of a filtration medium which defines a hollow space, for a gas stream to flow from the space through the wall to be filtered, the filtration medium including a filtration layer, and a drainage layer located outside the filtration layer in which liquid separated from the gas stream can collect;
  b. first and second end caps at opposite ends of the wall, one of the end caps including a port for a gas stream which communicates with the space within the wall; and
  c. a groove formed in one of the end caps configured to receive a drainage promoter fin.

The end cap may comprise a plurality of grooves (or channels or recesses), each of which is configured (e.g., shaped) to receive a respective drainage promoter fin. The grooves may be spaced apart around a perimeter of the end cap, which may be a circumference, and may be substantially evenly spaced. The end cap may comprise an upper edge surface and a lower edge surface, and the groove may extend through the end cap from the upper edge surface to the lower edge surface. The groove, channel or recess may have a width, taken in a direction around a perimeter of the end cap, which may be a circumference. The width may decrease in an outward direction, which may be a generally radially outward direction. The groove may taper and may narrow in an outward direction.

Optional further features of the filter element of the tenth aspect may be derived from the text relating to the filter element assemblies and/or drainage promoters of the fifth, sixth, seventh and/or eighth aspects of the invention.

In an eleventh aspect of the present disclosure, there is provided a drainage promoter fin for a filter element, the drainage promoter fin being configured for fitting to the filter element so that it extends at least part way along the element and compresses a drainage layer of the filter element along its length to promote drainage of liquid which has collected in the drainage layer, the fin comprising:
  a. a first end, a second end and a longitudinal axis extending along the fin between the first and second ends;
  b. an inner surface configured to face generally inwardly towards the filter element; and
  c. an outer surface configured to face generally outwardly away from the filter element;
  d. in which the inner surface comprises a recessed portion configured to receive an end cap of the filter element so that the fin can be fitted to the element, and a drainage portion configured to extend generally inwardly towards the filter element;
  e. in which the fin has a depth, taken in a direction transverse to the longitudinal axis from the outer surface to the inner surface, a depth of a part of the fin comprising the drainage portion being greater than a depth of a part of the fin comprising the recessed portion, so that the drainage portion protrudes into an outer surface of the drainage layer when the fin is fitted to the element.

The recessed portion may be disposed at a position along a length of the fin between the first and second ends. The recessed portion may be disposed at, or substantially adjacent, one of the first and second ends. The drainage portion may extend or project away from the fin, relative to the recessed portion.

In a twelfth aspect of the present disclosure, there is provided a drainage promoter fin for a filter element, the drainage promoter fin being configured for fitting to the filter element so that it extends at least part way along the element and compresses a drainage layer of the filter element along its length to promote drainage of liquid which has collected in the drainage layer, the fin comprising:
  a. an inner surface configured to face generally inwardly towards the filter element, the inner surface comprising a drainage portion configured to extend generally inwardly towards the filter element so that it protrudes into an outer surface of the drainage layer when the fin is fitted to the element; and
  b. a detent in the inner surface of the fin;
  c. in which the fin is mountable (and optionally push or slidably mountable) to an end cap of the filter element, for fitting the fin to the element, and in which the detent is configured to receive the end cap in a snap-fit when the drainage promoter fin is mounted to the filter element (optionally slid on to the filter element over that end cap).

The fin may have first and second ends. The detent may be disposed at a position along a length of the fin between the first and second ends. The detent may be disposed at, or substantially adjacent, one of the first and second ends. The drainage portion may extend or project away from the fin, relative to the detent.

In a thirteenth aspect of the present disclosure, there is provided a drainage promoter fin for a filter element, the drainage promoter fin being configured for fitting to the filter element so that it extends at least part way along the element and compresses a drainage layer of the filter element along its length to promote drainage of liquid which has collected in the drainage layer, the fin comprising:
  a. an inner surface configured to face generally inwardly towards the filter element, the inner surface comprising a drainage portion configured to extend generally inwardly towards the filter element;
  b. in which the fin is mountable to an end cap of the filter element, for fitting the fin to the element;
  c. in which the fin is at least partially resiliently deformable;
  d. and in which the fin further comprises a latch feature for engaging the end cap in a snap-fit, to secure the fin to the filter element, and a restraint feature which can engage said end cap to restrict sliding movement (optionally further sliding movement) of the fin, the latch feature and the restraint feature being spaced apart along the length of the fin so that the features straddle the end cap when the fin is fitted to the element.

The fin may have first and second ends. The fin may be configured to be connected to the filter element at, near or adjacent the first end. The second end may be a free end.

A distance between the latch feature and the first end of the fin may be smaller than a distance between the restraint feature and the first end. The latch feature may therefore be disposed closer to the first end of the fin than the restraint feature. A distance between the restraint feature and the second end of the fin may be smaller than a distance between the latch feature and the second end. The restraint feature may therefore be disposed closer to the second end than the latch feature. This arrangement of the latch and restraint features may be suited to a sliding-fit of the fin to the end cap in an insertion direction taken from the drainage layer of the filter element towards the end cap. The restraint feature may be configured to restrict sliding motion, or further sliding motion of the fin in one direction, which may be the insertion direction of the fin.

A distance between the latch feature and the second end of the fin may be smaller than a distance between the restraint feature and the second end. The latch feature may therefore be disposed closer to the second end of the fin than the restraint feature. A distance between the restraint feature and the first end of the fin may be smaller than a distance between the latch feature and the first end. The restraint feature may therefore be disposed closer to the first end than the latch feature. This arrangement of the latch and restraint features may be suited to a sliding-fit of the fin to the end cap in an insertion direction taken from the end cap of the filter element towards the drainage layer. The restraint feature may be configured to restrict sliding motion, or further sliding motion of the fin in one direction, which may be the insertion direction of the fin.

In a fourteenth aspect of the present disclosure, there is provided a drainage promoter fin for a filter element, the drainage promoter fin being configured for fitting to the filter element so that it extends at least part way along the element and compresses a drainage layer of the filter element along its length to promote drainage of liquid which has collected in the drainage layer, the fin comprising:
  a. an inner surface configured to face generally inwardly towards the filter element;
  b. a drainage portion on the inner surface configured to extend generally inwardly towards the filter element; and
  c. at least one drainage channel provided on the inner surface and extending at least part way along a length of the fin, for the drainage of liquid from the inner surface of the fin.

The fin may comprise a recess in its surface which forms the drainage channel. The drainage portion may have at least one flank extending in a direction along a length of the fin and may have first and second flanks. The drainage channel may be defined at an intersection between a flank of the protrusion and an adjacent portion of the fin. Drainage channels may be provided which are defined at an intersection between each flank of the protrusion and adjacent portions of the fin.

In a fifteenth aspect of the present disclosure, there is provided a drainage promoter fin for a filter element, the drainage promoter fin being configured for fitting to the filter element so that it extends at least part way along the element and compresses a drainage layer of the filter element along its length to promote drainage of liquid which has collected in the drainage layer, the fin comprising:
  a. an inner surface configured to face generally inwardly towards the filter element; and
  b. at least one recess in the inner surface, the recess extending at least part way along a length of the fin and defining a drainage channel for the drainage of liquid from the inner surface of the fin.

The fin may comprise a drainage portion configured to extend generally inwardly towards the filter element. The drainage portion may have at least one flank extending in a direction along a length of the fin and may have first and second flanks. The drainage channel may be defined at an intersection between a flank of the protrusion and an adjacent portion of the fin. Drainage channels may be provided which are defined at an intersection between each flank of the protrusion and adjacent portions of the fin.

Optional further features of the drainage promoter fins of the eleventh, twelfth, thirteenth, fourteenth and/or fifteenth aspects are as follows.

The fin may comprise a latch feature for engaging the filter element to secure the fin to the filter element. A portion of the fin may define the latch feature. The portion of the fin defining the latch feature may be resiliently deformable. The entire fin, including the portion defining the latch feature, may be resiliently deformable. The latch feature may be resiliently deformable. Optionally, a remainder of the fin may then be non-resiliently deformable or may be substantially rigid, so that only the latch feature is deformed when the drainage promoter fin is connected to the filter element. Providing said portion of the fin, the fin and/or the latch feature so that it is resiliently deformable may facilitate engagement of the filter element in a snap-fit.

The latch feature may be configured to engage an edge surface of one of the end caps, which edge surface may be disposed axially inwardly from an end of the filter element defined by the end cap. The latch feature may be tapered, inclined, angled and/or chamfered, to facilitate engagement of the filter element. The latch feature may define or may have a surface which faces towards the filter element, when the fin is fitted to the element, and the surface may be tapered, inclined, angled and/or chamfered. The latch feature may project or extend in a direction along the length of the fin. The latch feature may project or extend away from a main part of the fin, and may extend inwardly, optionally radially inwardly. When the surface of the latch feature is brought into abutment with the end cap of the filter element, the surface may facilitate deflection/deformation of the latch feature to provide the snap-fit. The latch feature may define a recess, channel or the like for receiving a part of the filter element, optionally the edge surface of one of the end caps, when the fin is fitted to the element. The recess may be disposed outwardly of the latch feature, optionally radially outwardly, and may be disposed closer to the main part of the fin. When the fin is fitted to the filter element, the latch feature may be disposed inwardly of the edge surface of the end cap. The edge surface of the end cap may be disposed within the recess.

The fin may comprise a surface which faces towards the filter element when the fin is fitted to the filter element, and a detent in the surface, the detent being configured so that one of the end caps is a snap-fit in the detent when the drainage promoter fin is fitted to the end cap (optionally slid on to the element, over that end cap).

The fin may comprise a surface which faces generally towards the filter element when the fin is fitted to the element. The surface may be an inner surface. The fin may comprise a first part defining a first portion of the surface, and a second part defining a second portion of the surface. The second part may extend inwardly towards the drainage layer, relative to or away from the first part, when the fin is fitted to the filter element. The second part may extend substantially radially inwardly. The fin may comprise a drainage protrusion, which may define the second part of the surface.

The fin may comprise at least one drainage channel or passage, which may extend at least part way along a length of the fin. The at least one drainage channel or passage may be disposed on or in, or may be defined by, the surface of the fin which faces generally towards the filter element when the fin is fitted to the element. The fin may comprise a recess in its surface which forms the drainage channel or passage. The fin may comprise a protrusion which extends inwardly towards the filter element (when the fin is fitted to the filter element), the protrusion having at least one flank extending in a direction along a length of the fin and may have first and second flanks. A drainage channel may be defined at an intersection between a flank of the protrusion and an adjacent portion of the fin. Drainage channels may be provided which are defined at an intersection between each flank of the protrusion and adjacent portions of the fin. The at least one fin may comprise a flow diverter, which may take the form of curved ramp, for deflecting liquid flowing under gravity along the channel and off the fin.

The fin may comprise a surface which faces generally away from the filter element, when the fin is fitted to the filter element. The surface may be an outer surface. The surface may be configured to cooperate with the filter housing, suitably an internal wall of the housing, so that the fin is urged inwardly to compress the drainage layer (or to enhance a compressive loading applied to the drainage layer by the fin) when the fin is fitted to the filter element. The fin may comprise at least one abutment portion which extends away from the outer surface, suitably radially outwardly, the abutment portion defining an outer abutment surface of the fin. The abutment surface may be configured to cooperate with the filter housing, suitably an internal wall of the housing, so that the fin is urged inwardly to compress the drainage layer (or to enhance a compressive loading applied to the drainage layer by the fin) when the fin is fitted to the filter element. The abutment portion may be a protrusion which defines the abutment surface. The abutment portion may extend at least part way along a length of the fin and may extend along the fin from a free end.

The fin, or at least a portion of said fin defining the drainage channel or passage, may be generally or at least partly T-shaped, W-shaped, or V-shaped in cross-section.

Where the fin (or a portion of the fin) is generally or at least partly T-shaped, the fin may comprise an outer portion which may define a top of the T, and an inner portion connected to the outer portion which may define a leg of the T. The inner portion may be disposed transverse (suitably substantially perpendicular) to the outer portion. The inner portion may define the protrusion which extends inwardly. A first drainage channel or passage may be defined at an intersection between a first flank of the inner portion and an adjacent part of the outer portion. A second drainage channel or passage may be defined at an intersection between a second flank of the inner portion and the outer portion. The adjacent parts of the outer portion may be substantially flat or planar, but may be curved or recessed, which may help to prevent re-entrainment of liquid.

Where the fin (or a portion of the fin) is generally or at least partly W-shaped, the fin may comprise a centre portion, a first outer portion connected to a first side of the centre portion and defining a first drainage channel or passage, and a second outer portion connected to a second side of the centre portion and defining a second drainage channel or passage. The centre portion may extend generally inwardly and may be generally V-shaped. An apex of the centre portion may therefore face inwardly. The first and second outer portions may extend generally outwardly and may be generally V-shaped. Apexes of the outer portions may therefore face outwardly. The drainage channels or passages may be defined by the V-shaped outer portions. The centre portion may define the protrusion which extends inwardly towards the filter element. The first and second outer portions may define respective first and second abutment portions.

Where the fin (or a portion of the fin) is generally or at least partly V-shaped, the fin (or said portion of the fin) may extend generally outwardly, when the fin is fitted to the filter element, so that an apex of the V-shaped fin (or said portion of the fin) faces generally outwardly. Flanks of the fin (or said portion of the fin) may define protrusions which extend inwardly towards the filter element. An apex of the V-shaped fin (or said portion of the fin) may define an abutment portion.

A width of the fin at an inner edge (which may contact the drainage layer in use, when the drainage promoter fin is fitted to the element) may be less than a width at its opposite, outer edge, at least in an area of the fin which contacts the end cap.

The fin may be adapted to be connected to said end cap in a sliding fit. The fin may be at least partially resiliently deformable and may comprise a latch feature for engaging said end cap in the snap-fit. The fin may comprise a restraint feature which can engage said end cap to restrict sliding movement (optionally further sliding movement) of the fin. The latch feature and the restraint feature may be spaced apart along the length of the fin, and the detent may be disposed between the features. The latch feature and the restraint feature may straddle said end cap when the fin is fitted to the element.

The latch feature may be a finger, arm, tooth, rib or the like. The latch feature may comprise a surface which abuts the filter element, suitably an end cap of the filter element, when the fin is in the engaged position. Contact between the latch feature surface and the filter element may secure the fin to the element. The latch feature may be spaced along a length of the fin from the support, such as from its abutment surface.

The restraint feature may comprise a surface which is adapted to abut the filter element, suitably an end cap of the element, to restrict further sliding movement. The restraint feature may comprise or may be defined by a protrusion such as a finger, arm or rib. The restraint feature may be disposed on or in an inner surface of the fin.

A distance between the latch feature and the first end of the fin may be smaller than a distance between the restraint feature and the first end. The latch feature may therefore be disposed closer to the first end of the fin than the restraint feature. A distance between the restraint feature and the second end of the fin may be smaller than a distance between the latch feature and the second end. The restraint feature may therefore be disposed closer to the second end than the latch feature. This arrangement of the latch and restraint features may be suited to a sliding-fit of the fin to the end cap in an insertion direction taken from the drainage layer of the filter element towards the end cap. The restraint feature may be configured to restrict sliding motion, or further sliding motion of the fin in one direction, which may be the insertion direction of the fin.

A distance between the latch feature and the second end of the fin may be smaller than a distance between the restraint feature and the second end. The latch feature may therefore be disposed closer to the second end of the fin than the restraint feature. A distance between the restraint feature and the first end of the fin may be smaller than a distance between the latch feature and the first end. The restraint feature may therefore be disposed closer to the first end than the latch feature. This arrangement of the latch and restraint features may be suited to a sliding-fit of the fin to the end cap in an insertion direction taken from the end cap of the filter element towards the drainage layer. The restraint feature may be configured to restrict sliding motion, or further sliding motion of the fin in one direction, which may be the insertion direction of the fin.

The fin or fins forming part of the drainage promoters of the first to eighth aspects may be or may comprise any of the drainage promoter fins of the eleventh to fifteenth aspects or may have features derived from any one of said aspects. The drainage promoters of the first to eighth aspects may have fins according to any one of the eleventh to fifteenth aspects, or further features derived from said aspects.

In a sixteenth aspect of the present disclosure, there is provided a method of improving drainage of liquid from a drainage layer of an existing filter element, the method comprising fitting a drainage promoter according to any one of the second, fourth, sixth or eighth aspects to the filter element.

In further aspects of the present disclosure, there are provided filter element assemblies according to any of the aspects disclosed herein, in which the respective drainage promoter is connected to the respective filter element.

Filter element assemblies, drainage promoters and filter elements are defined in the appended claims.

Embodiments of the present invention will now be described, by way of example only, with reference to the accompanying drawings, in which.

Figure 1:
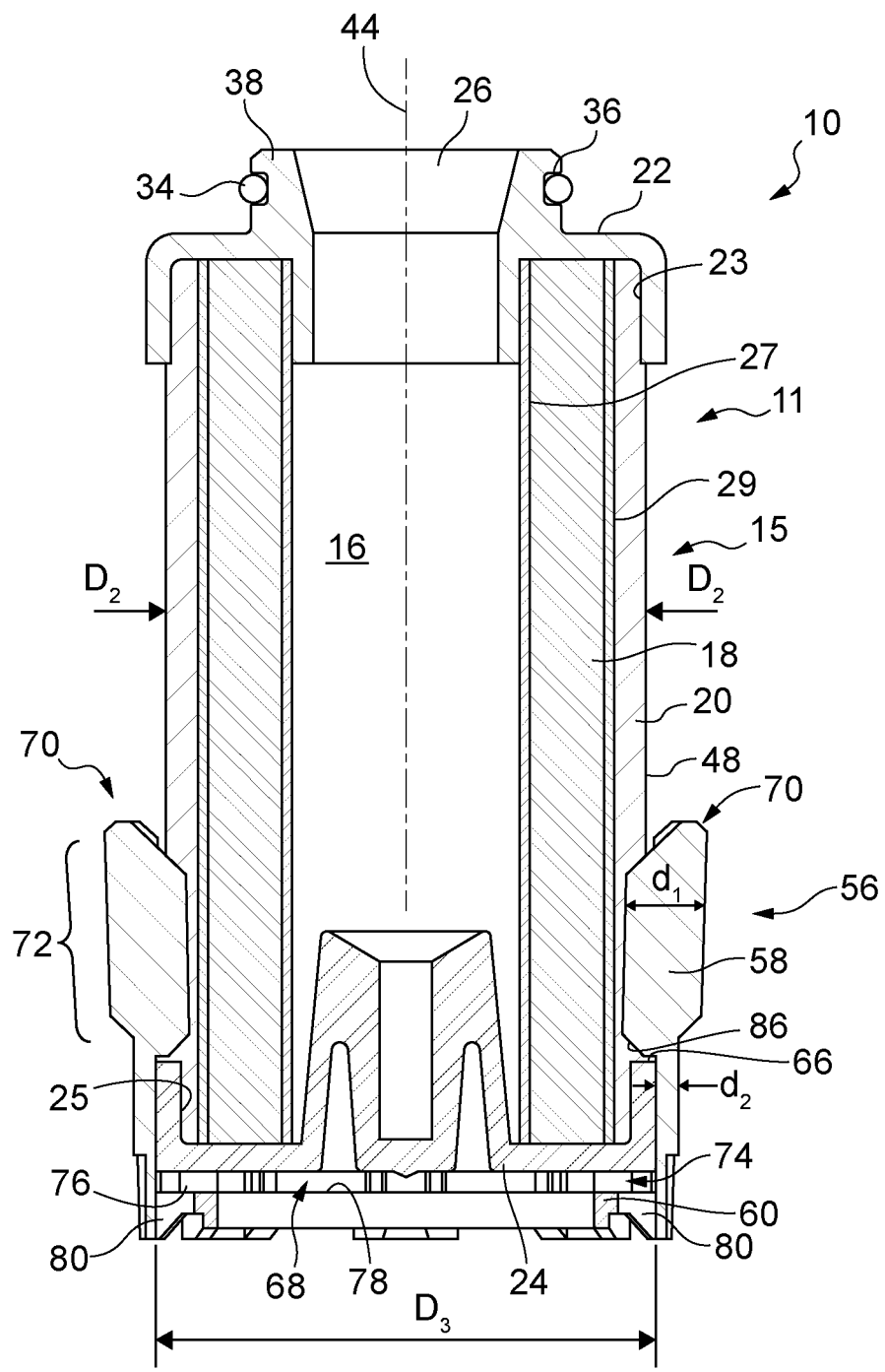
FIG. 1 is a longitudinal cross-sectional front view of a filter element assembly in accordance with an embodiment of the present disclosure.

Turning firstly to FIG. 1, there is shown a longitudinal cross-sectional front view of a filter element assembly in accordance with an embodiment of the present disclosure, the filter element assembly indicated generally by reference numeral 10. The filter element assembly 10 is shown located in a housing 12 of a filter 14 in the longitudinal half-sectional front view of FIG. 2, in which the filter housing 12 and a filter head 13 coupled to the housing have been sectioned in the direction indicated by the line A-A.

The filter element assembly 10 comprises a filter element 11 for location in the filter housing 12, the filter element comprising a wall 15 of a filtration medium defining a hollow space 16, for a gas stream to flow from the space through the wall to be filtered. The filtration medium includes a filtration layer 18, and a drainage layer 20 located outside the filtration layer, in which liquid separated from the gas stream can collect. Filter elements having such filtration and drainage layers are well known in the field of fluid filters, and persons skilled in the art will appreciate their general construction and operation during use. Accordingly, the filtration and drainage layers 18 and 20, including their materials and methods of manufacture, will not be described in detail in this document. In general terms however, the filtration and drainage layers 18 and 20 may have the following features.

The material for the filtration medium in the filtration layer 18 of the filter element 11 will be selected according to the nature of the gas that is to be filtered, the nature of the contaminants (liquid droplets, aerosols, solid particles etc) to be filtered from the gas, the pressure differential across the filter and so on. Such materials are known, including those used by Parker Domnick Hunter in products which are available under the trademark OIL-X. Suitable materials include, but are not restricted to, borosilicate and other glass fibres, activated carbon minerals, activated silica materials and so on.

The filtration layer 18 can be made from woven fibres. However, as will be appreciated, the filtration layer can be made from sheets of non-woven fibres. For example, a microfibre filtration layer made from fine organic or inorganic fibres may be employed. A coarser fibre layer may be fitted on the inside of a microfibre filtration layer, which may protect a microfibre filtration layer from gross pollution. The filtration layer 18 may comprise a layer of a material which has been folded so that it is fluted (or pleated). This can increase the surface area of the filtration layer 18 through which gas flowing through the filter element 11 will pass. This can also help to increase the rigidity of the filtration layer 18.

The drainage layer 20 comprises a material that is capable of retaining liquid that has been coalesced by the filtration layer 18 and is carried to the drainage layer by the gas stream that flows through the drainage layer. The drainage layer 20 will generally be porous and made from a material which encourages flow of coalesced liquid towards the base of the filter element 11. Factors affecting the drainage characteristics may include pore size and structure, and the material of the drainage layer 20, including for example the surface energy of liquid which is in contact with the material. Materials suitable for use in the drainage layer are used in similar products sold by Parker Domnick Hunter under the trademark OIL-X. Suitable materials include open-celled foam plastics, felted fabric material, expanded foam materials, woven and non-woven materials.

The filter element 11 also comprises first and second end caps 22 and 24 at opposite ends of the wall 15, the first end cap including a port 26 for the gas stream to flow into the filter element, the port communicating with the space 16 within the wall. In normal use of the filter 14, the filter element 11 will be substantially vertically oriented, so that the first end cap 22 forms an upper end cap, and the second end cap 24 a lower end cap. However, it will be understood that the filter element 11 may be disposed in a non-vertical orientation.

Perforated tubular supports 27 and 29, typically of a metal or metal alloy material, are secured to the end caps 22 and 24, and serve for securing both the filtration layer 18 and the drainage layer 20 to the end caps and separating the different layers. As is well known in the field of the invention, this is suitably achieved by 'potting' the supports 27 and 29, and the filtration and drainage layers 18 and 20, within annular channels 23 and 25 defined by the end caps 22 and 24, using an adhesive such as an epoxy-based adhesive.

The filter head 13 is fitted to the housing 12 of the filter 14 in a conventional fashion, suitably via a screw-threaded connection 28. The filter head 13 comprises an inlet 30, and a curved flow conduit 32 which serves to direct a gas stream entering the filter head through the inlet 30 downwardly and into the filter element 11, so that contaminants in the gas stream can be removed. However, in variations on the illustrated embodiments, the filter element assembly 10 may include a shaped flow conduit (not shown) which serves for directing the gas stream into the element 11, such as disclosed in International Patent Publication no. WO-A-2006/013328, the disclosure of which is incorporated herein by this reference. As discussed above, the filter 14 may have a wide range of uses but may have a particular use in removing contaminants from a gas stream such as a compressed or vacuum gas stream which is to be used in an industrial application, to remove residual oil from a compressor used to pressurise the gas.

The first end cap 22 of the filter element 11 comprises a seal in the form of an O-ring 34, which is mounted in a groove 36 defined in a tubular wall 38 of the end cap defining the port 26. The O-ring seal 34 serves for sealing the filter element 11 relative to the filter head 13, so that gas entering the inlet 30 (flowing generally in the direction of the arrow 40 along an inlet axis 42) is turned through approximately 90° and directed into the filter element 11. The gas stream entering the filter element 11 flows through its port 26 generally in a direction along an axis 44 of the filter element, and into the space 16. A filter element having this general structure and operation is disclosed in International Patent Publication no. WO-A-2006/013328.

The gas stream containing the contaminants flows from the central space 16 radially outwardly, through the wall 15 of the filter element 11, passing through the filtration layer 18 and the drainage layer 20. The filtration layer 18 serves for filtering out contaminants, which as described above may be residual oil entrained in the gas stream. Oil droplets coalesce and enter the drainage layer 20, building up to form a 'wet band' towards a lower end of the drainage layer. The liquid oil in this wet band progressively drains from a lower end of the layer 20 into a sump 45 of the housing 12 and can flow out of the sump via a drain 47.

The 'clean' gas stream exiting the drainage layer 20 flows into an annular region 46 defined between an external surface 48 of the filter element 11 (defined by the drainage layer 20) and an internal surface 50 of the housing 12, before passing to an outlet conduit (not shown) defined by the filter head 13. The gas stream then exits the filter head 13 through an outlet 52, in the direction of the arrow 54, before flowing on to a downstream location.

Figure 4:
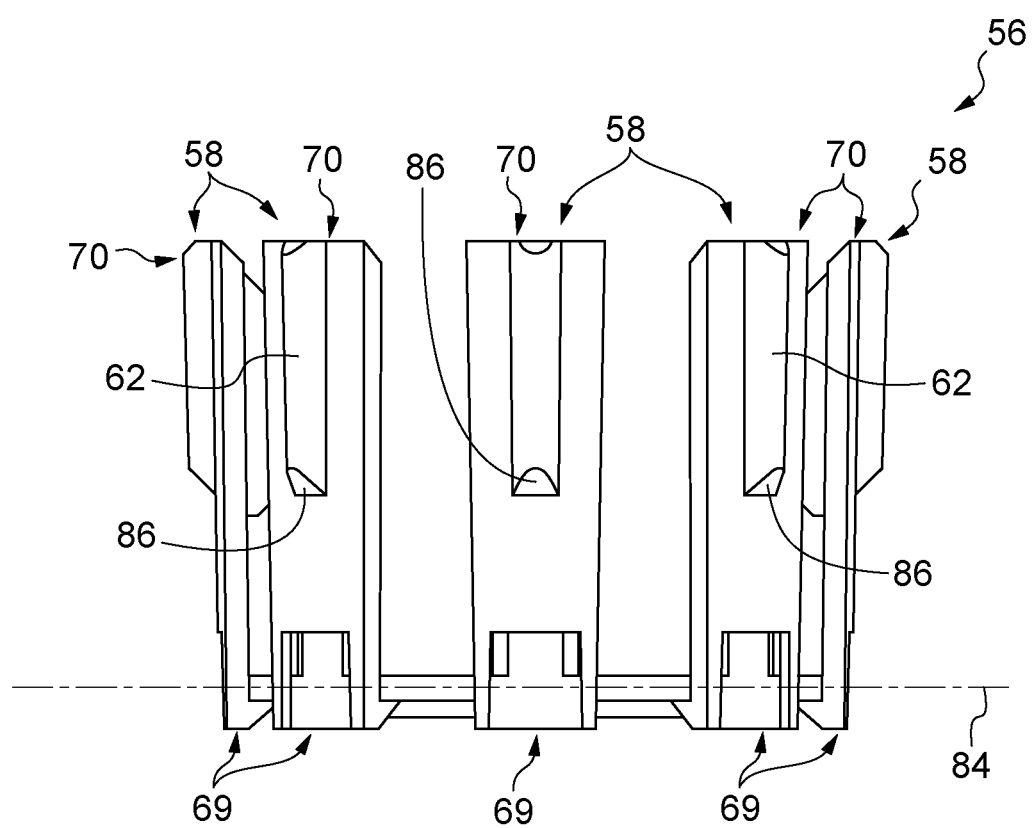
FIG. 4 is a front view of a drainage promoter forming part of the filter element assembly of FIG. 1.
Figure 5:
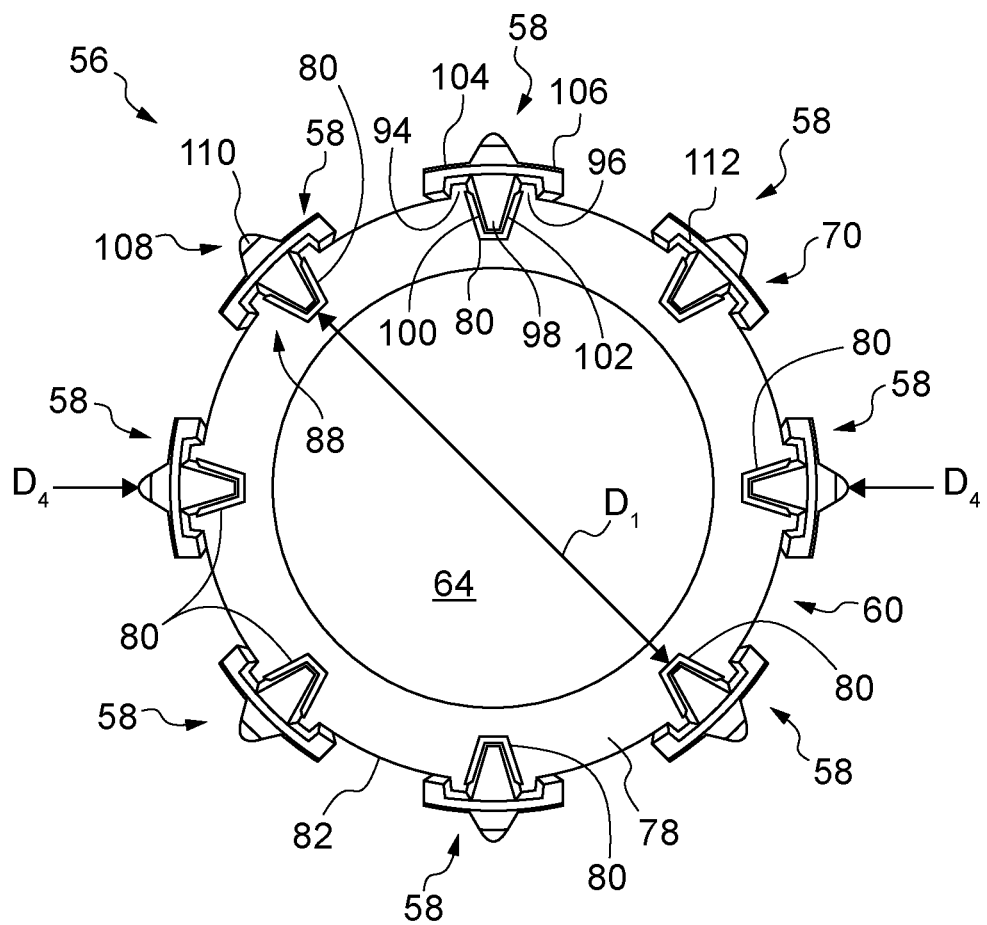
FIG. 5 is a plan view of a drainage promoter forming part of the filter element assembly of FIG. 1.
Figure 6:
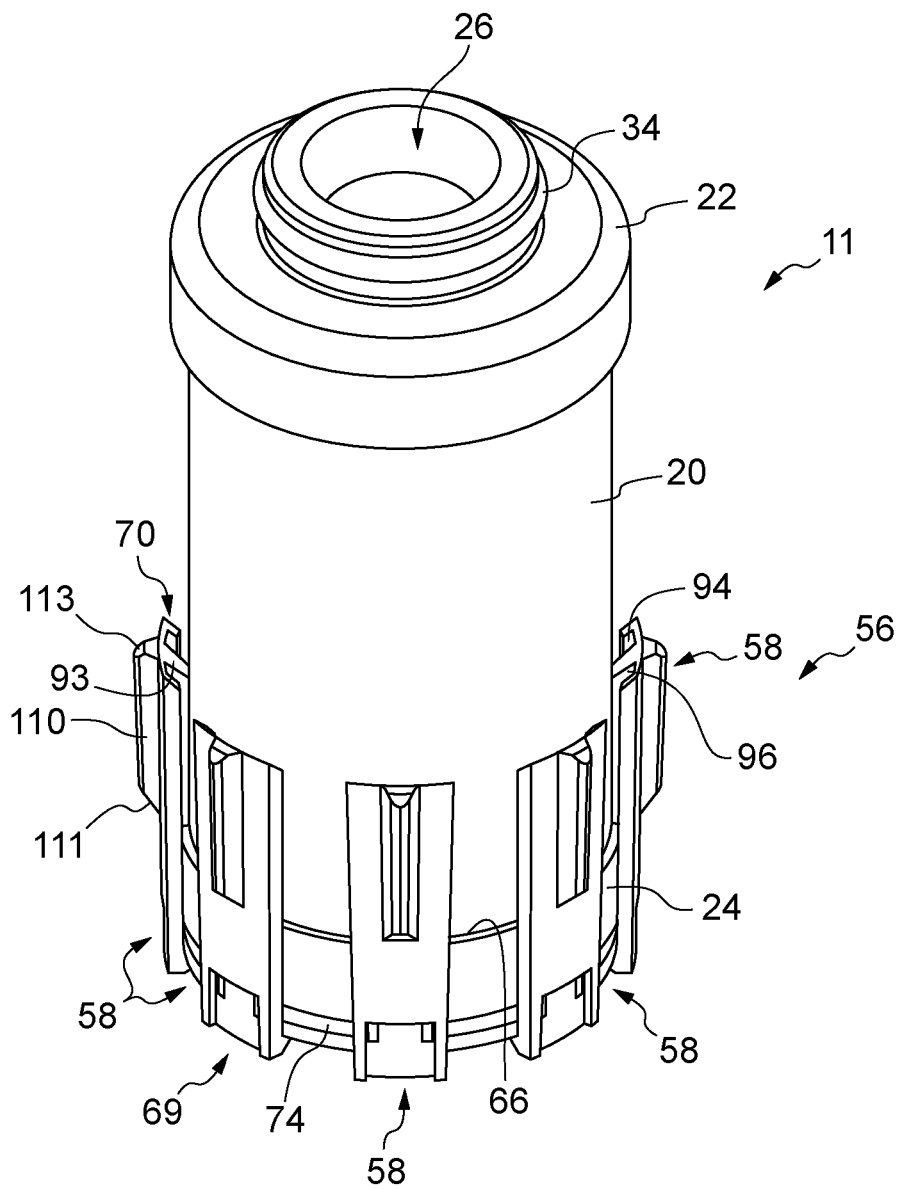
FIG. 6 is a perspective view of the filter element assembly shown in FIG. 1.
Figure 7:
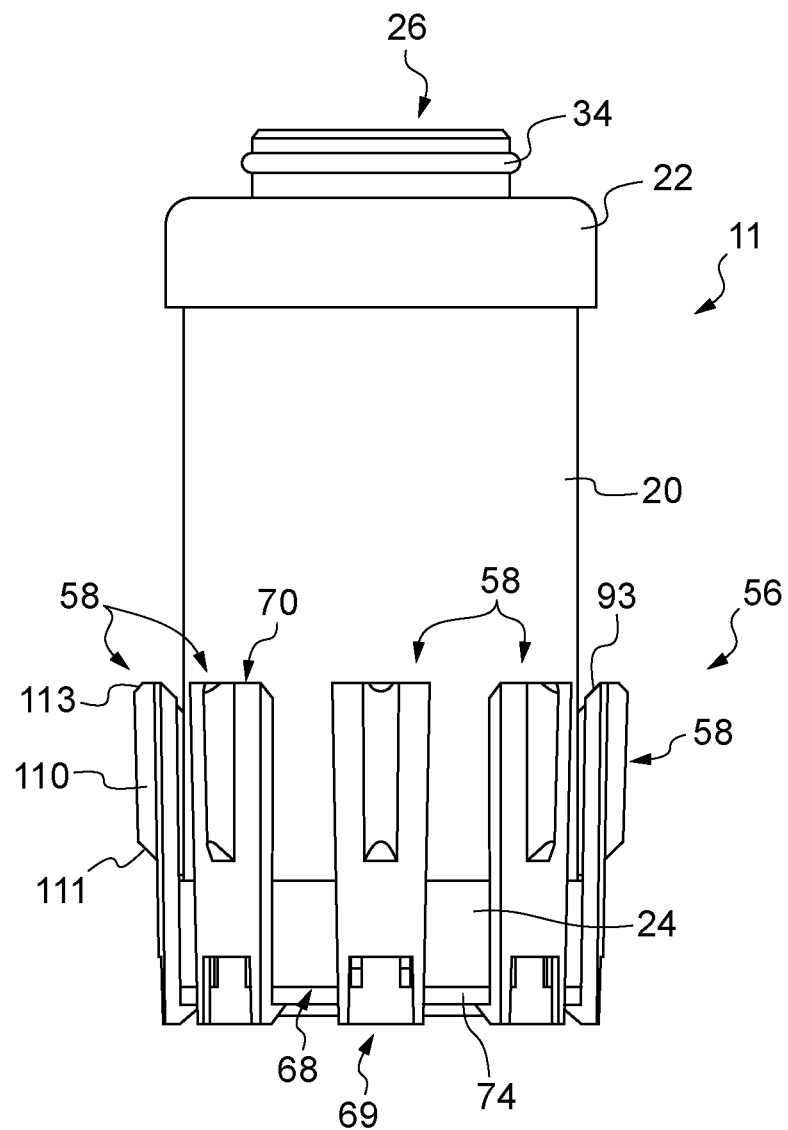
FIG. 7 is a front view of the filter element assembly shown in FIG. 1.

The filter element assembly 10 of the present disclosure also comprises a drainage promoter, which is indicated in the drawings by reference numeral 56. The drainage promoter 56 is shown separately in the perspective view of FIG. 3, as well as in the front and plan views of FIGS. 4 and 5. FIGS. 6 and 7 are also referred to, which are perspective and front views of the filter element assembly 10.

The drainage promoter 56 comprises at least one fin, and in the illustrated embodiment comprises a plurality of fins, each of which is indicated by reference numeral 58. The drainage promoter 56 can be fitted to the filter element 11 so that it extends at least part way along the element and compresses the drainage layer 20 along at least part of its length, to promote drainage of liquid which has collected in the drainage layer. Compression of the drainage layer 20 by the fins 58 serves to break surface tension in the external surface 48 of the drainage layer, to promote flow of oil in the drainage layer towards the fins 58, for subsequent drainage from the filter element 11.

The filter element 11 and the drainage promoter 56 are connected to one another in such a way that the filter element and the drainage promoter can be manipulated by a user as a unitary component, for positioning in the filter housing 12. This may facilitate both location of the filter element assembly 10 in the filter housing 12, and removal of the assembly from the housing when replacement of the filter element 11 is required, for example when the drainage layer has become blocked with contaminants (causing an increase in the pressure drop across the element). In addition, the drainage promoter 56 may be fitted to the filter element 11 in such a way that the drainage promoter can be re-used, by releasing it from the old filter element and fitting it to a replacement element which is to be located in the housing 12.

In the illustrated embodiment, the drainage promoter 56 comprises a support 60, the fins 58 being coupled to the support and extending in a direction along the filter element 11, when the drainage promoter is connected to the filter element. The fins 58 are at least partially resiliently deformable, so that they can pass over one of the end caps 22 or 24, for fitting the fins to the filter element 11. In this embodiment, the drainage promoter 56 is fitted over the second end cap 24, which forms a lower end cap during normal use of the filter 14 (in which it is disposed in a substantially vertical orientation). The fins 58 each comprise a latch feature 62 for engaging the filter element 11, to fit the fins to the element and to retain the drainage promoter 56 on the element.

The drainage promoter 56 can be quickly and easily connected to the filter element 11, to fit the fins 58 to the element. This can be achieved by introducing the drainage promoter 56 to the second end cap 24 and pressing the end cap into a space 64 defined by or between the fins 58, to cause the fins to engage the filter element 11. The fins 58 are deflected radially outwardly during fitting of the drainage promoter 56 to the end cap 24 and provide a snap-fit with the end cap so that they are secured to the filter element 11. When the fins 58 are fitted to the filter element 11, the latch features 62 engage over an edge surface 66 of the second end cap 24 which is disposed axially inwardly from an end 68 of the filter element 11 defined by the end cap 24. This is best shown in FIG. 1, but also in the perspective view of FIG. 6 and the front view of FIG. 7.

Figure 3:
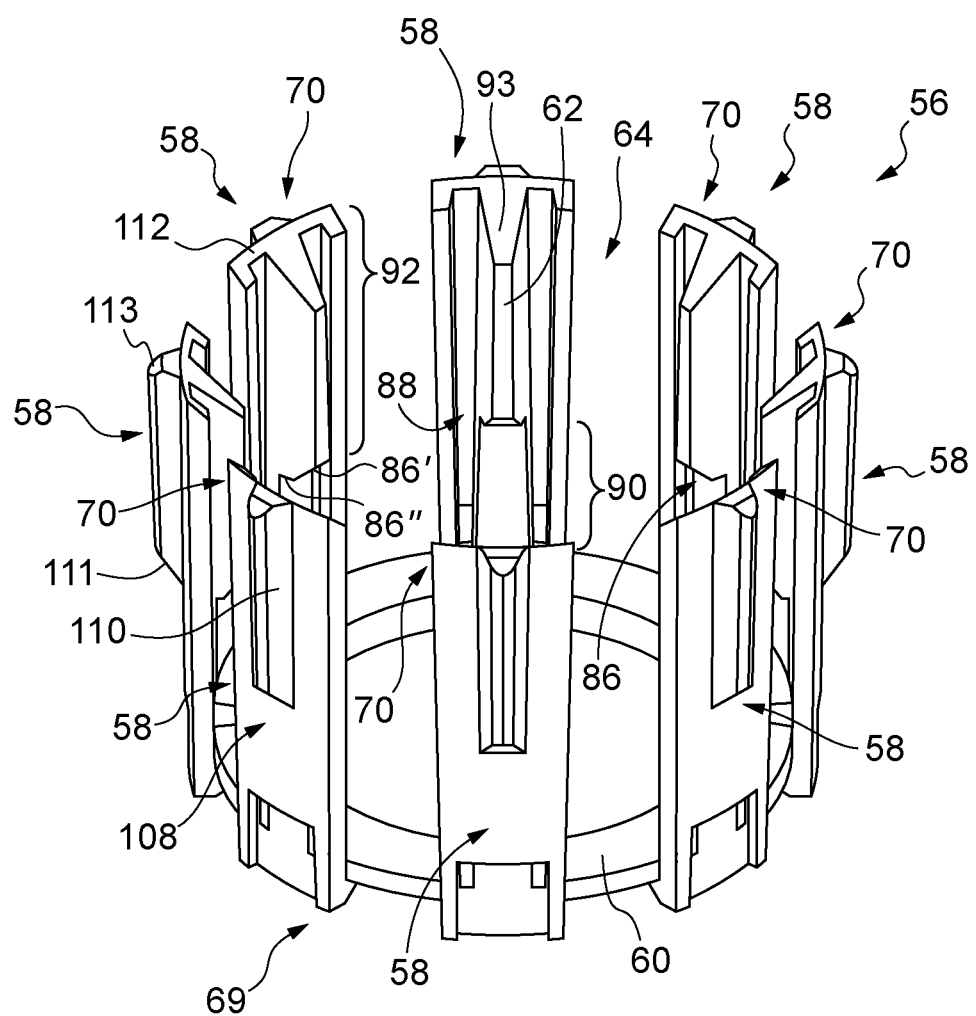
FIG. 3 is a perspective view of a drainage promoter forming part of the filter element assembly of FIG. 1.

The drainage promoter 56 is generally cup-shaped or cage-shaped, as can best be appreciated from FIG. 3. The drainage promoter 56 has a base which is defined by the support 60, and a side or sides which are defined by the fins 58, the support and the fins together defining the cup or cage. The drainage promoter 56 has a rest or undeformed state (FIG. 3), which it adopts in the absence of a force which is imparted on the fins 58 during connection of the drainage promoter 56 to the filter element 11, which resiliently deforms the fins. The fins 58 are elongate and have first ends 69 and second ends 70. The fins 58 are coupled to the support at their first ends 69, and the second ends 70 are free ends, the fins being capable of deflecting relative to the support 60 so that the free ends 70 move in a radially outward direction.

When the drainage promoter 56 is connected to the filter element 11, the second free ends 70 of the fins 58 are deflected outwardly, so that the fins can pass over the second end cap 24. The fins 58 bend or deform away from the positions which they adopt in the rest state of the drainage promoter 56 and are configured so that snap over the end cap 24, adopting a resiliently deformed position in which they press against the drainage layer 20 of the element. This is shown in FIG. 1, where it can be seen that the fins 58 are each deflected radially outwardly away from the drainage layer 20, the degree of deflection increasing towards their free ends 70. This has the result that the fins 58 compress the drainage layer 20 along parts of their lengths, along a zone 72 of the drainage layer which is shown in FIG. 1.

This compressive effect is achieved by appropriate dimensioning of the drainage promoter 56 relative to the filter element 11. Specifically, the fins 58 are arranged so that the space 64 which is defined between the fins has a maximum dimension $D_1$ (FIG. 5), in the rest state of the drainage promoter, which is less than an outer dimension $D_2$ (FIG. 1) defined or described by the filter element 11. In this way, the fins 58 are caused to compress the drainage layer 20 when they are fitted to the filter element 11. The maximum dimension $D_1$ of the space 64 is a diameter, and the outer dimension $D_2$ of the filter element 11 is similarly an outer diameter, defined or described by the drainage layer 20. The maximum dimension $D_1$ of the space 64, in the rest state, is also less than an outer dimension $D_3$ (FIG. 1, and which is also a diameter) defined or described by the second end cap 24, over which the fins pass 58 for fitting to the element 11.

The drainage promoter 56 is typically provided as a unitary or one-piece body comprising the support 60 and the fins 58, which may provide the advantage that it can be formed as a single part. The drainage promoter 56 may be moulded, for example injection moulded, and may be of a polymeric material. Suitable materials may include Nylon, ABS (Acrylonitrile Butadiene Styrene), Polypropylene and Acetal (POM, PolyOxyMethylene). Whilst provision of the drainage promoter 56 as a unitary body may be generally preferred, it will be appreciated that the support 60 and the fins 58 may be provided separately and coupled together.

As can be seen particularly in FIG. 1, the drainage promoter 56 is fitted to the filter element 11, in particular to the second end cap 24, so that the second end cap is located between the latch features 62 of the fins 58 and the support 60. A space or gap 74 exists between an axially outer surface 76 of the end cap 24, and an upper surface 78 of the support 60 which faces towards the filter element. The gap 74 facilitates drainage of liquid oil from the drainage layer 20, the liquid oil flowing from the fins 58 and on to the upper surface 78 of the support 60. The gap 74 provides an area in which liquid oil droplets can coalesce before flowing away from the filter element 11, through drainage channels 80 which extend through the support, as best shown in FIGS. 1 and 5. Drainage channels 80 are provided for each fin 58, and are arranged relative to the fins so as to promote flow from the fin and through the support 60, suitably by aligning the channels with longitudinal axes of the fins.

In a variation on the illustrated embodiment, the support 60 may be configured to abut the second end cap 24, the upper surface 78 then defining an abutment surface which faces towards the end cap. The second end cap 24 may then be sandwiched or clamped between the fin latch features 62 and the upper surface 78 of the support 60. The latch features 62 and the upper surface 78 of the support 60 may cooperate to exert a compressive loading or clamping force on the end cap 24, which may facilitate connection of the drainage promoter 56 and the filter element 11.

The latch features 62 of each fin 58 are spaced along a length of the fin from the support 60, specifically from its upper surface 78. The support 60 has an outer periphery 82, and is generally annular or ring shaped, thus having an outer periphery which is generally circular in plan view. The fins 58 each extend from the support 60 at the outer periphery 82 and are evenly spaced around the periphery. As can best be seen in FIG. 4, the support 60 is disposed generally in a plane 84. The fins 58 are disposed transverse to the plane 84, and in the illustrated embodiment are disposed substantially perpendicular to the plane.

The number of fins 58 that are provided may be selected according to factors including: a dimension of the filter element 11, in particular a diameter and/or circumference of the filter element (where it is generally cylindrical in shape); a drainage promotion effect that it is desired to provide on the drainage layer 20; and/or a desired flow path for gas around the external surface 48 of the filter element 11 when the element is located in the filter housing 12, the flow path being defined between the inner surface 50 of the housing and the external surface 48 of the filter element.

In the illustrated embodiment, the latch feature 62 on each fin 58 takes the form of a finger or arm. The latch feature 62 comprises a surface 86 which abuts the filter element 11, in particular the edge surface 66 of the second end cap 24, when the fin 58 is fitted to the element as shown in FIG. 1. The surface 86 includes an inclined or tapered surface portion 86' which facilitates deflection of the fin 58 so that it can travel over the end cap 24 during fitting to the filter element 11, and an abutment surface portion 86" which abuts the edge surface 66 of the end cap. The abutment surface portion 86" is substantially perpendicular to an axis of the fin 58, to provide a good abutment with the edge surface 66. The latch feature 62 snaps over the end cap 24 so that the surface 86 of the latch feature comes into contact with the edge surface 66 of the end cap when the end cap has been pressed a sufficient distance into the space 64 defined between the fins 58. Contact between the latch feature surface portion 86" and the end cap 24 then secures the fin 58 to the filter element 11, resisting their separation.

The fins 58 each comprise an inner surface 88 which faces generally towards the filter element 11 when the fin is fitted to the element. The fins each comprise a first part 90 defining a first portion of the inner surface 88, and a second part 92 defining a second portion of the inner surface. The second part 92 of the inner surface 88 extends radially inwardly towards the drainage layer 20, away from the first part 90, when the fin 58 is fitted to the filter element 11. The first part 90 provides a detent or recess which receives the second end cap 24 when the drainage promoter 56 is connected to the filter element 11, the latch feature surface 86 snapping over the edge surface 66 of the end cap to engage the element. The second part 92 also includes an inclined or tapered lead-in surface 93, which aids fitting of the fin 58 to the end cap 24, contact between the inclined surface 93 and the second end cap 24 serving to deflect the fin radially outwardly so that it can pass over the end cap to its FIG. 1 position.

The fins 58 each comprise a drainage protrusion, which defines the second part 92 of the inner surface 88. In the illustrated embodiment, the drainage protrusion is provided by the latch feature 62. The drainage protrusion 62 extends into the external surface 48 of the drainage layer 20 when the fin 58 is fitted to the filter element 11, as can be seen in FIG. 1. The drainage protrusion 62 extends inwardly so that a radially inner extent of the protrusion is located within an outer circumference described by the drainage layer 20. The inner extents of the drainage protrusions 62 of the fins 58 intersect with a circle which has the diameter $D_1$, and which is smaller than the outer diameter $D_2$ described by the drainage layer 20.

The fins 58 each comprise at least one drainage channel or passage which extends part way along a length of the fin, and in the illustrated embodiment comprise two drainage channels 94 and 96. The drainage channels 94 and 96 are substantially parallel to the fin longitudinal axis and are disposed on or in the inner surface 88 of the fin 58 which faces generally towards the filter element 11 when the fin is fitted to the element. This may provide the advantage that liquid oil which has drained from the drainage layer 20 on to the fin 58 may pass into the drainage channels 94 and 96 for discharge from the fin. As the drainage channels 94 and 96 are on or in the inwardly facing surface 88, this may shield the liquid oil from gas flowing around the filter element 11, resisting re-entrainment of the liquid in the gas flow.

As best shown in FIG. 5, the drainage channels 94 and 96 are defined by recesses in the inner surface 88, and the fin 58 comprises a protrusion 98 which extends inwardly towards the filter element 11. The protrusion 98 has at least one flank, and in the illustrated embodiment comprises first and second flanks 100 and 102, extending in a direction along the length of the fin 58. The first drainage channel 94 is defined at an intersection between the flank 100 and an adjacent portion 104 of the fin, whilst the second drainage channel 96 is defined at an intersection between the flank 102 and a second adjacent portion 106. The drainage channels 94 and 96 extend along the fin 58 to the support 60, so that liquid oil can flow from the drainage layer 20 into the channels, the liquid oil then flowing under gravity along the channels to discharge on to the upper surface 78 of the support 60. The channels 94 and 96 extend along the outer surface of the second end cap 24 so that the liquid oil can bypass the cap and flow to the support 60. Liquid oil on the support surface 78 can then flow through a drainage channel 80 in the support and so into the sump 45.

The fins 58 each comprise a surface 108 which faces generally away from the filter element 11, when the fin is fitted to the filter element, to form an outer surface. The fins 58 are each configured to cooperate with the filter housing 12, specifically its internal surface 50, so that they are urged inwardly to compress the drainage layer 20, or to enhance a compressive loading applied to the drainage layer depending upon relative dimensions of the components. An abutment portion 110 extends from the outer surface 108 to form an outer abutment surface of the fin 58. Outer extents of the fins 58 defined by the abutment portions 110 intersect with a circle having a diameter $D_4$ (FIG. 5) which is larger than an internal diameter (not shown) described by an adjacent portion of the filter housing 12. This provides an interference fit between the filter element assembly 10 and the internal surface 50 of the housing 12, so that the fins 58 are urged inwardly to compress the drainage layer 20 (or to enhance a compressive loading applied to the drainage layer by the fins). The abutment portion 110 has inclined or tapered leading and trailing surfaces 111 and 113, considered relative to a direction of insertion of the filter element assembly 10 into the housing 12, which may facilitate insertion of the assembly into the housing and removal of the assembly from the housing, when required.

The abutment portion 110 takes the form of a protrusion which defines the outer abutment surface, the abutment portion extending part way along a length of the fin 58 from its free end 70. The fins 58 are each generally T-shaped in cross-section, in their second portions 92, comprising an outer part 112 which defines a top of the T, and an inner part which is provided by the protrusion 98, and which is connected to the outer part 112 to define a leg of the T. The inner part 98 is disposed transverse to the outer part 112, and is suitably substantially perpendicular, although as can be seen in FIGS. 3 and 5, the flanks 100 and 102 of the protrusion forming the inner part 98 are tapered or inclined in a radially inward direction, towards the filter element 11. The first drainage channel 94 is defined at an intersection between the first flank 100 of the inner part 98 and the outer part 112, and the second drainage channel 96 is defined at an intersection between the second flank 102 of the inner part 98 and the outer part 112.

Each fin 58 has a depth, taken in a direction transverse to its longitudinal axis, from the outer surface 108 of the fin to its inner surface 88. A depth di (FIG. 1) of the second part 92 of the fin including the drainage protrusion 98 and the abutment portion 110 is greater than a depth $d_2$ of the part 90 of the fin which forms the recess or detent. In this away, the drainage protrusion 98 extends into the external surface 48 of the drainage layer 20, when the fin 58 is fitted to the filter element 11. It will be noted here that the depth di is taken between the innermost extent of the drainage protrusion 98 and the outermost extent of the abutment portion 110. However, the depth may be taken between the innermost extent of the drainage protrusion 98 and the main outer surface part 108 of the fin 58, excluding the abutment portion 110. Indeed, and as will be described below, further embodiments of drainage promoter fin may be provided without such an abutment portion.

As discussed above, the drainage promoter 56 can readily be fitted to the filter element 11 and facilitates drainage of liquid contaminants from the gas stream flowing through the filter 14. The drainage promoter 56 may be capable of being fitted to existing filter elements, and so with little or no modifications required to the structure of the filter element. However, in this or other embodiments, modifications may be required including to the end cap that the promoter is to be fitted to.

Figure 8:
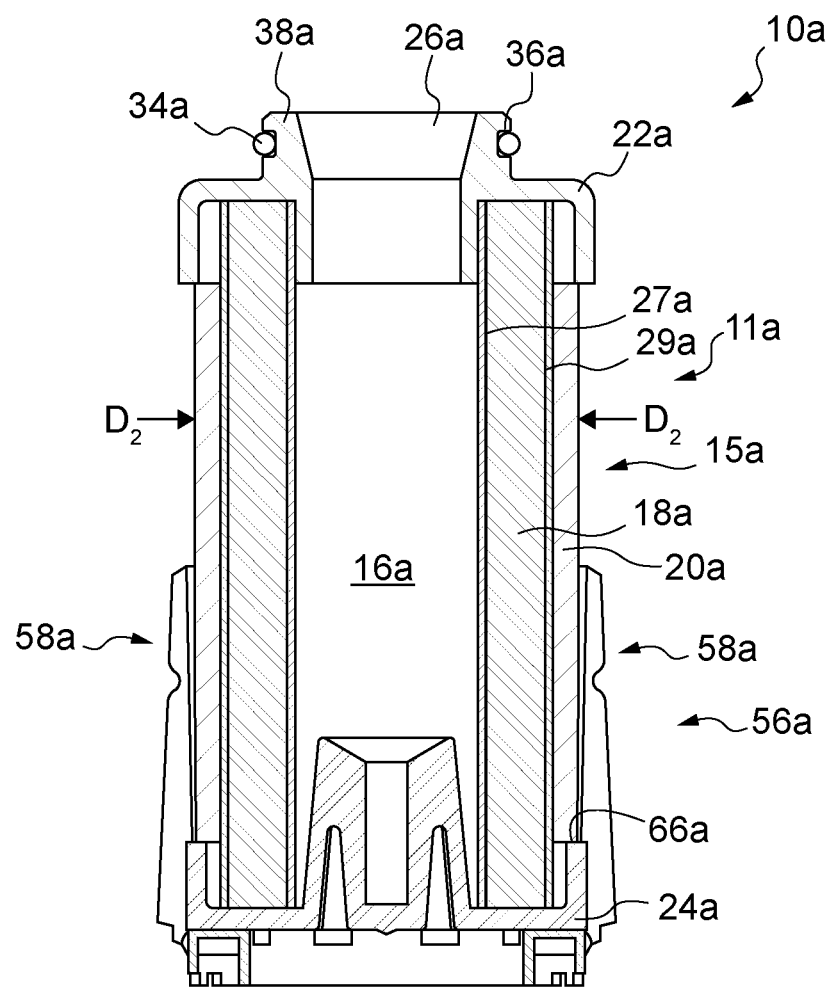
FIG. 8 is a longitudinal cross-sectional front view of a filter element assembly in accordance with another embodiment of the present disclosure.

Turning now to FIG. 8, there is shown a longitudinal cross-sectional front view of a filter element assembly in accordance with another embodiment of the present disclosure, the filter element assembly indicated generally by reference numeral 10a. The filter element assembly 10a comprises a filter element 11a and a drainage promoter 56a. Like components of the filter element 10a with the filter element assembly 10 shown in FIGS. 1 to 7 share the same reference numerals, with the addition of the suffix "a".

The filter element 11a is of substantially the same construction as the filter element 11 shown in FIGS. 1 to 7 and described above. Accordingly, details of the construction and operation of the filter element 11a will not be described again in detail, reference instead being made to the discussion of the filter element 11 forming part of the filter element assembly 10 described above. Accordingly, only substantial differences between the filter element 11a and the filter element 11 shown in FIGS. 1 to 7 will be described herein. In addition, the filter element assembly 10a can be located in a housing of a filter such as the housing 12 of the filter 14 shown in FIG. 2. Reference will therefore be made to the filter 14 for a discussion of the way in which the filter element assembly 10a is located in a filter housing, and the way in which it operates during use.

The filter element 11a comprises a wall 15a of a filtration medium defining a hollow space 16a, the filtration medium including a filtration layer 18a and a drainage layer 20a. The filter element 11a also comprises first and second end caps 22a and 24a at opposite ends of the wall 15a, the first end cap including a port 26a for the gas stream to flow into the filter element. Once again, in normal use the filter element 11a will be substantially vertically oriented, so that the first end cap 22a forms an upper end cap, and the second end cap 24a a lower end cap. Perforated tubular supports 27a and 29a serve for securing the filtration layer 18a and the drainage layer 20a to the end caps 22a and 24a and separating the different layers. The first end cap 22a comprises an O-ring seal 34a, which is mounted in a groove 36a defined in a tubular wall 38a of the end cap defining the port 26a. The O-ring seal 34a serves for sealing the filter element 11a relative to the filter head 13.

The second end cap 24a differs from the end cap 24 forming part of the filter element 11 shown in FIG. 1 in that it comprises at least one engaging feature, the illustrated embodiment comprising a plurality of engaging features 114 which are spaced around a perimeter of the end cap. The engaging features comprise alternating male engaging features in the form of protrusions such as a tooth or key 114, and female engaging features in the form of a recesses, channels or apertures 115. As will be described below, the engaging features 114 and 115 on the second end cap 24a are arranged to cooperate with corresponding engaging features provided on the drainage promoter 56a. The second end cap 24a, defining the various protrusions 114, can be considered to be generally castellated.

The drainage promoter 56a forming part of the filter element assembly 10a shown in FIG. 8 differs somewhat from the drainage promoter 56 forming part of the filter element assembly 10 shown in FIG. 1. Again, only substantive differences between the drainage promoter 56a and the drainage promoter 56 shown in FIGS. 1 to 7 will be described herein in detail.

In this embodiment, the drainage promoter 56a comprises at least one fin 58a which can be fitted to the filter element 11, and in the illustrated embodiment comprises a plurality of fins 58a. The drainage promoter 56a also comprises a support 60a, as best shown in the perspective view of FIG. 10, where the drainage promoter is shown separately from the filter element 11a. The fins 58a are each coupled to the support 60a via a hinge 116, so that the fin can be pivoted between a disengaged position shown in FIGS. 9 and 10, and an engaged position in which the fin 58a can engage the filter element 11a so that the fin is fitted to the filter element. The fins 58a each comprise a latch feature 62a for engaging the filter element 11a, as will be described in more detail below.

The support 60a comprises an outer periphery 82a, and is generally annular or ring-shaped, so that the outer periphery is generally circular in plan view. The fins 58a each extend from the support 60a at the outer periphery 82a at a different location around its outer periphery. The fins 58a are suitably evenly spaced around the periphery 82a of the support 60a, as best shown in the plan view of the filter element assembly 10a in FIG. 11. The fins 58a each have first ends 69a and second ends 70a and are connected to the support 60a at their first ends. The second ends 70a therefore form free ends of the fins 58a. The hinge 116 of each fin 58a is formed between the support 60a and the first end 69a of the fin and is provided at the outer periphery 82a of the support. The hinge 116 is suitably a living hinge defined by the drainage promoter 56a. However, it will be understood that the fins 58a and the support 60a may be provided separately and coupled to one another via a suitable hinge.

Figure 10:
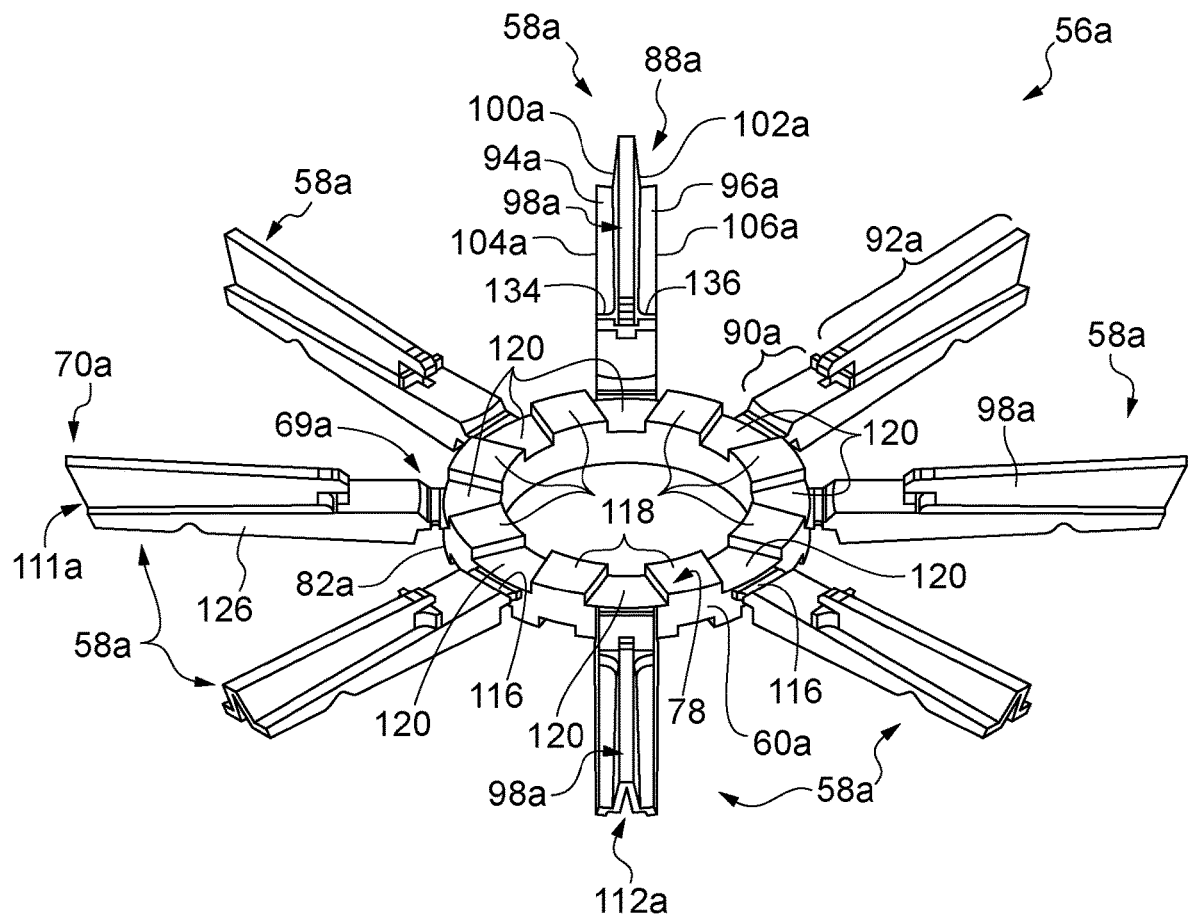
FIG. 10 is a perspective view of the drainage promoter of FIG. 9, shown separately from a filter element of the assembly.
Figure 11:
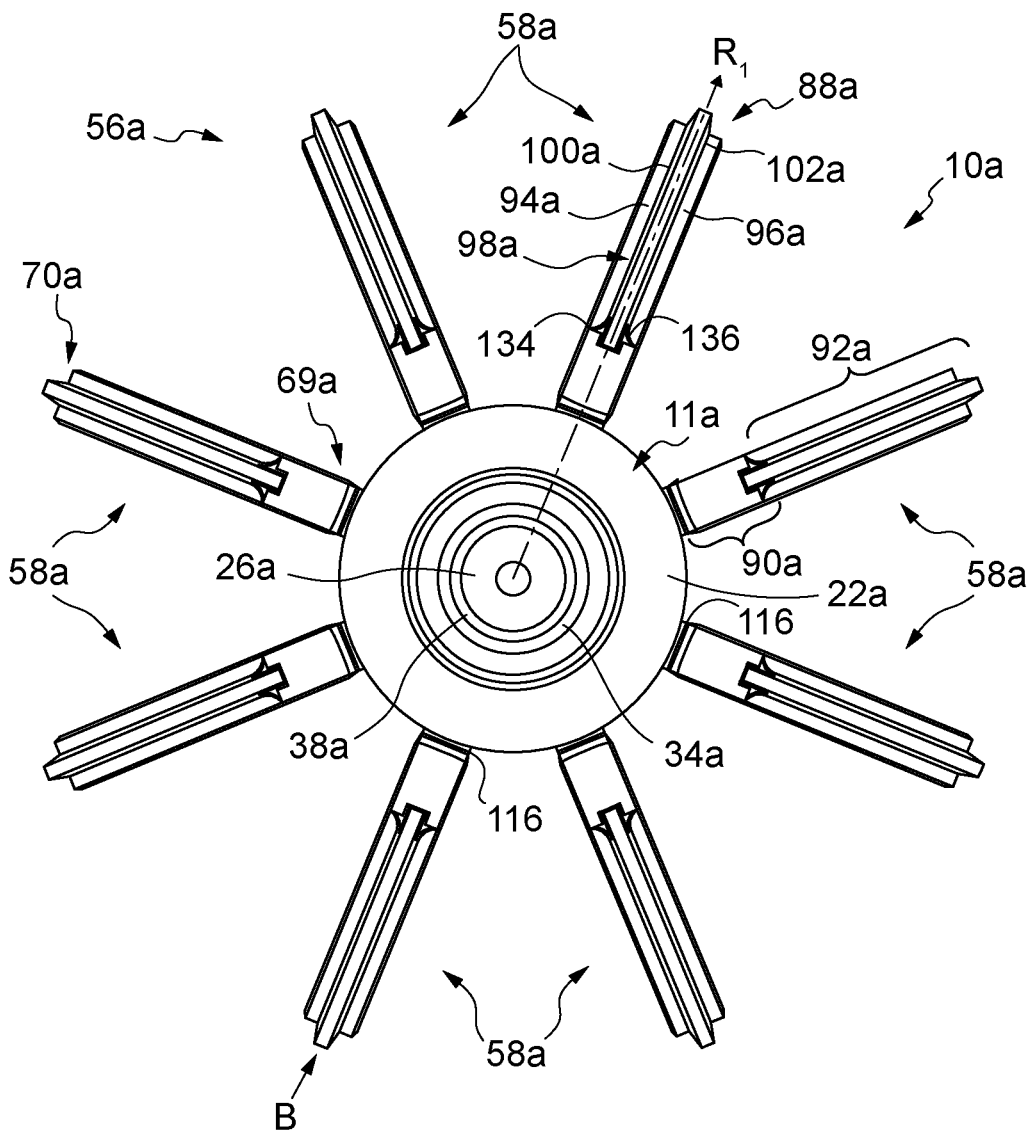
FIG. 11 is a plan view of the filter element assembly of FIG. 8.

As best shown in FIG. 10, the fins 58a are each arranged so that, in their disengaged positions, they are each substantially aligned with a respective radius of the support 60a, one such radius $R_1$ being shown in FIG. 11. With the fins 58a in their disengaged positions, the drainage promoter 56a forms a spider, or may be considered to be generally spider shaped.

Figure 12:
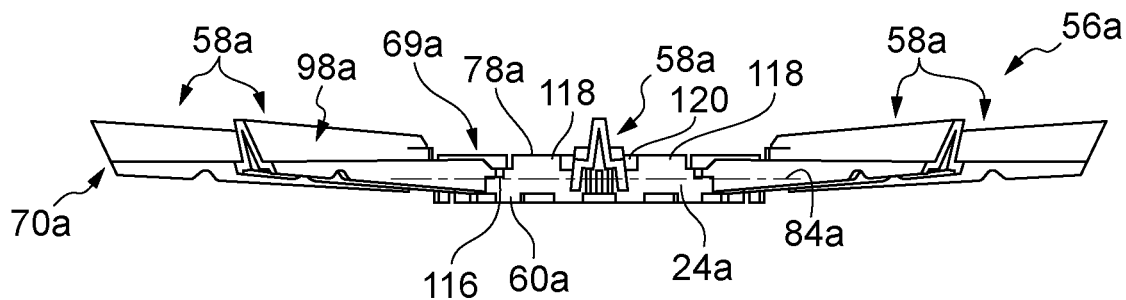
FIG. 12 is a front view of the drainage promoter of FIG. 9, shown separately from the filter element.
Figure 13:
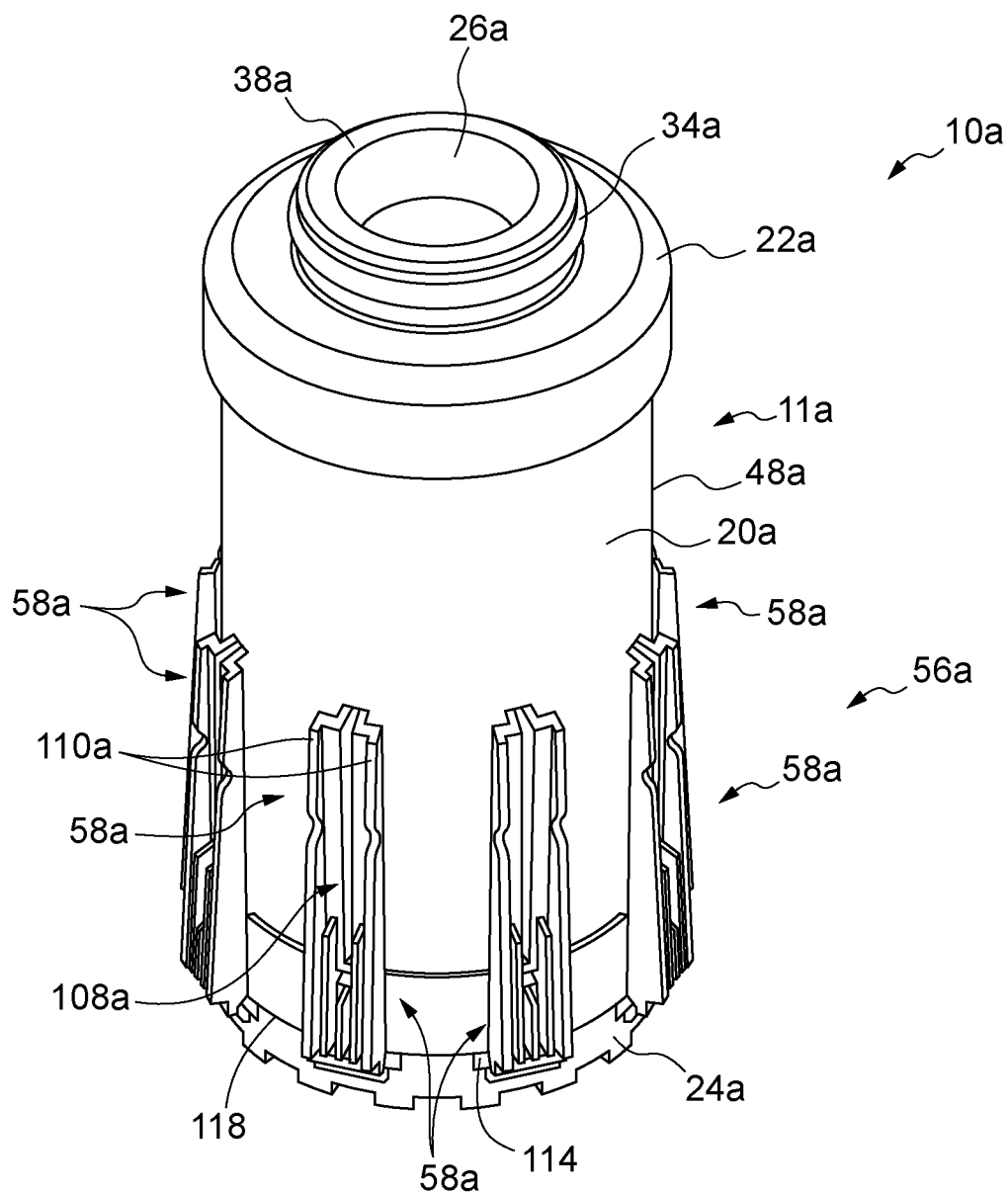
FIG. 13 is a perspective view of the filter element assembly of FIG. 8, showing the drainage promoter of the assembly with its fins in engaged positions.

The drainage promoter 56a is also shown in the front view of FIG. 12, which is taken in the direction of the arrow B in FIG. 11. As can be seen from this drawing, the support 60a is disposed generally in a plane 84a and, when the fins 58a are in their disengaged positions, the fins are disposed substantially in the plane 84a. However, when the fins 58a are in their engaged positions shown in FIG. 8, and in the perspective view of FIG. 13, the fins are disposed transverse to the plane 84a, and are suitably disposed substantially perpendicular to the plane.

The drainage promoter 56a is typically provided as a unitary or one-piece body comprising the support 60a and the fins 58a, which may provide the advantage that it can be formed as a single part. The drainage promoter 56a may be moulded, for example injection moulded, and may be of a polymeric material. Suitable materials may include Nylon, ABS (Acrylonitrile Butadiene Styrene), Polypropylene and Acetal (POM, PolyOxyMethylene). Whilst provision of the drainage promoter 56a as a unitary body may be generally preferred, it will be appreciated that the support 60a and the fins 58a may be provided separately and coupled together.

Figure 9:
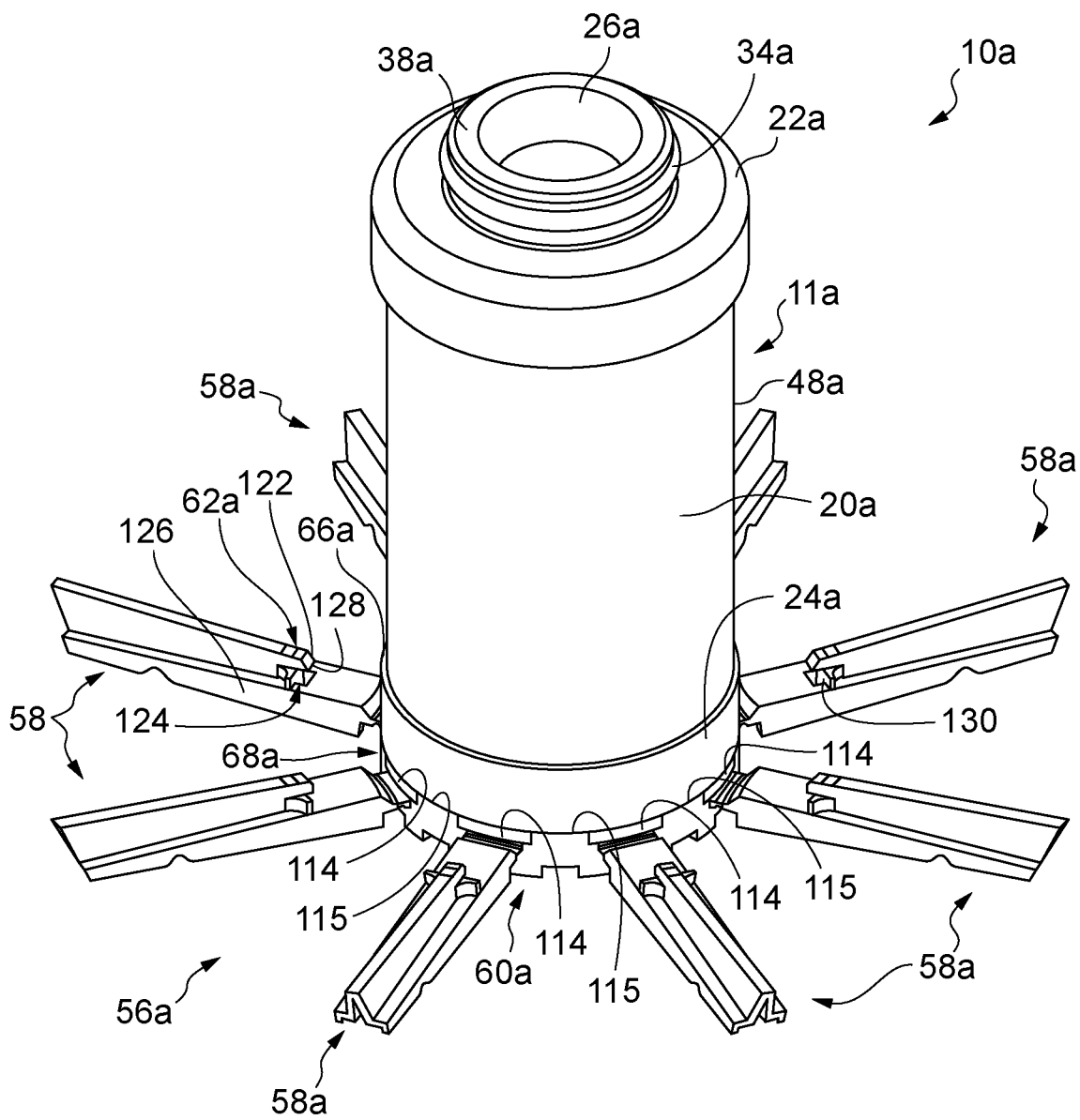
FIG. 9 is a perspective view of the filter element assembly of FIG. 8, showing a drainage promoter of the assembly with fins of the drainage promoter in disengaged positions.

As best shown in FIGS. 8 and 9, the support 60a is configured to be fitted to the filter element 11a, in particular to an end surface 68a of the filter element 11a defined by the second end cap 24a. The support 60a is configured to abut the second end cap 24a and comprises at least one engaging feature. In the illustrated embodiment, the support 60a comprises a plurality of male engaging features 118 in the form of protrusions such as a tooth or key, and a plurality of female engaging features in the form of a recess, channel or aperture 120. The protrusions 118 and the recesses 120 alternate around a perimeter of the support 60a. The protrusions 118 on the support 60a cooperate with the recesses 115 in the second end cap 24a, and the recesses 120 in the support cooperate with the protrusions 114 on the second end cap, to restrict movement of the support relative to the filter element 11a. Specifically, the engaging features cooperate to restrict rotation of the support 60a, and so the drainage promoter 56a, relative to the second end cap 24a, when the fins 58a have been fitted to the filter element. As with the second end cap 24a, the support 60a may be considered to be generally castellated so as to define its engaging features 118 and 120.

The support 60a comprises an upper surface 78 which is defined by the protrusions 118 and recesses 120, the surface facing towards the second end cap 24a of the filter element 11 when the drainage promoter 56a is connected to the element. When the fins 58a are in their engaged positions of FIG. 8, the second end cap 24a is located between the latch features 62a of the fins and the support 60a and is sandwiched or clamped between the latch features 62a and the upper surface 78 of the support. The latch features 62a and the upper surface 78 of the support 60a may cooperate to exert a compressive loading or clamping force on the end cap 24a, which may facilitate connection of the drainage promoter 56a and the filter element 11a, and handling of the filter element assembly 10a as a unitary component. However, if desired, a degree of play may be provided between the drainage promoter 56a and the second end cap 24a, for example by providing a small spacing or gap between the upper surface 78 of the support 60a, and the end surface 68 of the end cap.

The latch feature 62a on each fin 58a is resiliently deformable, which facilitates engagement of the filter element 11a by the fin 58a in a snap-fit. This may be achieved either by providing just the latch feature 62a so that it is resiliently deformable, or by providing the entire fin 58a of a material which is resiliently deformably. The latch feature 62a is configured to engage an edge surface 66a of the second end cap 24a, which is disposed axially inwardly from the end 68a of the filter element 11a defined by the end cap. The latch feature is tapered, inclined, angled or chamfered to facilitate engagement of the filter element 11a. To this end, the latch feature 62a has a surface 122 which faces towards the filter element 11a, when the fin 58a is fitted to the element, and the surface 122 is tapered, inclined, angled or chamfered.

The latch feature 62a projects along the length of the fin 58a in a direction towards the support 60a, defining a recess or channel 124 for receiving the edge surface 66a of the second end cap 24a, when the fin 58a is fitted to the filter element 11a. The latch feature 62a also projects or extends away from a main part 126 of the fin 58a, and in the illustrated embodiment extends radially inwardly into the outer surface 48a of the drainage layer 20a, when the fin 58a is fitted to the filter element. An axial distance between an end 128 of the latch feature 62a, when the fin 58a is in its engaged position, and the surface 78a of the support 60a adjacent to the fin, is less than a axial length of the end cap 24a that the support is coupled to. This provides a snap-fit, through an interference fit between the latch feature 62a and the end cap 24a.

When the surface 122 of the latch feature 62a is brought into abutment with the end cap 24a, the surface 122 facilitates deflection or deformation of the latch feature 62a to provide the snap-fit. Specifically, the tapered surface 122 contacts the end cap 24a in the region of its edge surface 66, which helps the latch feature 62a to deform so that it can ride up and over the edge surface. The recess 124 which receives the edge surface 66a of the end cap 24a is disposed radially outwardly/behind the latch feature 62a, when the fin 58a is fitted to the filter element 11a. In this way, the latch feature 62a is disposed inwardly of the edge surface 66a of the end cap 24a.

The latch feature 62a takes the form of a finger or arm and includes a surface 130 which abuts the edge surface 66a of the end cap 24a, when the fin 58a is in its engaged position. Contact between the latch feature surface 130 and the end cap 24a secures the fin 58a to the filter element 11a. In their engaged positions, the fins 58a are arranged so that a space is defined between the fins (not shown, but equivalent to the space 64 defined between the fins 58 of the drainage promoter 56 shown in FIG. 1). The space has a maximum dimension which is less than an outer dimension $D_2$ (FIG. 8) defined or described by the filter element 11a. The fins 58a are therefore caused to compress the drainage layer 20a when they are fitted to the filter element 11a, and in their engaged positions. The maximum dimension of the space is again a diameter, whilst the outer dimension $D_2$ of the filter element 11a is also an outer diameter, described by the drainage layer 20a.

The fins 28a each comprise an inner surface 88a which faces generally towards the filter element 11a when the fin is fitted to the element. The fins 58a each comprise a first part 90a defining a first portion of the inner surface 88a, and a second part 92a defining a second portion of the inner surface. The second part 92a of the inner surface extends radially inwardly towards the drainage layer 20a, away from the first part 90a, when the fin 58a is fitted to the filter element 11a. The first part 90a provides a detent or recess which receives the second end cap 24a when the drainage promoter 56a is connected to the filter element 11a.

The fins 58a each comprise a drainage protrusion, which defines the second part 92a of the inner surface 88a. In the illustrated embodiment, the fin 58a comprises a drainage protrusion 98, with the latch feature 62a extending from the drainage protrusion. The drainage protrusion 98a extends into the external surface 48a of the drainage layer 20a when the fin 58a is fitted to the filter element 11a. The drainage protrusion 98a also extends inwardly so that a radially inner extent of the protrusion is located within an outer circumference described by the drainage layer 20a. Inner extents of the drainage protrusions 98a of the fins 58a intersect with a circle which has the diameter described above, and which is smaller than the outer diameter $D_2$ described by the drainage layer 20a. This serves to break surface tension in the drainage layer 20a and facilitates drainage of liquid oil from the layer.

The fins 58a each comprise at least one drainage channel or passage which extends part way along a length of the fin, and in the illustrated embodiment comprised two drainage channels 94a and 96a. The drainage channels 94a and 96a are substantially parallel to the longitudinal axis and are disposed on or in the inner surface 88a of the fin 58a which faces generally towards the filter element 11a. The protrusion 98a has at least one flank, and in the illustrated embodiment comprises first and second flanks 100a and 102a, extending in a direction along the length of the fin 58a. The first drainage channel 94a is defined at an intersection between the flank 100a and an adjacent portion 104a of the fin, whilst the second drainage channel 96a is defined at an intersection between the flank 102a and a second adjacent portion 106a. The drainage channels 94a and 96a extend along the fin 58a to the edge surface 66a of the second end cap 24a, flow diverters in the form of curved ramps 134 and 136 serving to deflect liquid oil flowing under gravity along the channels and off the fin 58a, for discharge into the sump 45.

The fins 58a each comprise a surface 108a which faces generally away from the filter element 11a when the fin is fitted, to form an outer surface. Abutment portions 110a extend from the outer surface 108a to form an outer abutment surface of the fin 58a. Outer extents of the fins 58a defined by the abutment portions 110a on the various fins intersect with a circle having a diameter (not shown but corresponding to the diameter $D_4$ in FIG. 5) which is larger than an internal diameter described by an adjacent portion of the filter housing 12. This provides an interference fit between the filter element assembly 10a and the internal surface 50 of the housing 12, so that the fins 58a are urged inwardly to compress the drainage layers 20a, or to enhance a compressive loading applied. The abutment portion 98a, and an end of the main part 126 of the fin 58a at its free end 70a, has an inclined or tapered leading surface 111a, which may facilitate removal of the assembly 10a from the housing 12, when required.

The fins 58a are each generally T-shaped in cross-section, in their second portions 92a, comprising an outer part 112a which defines a top of the T, and an inner part which is provided by the protrusion 98a, and which is connected to the outer part 112a to define a leg of the T. The inner part 98a is disposed transverse to the outer part 112a, and is suitably substantially perpendicular, although as can be seen particularly in FIGS. 9 and 10, the flanks 100a and 102a of the protrusion forming the inner part 98a are tapered or inclined in a radially inward direction, towards the filter element 11a.

The drainage promoter 56a can readily be fitted to the filter element 11a and facilitates drainage of liquid contaminants from the gas stream flowing through the filter 14. The drainage promoter 56a may be fitted to the filter element 11a by introducing the support 60a to the second end cap 24a and aligning the male protrusions 118 on the support 60a with the female recesses 115 on the second end cap 24a, and the male protrusions 114 on the second end cap 24a with the female recesses 120 on the support 60a. The fins 58a may then be pivoted from their disengaged positions shown in FIG. 9 to their engaged positions shown in FIG. 8, the latch feature 62 snap-fitting over the upper edge surface 66a of the second end cap 24a to secure the drainage promoter 56a to the filter element 11a. The latch feature 62a may be capable of deflecting so that the drainage promoter 56a can be released from the second end cap 26a if required, by passing back over the edge surface 66a.

Figure 14:
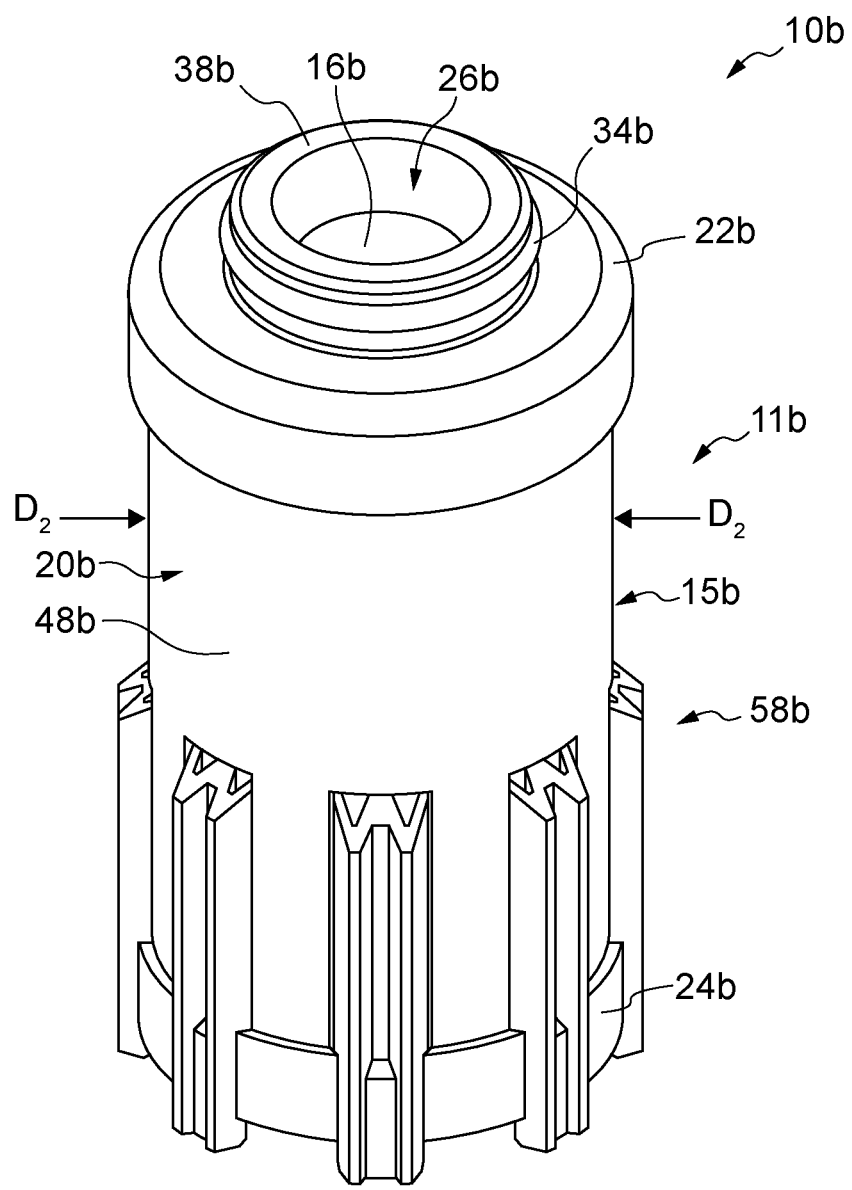
FIG. 14 is a perspective view of a filter element assembly in accordance with another embodiment of the present disclosure.

Turning now to FIG. 14, there is shown a perspective view of a filter element assembly in accordance with another embodiment of the present disclosure, the filter element assembly indicated generally by reference numeral 10b. The filter element assembly 10b comprises a filter element 11b and a drainage promoter 56b. Like components of the filter element 10b with the filter element assembly 10 shown in FIGS. 1 to 7 share the same reference numerals, with the addition of the suffix "b".

The filter element 11b is of substantially the same construction as the filter element 11 shown in FIG. 1 and described above. Accordingly, the construction and operation of the filter element 11b will not be described again in detail, reference instead being made to the discussion of the filter element 11 forming part of the filter element assembly 10 shown in FIGS. 1 to 7 and described above. Only substantial differences between the filter element 11b and the filter element 11 shown in FIGS. 1 to 7 will be described herein. The filter element assembly 10b can be located in a housing of a filter such as the housing 12 of the filter 14 shown in FIG. 2. Reference will therefore be made to the filter 14 for a discussion of the way in which the filter element assembly 10b is located in a filter housing, and the way in which it operates during use.

The filter element 11b comprises a wall 15b of a filtration medium defining a hollow space 16b, the filtration medium including a filtration layer (not shown) and a drainage layer 20b. The filter element 11b also comprises first and second end caps 22b and 24b at opposite ends of the wall 15b, the first end cap including a port 26b for the gas stream to flow into the filter element. Once again, in normal use the filter element 11b will be substantially vertically oriented, so that the first end cap 22b forms an upper end cap, and the second end cap 24b a lower end cap. Perforated tubular supports (not shown) serve for securing the filtration layer and the drainage layer 20b to the end caps 22b and 24b and separating the different layers. The first end cap 22b comprises an O-ring seal 34b, which is mounted in a groove (not shown) defined in a tubular wall 38b of the end cap defining the port 26b. The O-ring seal 34b serves for sealing the filter element 11b relative to the filter head 13.

The drainage promoter 56b forming part of the filter element assembly 10b shown in FIG. 14 differs from the drainage promoter 56 forming part of the filter element assembly 10 shown in FIG. 1. Again, only substantive differences between the drainage promoter 56b and the drainage promoter 56 shown in FIGS. 1 to 7 will be described herein in detail.

Figure 18:
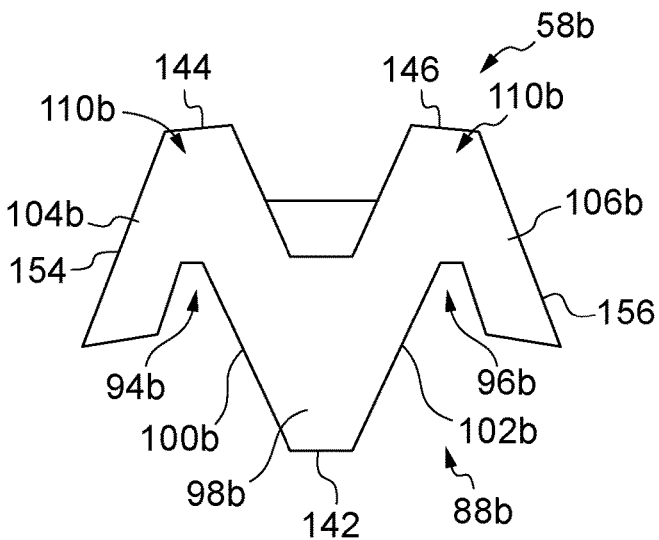
FIG. 18 is a further enlarged plan view of the drainage fin shown in FIGS. 15 to 17.
Figures 15, 16, 17:
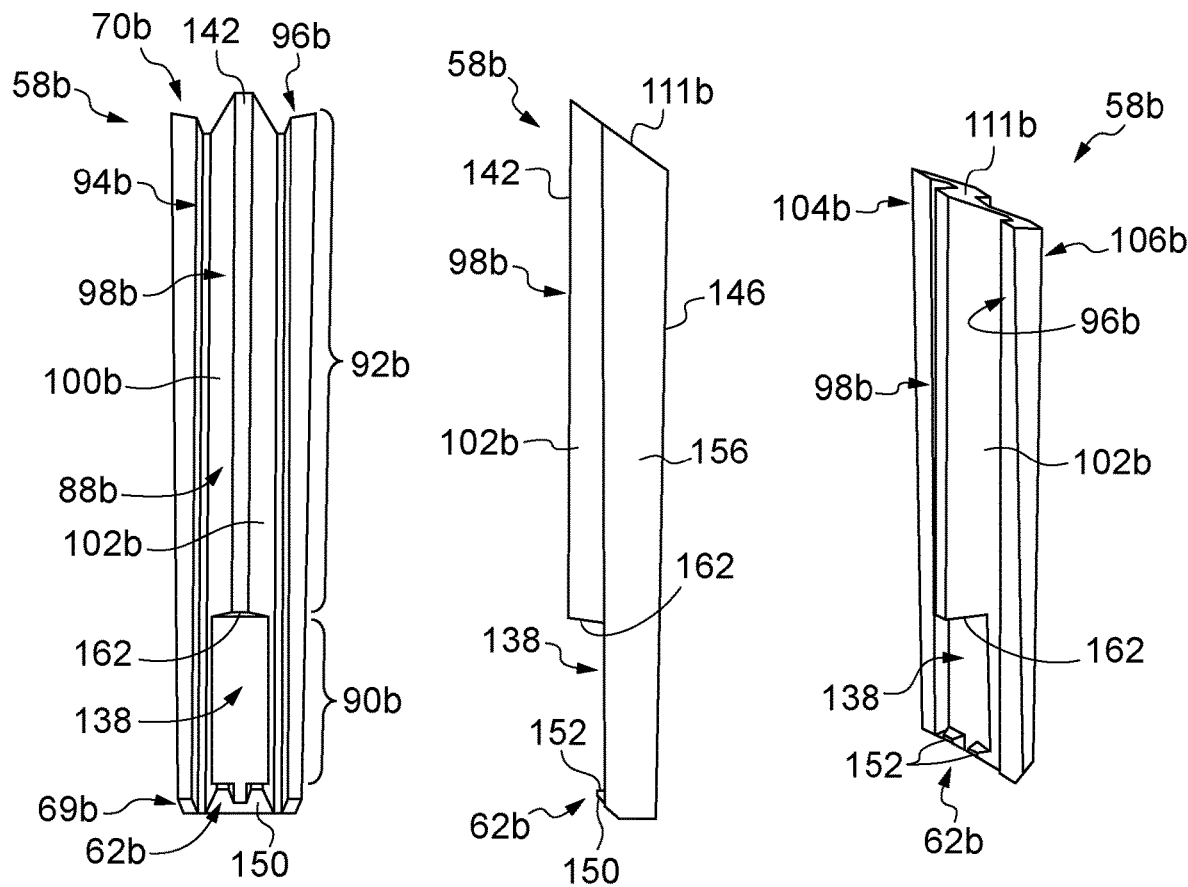
FIG. 15 is an enlarged front view of a fin forming part of a drainage promoter of the filter element assembly shown in FIG. 14.
FIG. 16 is a side view of a fin forming part of a drainage promoter of the filter element assembly shown in FIG. 14.
FIG. 17 is a perspective view of a fin forming part of a drainage promoter of the filter element assembly shown in FIG. 14.

In this embodiment, the drainage promoter 56b comprises at least one fin 58b which can be fitted to the filter element 11b, and in the illustrated embodiment comprises a plurality of fins 58b. The fin 58b is shown separately in the enlarged front, side and perspective views of FIGS. 15, 16 and 17, as well as in the further enlarged plan view of FIG. 18. The fins 58b each comprise a surface 88b which faces generally towards the filter element 11b when the fin is fitted to the filter element, and a detent 138 in the surface. The detent 138 is configured so that one of the end caps 22b and 24b is a snap-fit in the detent when the drainage promoter 56b is slid on to the filter element 11b, over that end cap. In the illustrated embodiment, the second end cap 24b is a snap-fit in the detent 138.

Figure 19:
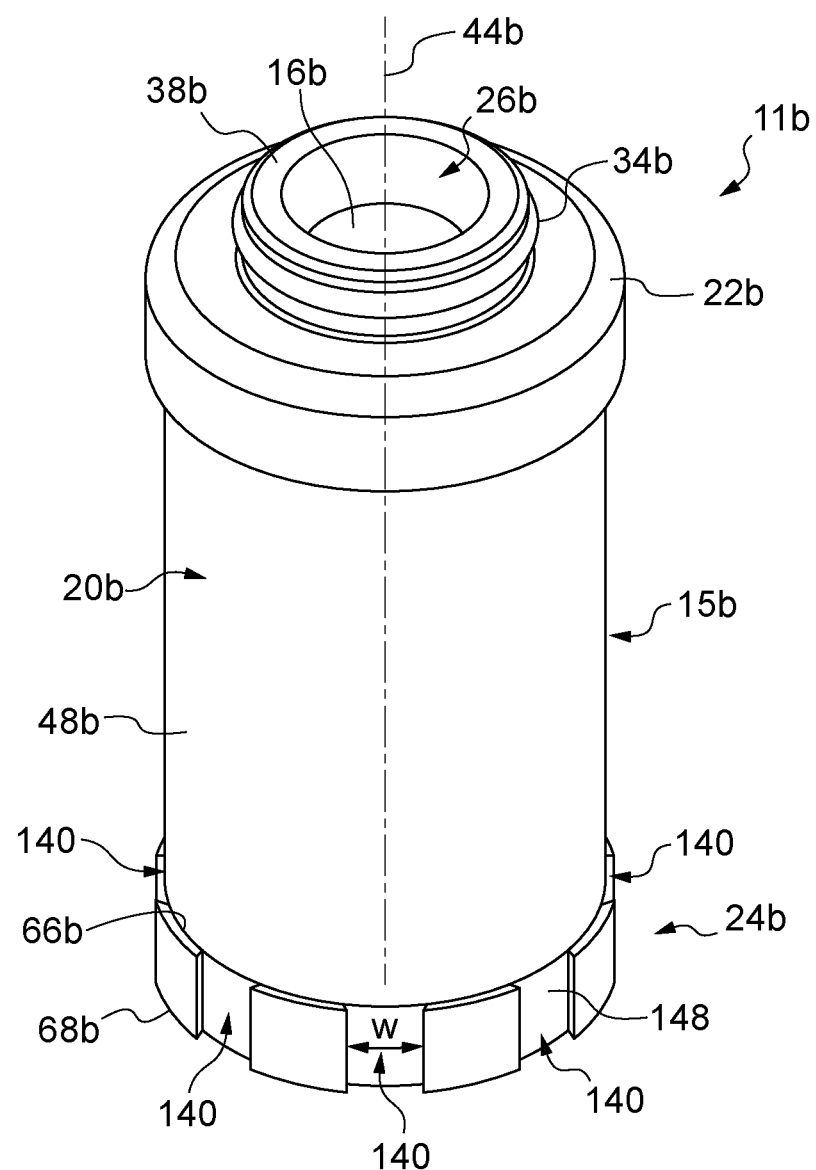
FIG. 19 is a perspective view of a filter element forming part of the filter element assembly of FIG. 14, shown separately from the drainage promoter.

The second end cap 24b of the filter element 11b differs from the second end cap 24 of the filer element 11. The second end cap 24b is best shown in FIG. 19, which is a perspective view of the filter element 11b prior to connection of the drainage promoter 56b. The second end cap 24b comprises a plurality of grooves, channels or recesses 140, each of which is shaped to receive a respective fin 58b, as shown in FIG. 14. The grooves 140 are spaced apart around a perimeter of the end cap 24*b*, which in the illustrated embodiment is a circumference, and are substantially evenly spaced.

The end cap 24*b* also comprises an upper edge surface 66*b* and a lower edge surface 68*b*, the grooves 140 extending through the end cap from the upper edge surface to the lower edge surface. This facilitates insertion of the fins 58*b* into the grooves 140 from either direction, as will be described in more detail below. The grooves 140 have a width W, taken in a direction around a circumference of the end cap, which decreases in a radially outward direction. The grooves 140 therefore taper outwardly, so that their width narrows in the radially outward direction. This facilitates retention of the fins 58*b* in the grooves 140, by restricting movement of the fins out of the grooves in the outward direction. Insertion of the fins 58*b* into the grooves 140, and removal of the fins from the grooves, therefore, requires that the fins be slid in a direction that is generally parallel to an axis 44*b* of the filter element 11*b*.

The surface 88*b* of the fins 58*b* is an inner surface, and is profiled, including the detent 138 and at least one protrusion 98*b*. The fins 58*b* are each partly W-shaped in cross-section, the protrusion 98*b* forming a centre portion, and the fin comprising a first outer portion 104*b* connected to a first side or flank 100*b* of the centre portion 98*b* and defining a first drainage channel or passage 94*b*. The fin 58*b* also comprises a second outer portion 106*b* connected to a second side or flank 102*b* of the centre portion 98*b* and defining a second drainage channel or passage 96*b*. The drainage channels 94*b* and 96*b* are substantially parallel to the longitudinal axis of the fin 58*b*. The centre portion 98*b* is generally V-shaped and extends generally inwardly, when the fin 58*b* is fitted to the filter element 11*b*. An apex 142 of the centre portion 98*b* therefore faces radially inwardly. The first and second outer portions 104*b* and 106*b* are generally V-shaped, and extend generally outwardly, so that apexes 144 and 146 of the outer portions face radially outwardly.

The centre portion 98*b* defines a drainage protrusion which extends into the external surface 48*b* of the drainage layer 20*b* when the fin 58*b* is fitted to the filter element 11*b*. The drainage protrusion 98*b* extends inwardly so that a radially inner extent of the protrusion (the apex 142) is located within an outer circumference described by the drainage layer 20*b*. The apexes of the drainage protrusions 98*b* of the fins 58*b* intersect with a circle which has a diameter (not shown) that is smaller than the outer diameter $D_2$ described by the drainage layer 20*b*. This serves to break surface tension in the drainage layer 20*a* and facilitates drainage of liquid oil from the layer.

The first and second outer portions 104*b* and 106*b* define respective first and second abutments 110*b*, which form outer abutment surfaces of the fin 58*a*. The apexes 144 and 146 forming outer extents of the fins 58*b* are defined by the abutments 110*b* and intersect with a circle having a diameter (not shown but corresponding to the diameter $D_4$ in FIG. 5) which is larger than an internal diameter described by an adjacent portion of the filter housing 12. This provides an interference fit between the filter element assembly 10*b* and the internal surface 50 of the housing 12, so that the fins 58*b* are urged inwardly to compress the drainage layers 20*b*, or to enhance a compressive loading applied. The free end 70*b* of each fin 58*b* has an inclined or tapered leading surface 111*b*, which may facilitate removal of the assembly 10*b* from the housing 12, when required.

A part 90*b* of the inner surface 80*b* of each fin 58*b* defines the detent 138 and is substantially flat and free from protrusions. The portion 90*b* of the surface defining the detent 138 has a shape or profile which matches or conforms to a curved radially outer surface 148 of the second end cap 24*b*. A part 92*b* of the inner surface includes the centre portion 98*b*, which defines the drainage protrusion.

As discussed above, the fins 58*b* forming the drainage promoter 56*b* are configured to be connected to the end cap 24*b* in a sliding fit. The fins 58*b* are each at least partially resiliently deformable and comprise a latch feature 62*b* for engaging the end cap 24*b* in a snap-fit. In the illustrated embodiment, the latch feature 62*b* takes the form of latch teeth which include an inclined or tapered leading surface 150, and latch surfaces 152 that are disposed transverse to a longitudinal axis of the fin 58*b* (suitably perpendicular to the axis).

Figure 20:
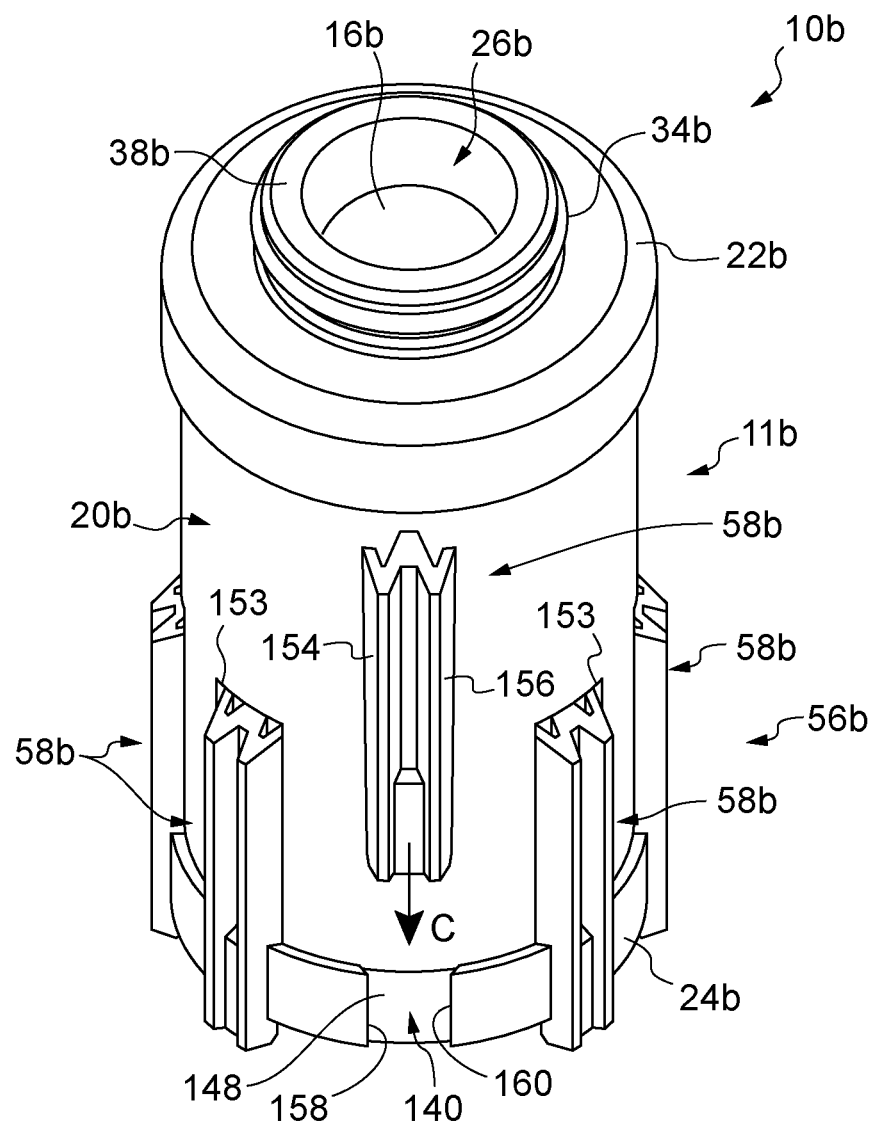
FIG. 20 is a perspective view of the filter element assembly of FIG. 14, shown during fitting of the drainage promoter fins to the element.

FIG. 20 is a perspective view of the filter element assembly 10*b* which is similar to FIG. 14, but which shows one of the fins 58*b* during fitting to the filter element 11*b*, the other fins having already been fitted. The fin 58*b* which is to be fitted is aligned with the respective channel 140 of the second end cap 24*b*, and is slid in a direction from the drainage layer 20*b* towards the second end cap, as indicated by the arrow C. The first and second outer portions 104*b* and 106*b* of the fin 58*b* have respective tapered or inclined flanks 154 and 156, which are shaped to cooperate with corresponding tapered or inclined edge surfaces 158 and 160 of the channel 140 which receives the fin. The inclined surface 150 of the latch teeth 62*b* comes into contact with the upper edge surface 66*b* of the second end cap 24*b* when the fin 58*b* is fitted. The fin 58*b* is resiliently deformable so that the part of the fin defining the latch teeth 62*b* can deflect radially outwardly, and ride along the outer surface 148 of the end cap in the base of the channel 140. When the fin 58*b* has been translated a sufficient distance into the channel 140, the latch teeth 62*b* snap over the end cap, whereupon the latch surface 152 comes into abutment with a lower edge surface 68*b* of the end cap 24*b*, resisting pull-out of the fin in the opposite direction. The fins 58*b* then compress the drainage layer 20*b*, as indicated schematically at 153 in the drawings. The fins 58*b* are suitably formed of a polymeric material, which may be of the type described elsewhere in this document.

The fins 58*b* also each comprise a restraint feature 162, which is defined by an end surface of the centre abutment portion 98*b* of the fin. The restraint surface 162 is disposed transverse to the longitudinal axis of the fin 58*b* and is suitably perpendicular to the axis. The restraint surface 162 engages the upper edge surface 66*b* of the end cap 24*b* when the fin has been fully fitted (when the latch teeth 62*b* snap-fit over the lower edge surface 68*b*), and restricts further sliding movement of the fin 58*b* towards the end cap, in the direction of the arrow C. As can be seen from FIGS. 15 to 17, the latch teeth 62*b* and the restraint surface 162 are spaced apart along the length of the fin 58*b*, and the detent 138 is disposed between them so that the latch teeth and the restraint surface straddle the second end cap 24*b*, when the fin is fitted to the filter element 11*b*.

The fins 58*b* each have a first end 69*b*, and a second end 70*b*. The fin 58*b* is connected to the end cap 24*b* at or towards its first end 69*b*, so that the second end 70*b* is a free end. The detent 138 is provided closer to the first end 69*b* than to the second end 70*b*. A distance between the latch teeth 62*b* and the first end 69*b* is smaller than a distance between the restraint surface 162 and the first end. The latch teeth 62*b* are therefore disposed closer to the first end 69*b* than the restraint surface 162. In the illustrated embodiment, the latch teeth 62*b* are disposed at or immediately adjacent the first end 69*b*. A distance between the restraint surface 162 and the second free end 70*b* is smaller than a distance between the latch teeth 62*b* and the second end, so that the restraint surface 162 is disposed closer to the second end than the latch teeth. This arrangement of the latch teeth 62*b* and restraint surface 162 is suited to a sliding-fit of the fin 58*b* to the second end cap 24*b* in the insertion direction C.

The drainage channels 94*b* and 96*b* extend along the length of each fin 58*b* from the second free end 70*b* to the first end 69*b*, so that liquid oil can flow from the drainage layer 20 into the channels. The liquid oil then flows under gravity along the channels 94*b* and 96*b*, to discharge from the filter element 11*b* into the sump 45. The drainage channels 94*b* and 96*b* extend along the radially outer surface 148 of the second end cap 24*b*, so that the liquid oil can bypass around the end cap and discharge into the sump 45.

Figure 21:
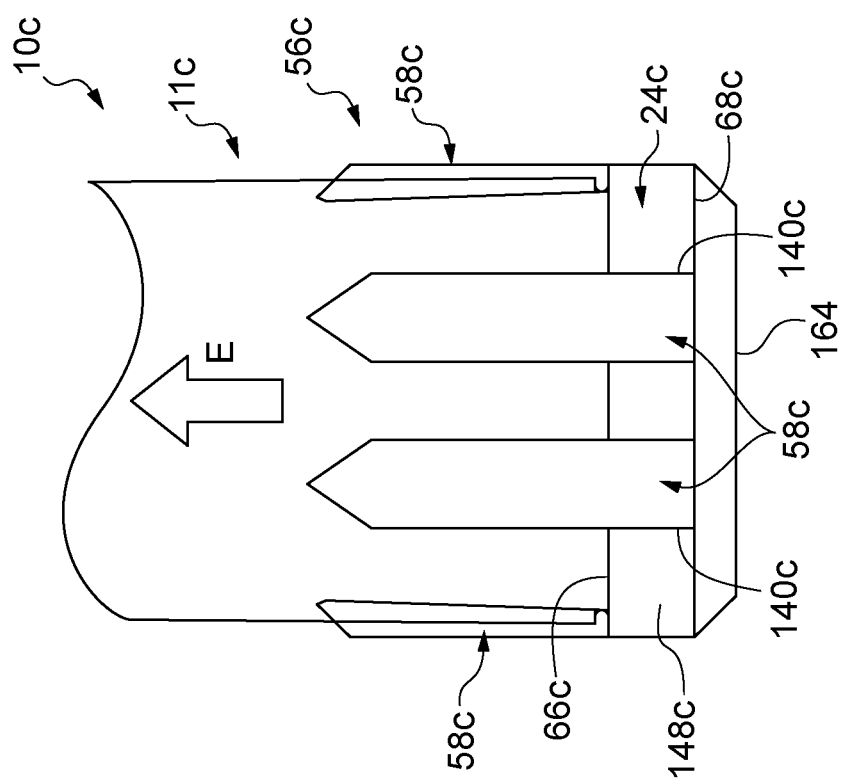
FIG. 21 is a front view of part of a filter element assembly in accordance with another embodiment of the present disclosure.

A variation on the filter element assembly 10*b* is shown in FIG. 21, which is a front view of part of a filter element assembly in accordance with another embodiment of the present disclosure, the filter element assembly indicated generally by reference numeral 10*c*. The filter element assembly 10*c* comprises a filter element 11*c* and a drainage promoter 56*c*. The filter element assembly 10*c* is of very similar construction and operation to the assembly 10*b*, and only the substantive differences between the two assemblies will be described. Like components of the filter element 10*c* with the filter element assembly 10*b* shown in FIGS. 14 to 20 share the same reference numerals, with the suffix "b" replaced by the suffix "c".

Figure 22:
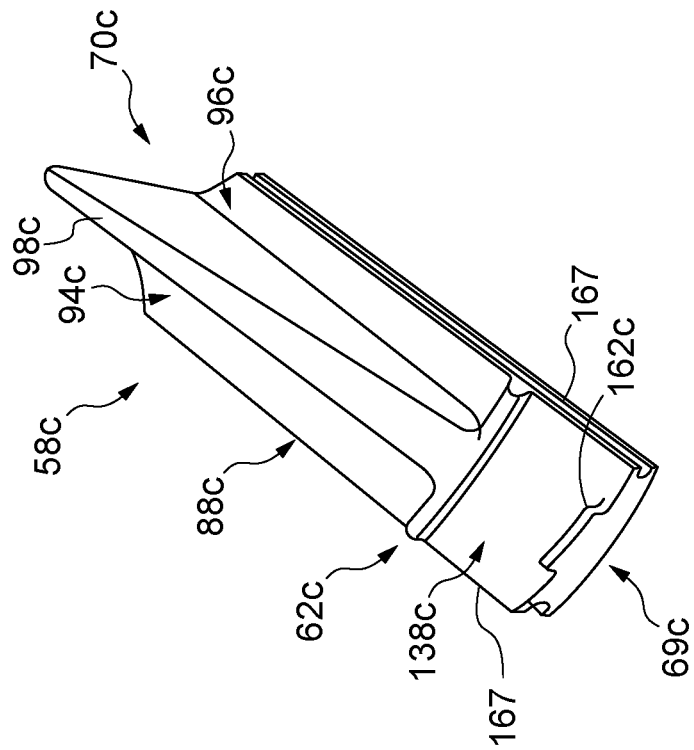
FIG. 22 is an enlarged perspective view of a fin forming part of a drainage promoter of the filter element assembly shown in FIG. 21.

In this variation, the drainage promoter 56*c* has fins 58*c*, one of which is shown in the enlarged perspective view of FIG. 22. The fins 58*c* are each configured to be fitted to an end cap of the filter element, in this case the second end cap 24*c*, by sliding the fins in an opposite direction to the fins 58*b* of the filter element assembly 10*a*. The insertion direction is indicated by the arrow E in FIG. 21.

The fins 58*c* are each at least partially resiliently deformable, and comprise a latch feature 62*c*, for engaging the end cap 24*c* in a snap-fit. In the illustrated embodiment, the latch feature 62*c* takes the form of a latch arm or rib which extends around an inner surface 88*c* of the fin 58*c*, in a direction that is transverse to a longitudinal axis of the fin (suitably perpendicular to the axis). The latch arm 62*c* has a generally rounded profile, so that it can ride over an outer surface 148*c* of the end cap 24*c*, in a channel 140*c* which receives the fin, and then snap-fit over an upper edge surface 66*c* of the end cap.

The fins 58*c* also each comprise a restraint feature 162*c*, which is also disposed transverse to the longitudinal axis of the fin, suitably perpendicular to the axis. The restraint feature also takes the form of an arm or lip 162*c*, and engages a lower edge surface 68*c* of the end cap 24*c* when the fin 58*c* has been fully fitted (when the latch arm 62*c* snap-fits over the upper edge surface 66*c*), to restrict further sliding movement of the fin towards the end cap, in the direction of the arrow E. As can be seen from FIG. 21, the lower edge surface 68*c* of the end cap 24*c* may not form a lowermost end of the end cap, as the end cap optionally tapers from the edge surface 68*c* towards a lowermost end 164.

As can be seen from FIG. 22, the latch arm 62*c* and the restraint feature 162*c* are spaced apart along the length of the fin 58*c*, and a detent 138*c* is disposed between them which is shaped to fit the outer surface 148 of the end cap 24*c*. The latch arm 62*c* and the restraint arm 162*c* straddle the second end cap 24*c* when the fin is fitted to the filter element 11*c*.

The fins 58*c* each have a first end 69*c*, and a second end 70*c*. The fin 58*c* is connected to the end cap 24*c* at or towards its first end 69*c*, so that the second end 70*c* is a free end. A distance between the latch arm 62*c* and the first end 69*c* is greater than a distance between the restraint arm 162*c* and the first end. The latch teeth 62*c* are therefore disposed closer to the second end 70*c* than the restraint arm 162*c*. In the illustrated embodiment, the restraint arm 162*c* is disposed at or immediately adjacent the first end 69*c*. A distance between the restraint arm 162*c* and the first end 69*c* is smaller than a distance between the latch arm 62*c* and the first end, so that the restraint arm 162*c* is disposed closer to the first end than the latch teeth. This arrangement of the latch arm 62*c* and restraint arm 162*c* is suited to a sliding-fit of the fin 58*c* to the second end cap 24*c* in the insertion direction E.

Figure 23:
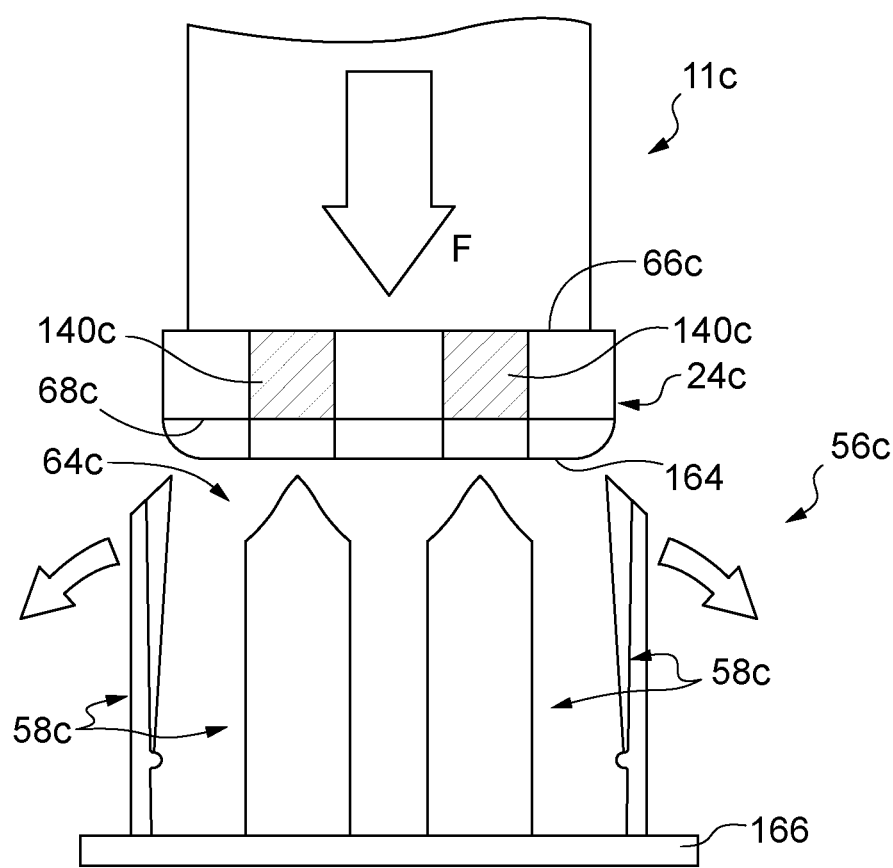
FIG. 23 is a front view of the filter element assembly of FIG. 21, shown during fitting of the drainage promoter fins to the element.

FIG. 23 illustrates fitting of the drainage promoter 56*c* to the filter element 11*c*, which may involve locating the fins 58*c* in a holder 166, for example in recesses (not shown) in the holder. The fins 58*c* are located in the holder 166 so that they can align with respective channels 140*c* in the end cap 24*c*, and the filter element 11*c* can then be inserted into a space 64*c* defined between the fins, in the direction of arrow F. The fins 58*c* each engage within their respective channels 140*c*, and the filter element 11*c* is inserted until such time as the latch arms 62*c* of the various fins 58*c* have snap-fitted over the upper edge surface 66*c* of the end cap 24*c*.

As shown in the drawings, the fins 58*c* each comprise a drainage protrusions 98*c* which is generally tapered, so that it increases in depth towards the free end 70*c* of the fin. Fitting of the fins 58*c* to the end cap 24*c* may require appropriate shaping of the fins, and/or manipulation of the end cap or fins, to fit them together. This is because the drainage protrusion 98*c* of each fin 58*c* may initially come into contact with respective channels 140*c* of the end cap 24*c*, riding over the end cap so that the fins are deflected radially outwardly. Engagement of lateral sides 167 of each fin 58*c* in its channel 140*c* may only occur when the detent 138*c* is close to the channel. Alternatively, or in addition, a circumferential width of each fin 58*c* in the region of the detent 138*c* may be greater than in a region comprising the drainage protrusion 98*c*, which may facilitate the sliding movement described above and so engagement of the fins in their respective channels 140*c*.

In a further variation, the component labelled 162*c* in the drawing may provide the latch feature, and the component labelled 62*c* the restraint feature. This may be suited to the insertion direction E shown in FIG. 21.

In variations on the embodiments shown in both FIGS. 14 and 21, the fins 58*b* and/or 58*c* may be configured so that one of the end caps is a snap-fit when the drainage promoter is push fitted to the end cap in a substantially radial insertion direction, or in an insertion direction comprising a radial component of movement. In a radial push-fit, at least lateral edge portions of the fins (e.g., the portions 167 in the fins 58*c*) may be resiliently deformable. The fins may be arranged to provide such a snap-fit, for example by appropriate dimensioning or shaping of a fitting portion of the fins 58*b*/58*c* comprising the detents 138/138*c*, relative to the grooves 140/140*c* that are shaped to receive the fins.

Figure 24:
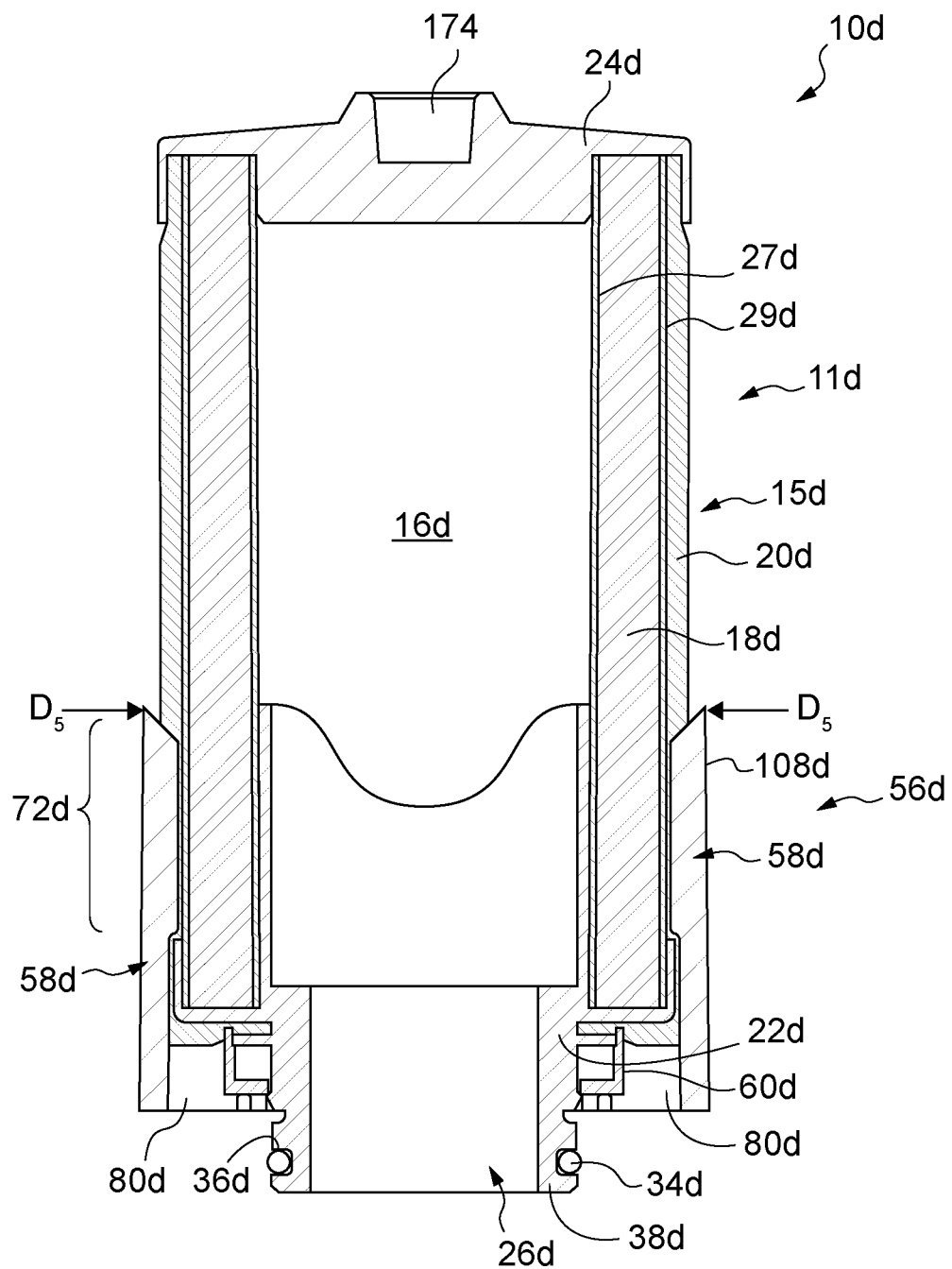
FIG. 24 is a longitudinal cross-sectional front view of a filter element assembly in accordance with another embodiment of the present disclosure.

Turning now to FIG. 24, there is shown a longitudinal cross-sectional front view of a filter element assembly in accordance with another embodiment of the present disclosure, the filter element assembly indicated generally by reference numeral 10*d*. The filter element assembly 10*d* comprises a filter element 11*d* and a drainage promoter 56*d*. Like components of the filter element 10*d* with the filter element assembly 10 shown in FIGS. 1 to 7 share the same reference numerals, with the addition of the suffix "d". The filter element 11d is of similar construction as the filter element 11 shown in FIGS. 1 to 7 and described above. Accordingly, only substantial differences between the filter element 11d and the filter element 11 will be described herein.

The filter element 11d comprises a wall 15d of a filtration medium defining a hollow space 16d, the filtration medium including a filtration layer 18d and a drainage layer 20d. The filter element 11d also comprises first and second end caps 22d and 24d at opposite ends of the wall 15d, the first end cap 22d including a port 26d for a gas stream to flow into the filter element. In normal use the filter element 11d will be substantially vertically oriented, so that the first end cap 22d forms a lower end cap, and the second end cap 24d an upper end cap. Perforated tubular supports 27d and 29d serve for securing the filtration layer 18d and the drainage layer 20d to the end caps 22d and 24d and separating the different layers. The first end cap 22d comprises an O-ring seal 34d, which is mounted in a groove 36d defined in a tubular wall 38d of the end cap defining the port 26d. The O-ring seal 34d serves for sealing the filter element 11d relative to a filter head or other filter component, as appropriate.

Figure 2:
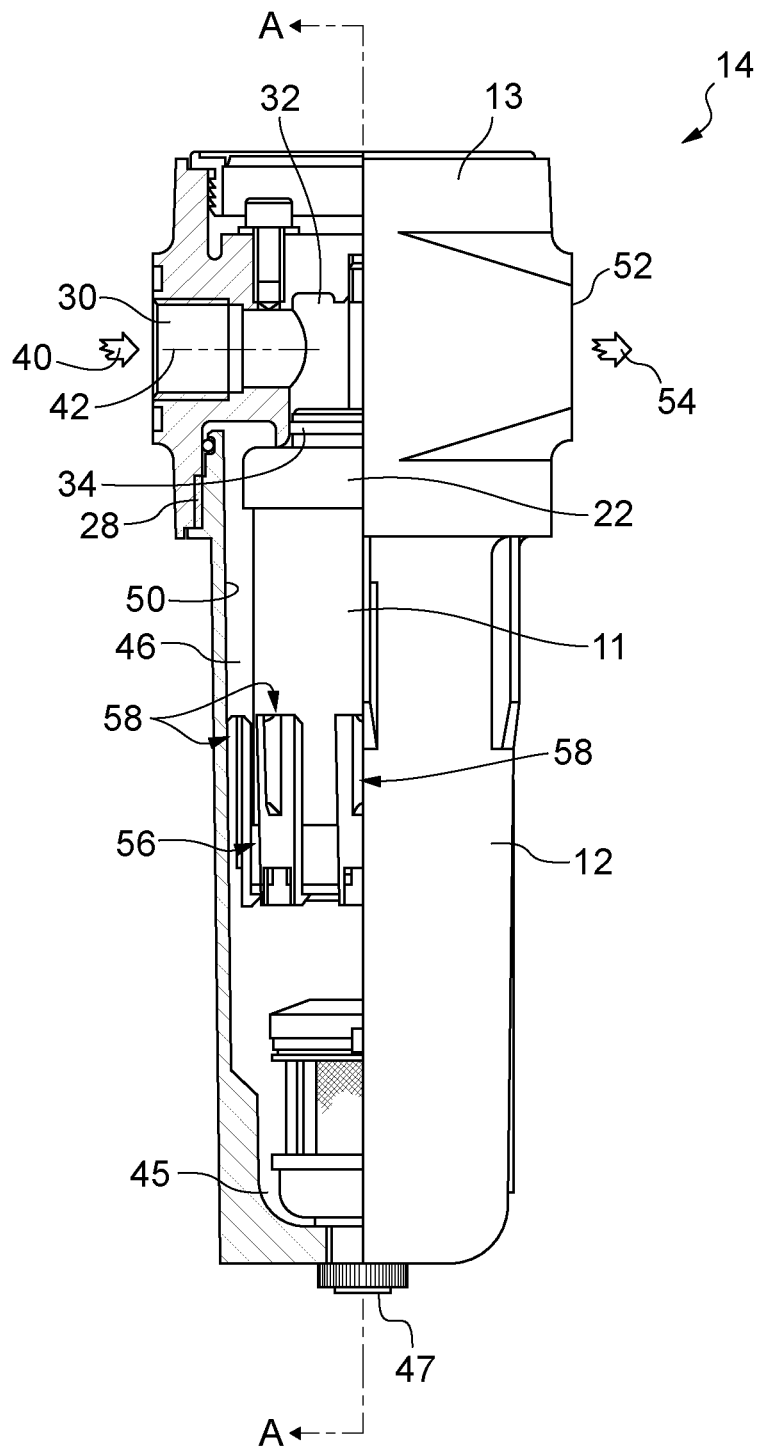
FIG. 2 is a longitudinal half-sectional front view of a filter having a housing containing the filter element assembly of FIG. 1.

The filter element assembly 10 shown in FIGS. 1 to 7 (as well as the filter element assemblies 10a, b and c shown in FIGS. 8 to 23) are intended to a used in pressurised system, in which fluid is forced through the filter element under pressure, as shown and described in the filter 4 of FIG. 2 above. The filter element assembly 10d differs in that it is intended to be used in a vacuum system (not shown), in which a vacuum is employed to draw a gas stream through the port 26d of the filter element 11d and into its hollow space 16d, for subsequent passage through the wall 15d of the filter element. Vacuum systems employing such filter elements are known in the field of the invention and will not be described in further detail herein. The filter element assembly 10d is intended to be located in a housing of the vacuum system filter, which m ay be similar to the housing 12 of the filter 4.

Figure 25:
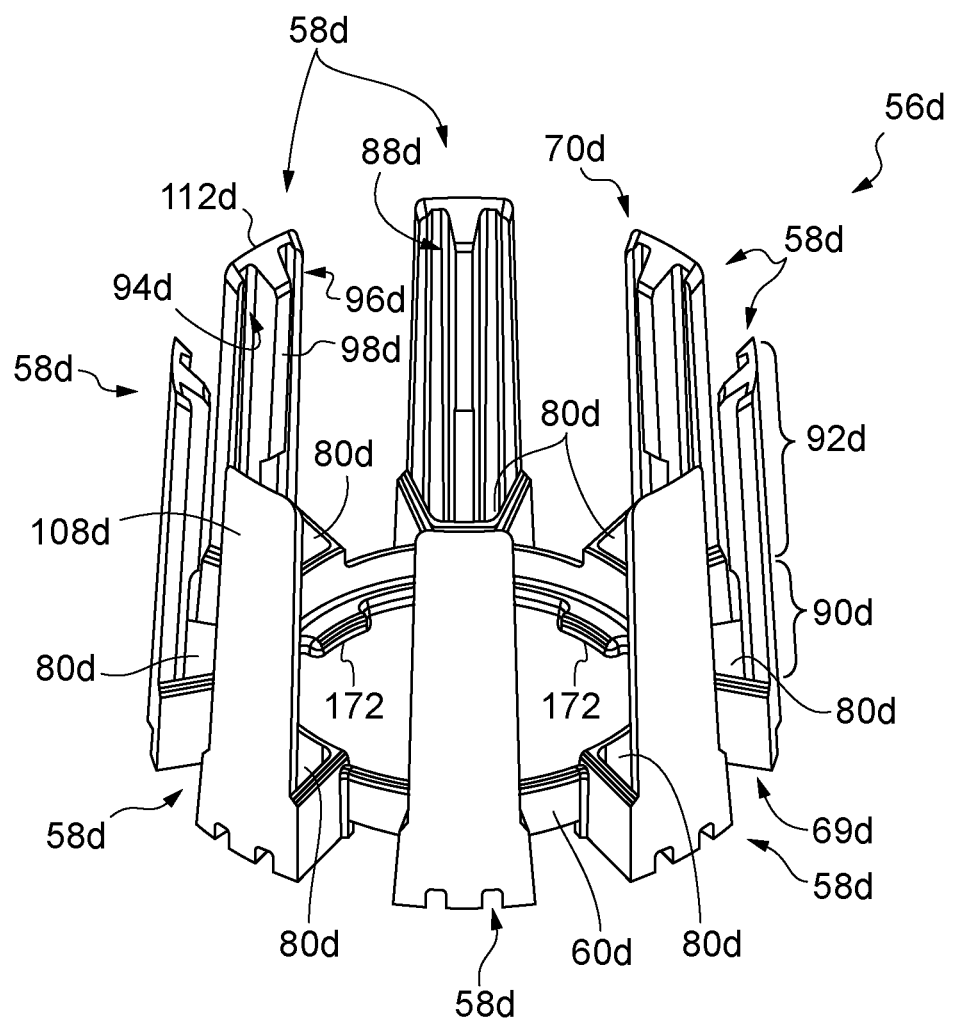
FIG. 25 is a perspective view of a drainage promoter forming part of the filter element assembly of FIG. 24, shown separately from a filter element of the assembly.

The drainage promoter 56d of the filter element assembly 10d is of similar construction and operation to the drainage promoter 56 forming part of the filter element assembly 10 of FIGS. 1 to 7 and may again be injection moulded and of a polymeric material such as those described above. The drainage promoter 56d is shown separately in the perspective view of FIG. 25 and the plan view of FIG. 26 and comprises a plurality of drainage fins 58d which are connected to a generally annular or ring-shaped support 60d. The drainage promoter 56d is generally cage or cup shaped. The fins 58d are again at least partially resiliently deformable, so that they can pass over one of the end caps 22d or 24d, for fitting the fins to the filter element 11d. In this embodiment, the drainage promoter 56d is fitted over the first end cap 22d.

When the drainage promoter 56d is connected to the filter element 11d, second free ends 70d of the fins 58d are deflected outwardly, so that the fins can pass over the first end cap 22d. The fins 58d bend or deform away from the positions which they adopt in a rest state shown in FIG. 25, so that they snap over the end cap 24d and compress the drainage layer 20d along parts of their lengths, along a zone 72d of the drainage layer.

The fins 58d each comprise inner surfaces 88d, a first part 90d defining a first portion of the inner surface 88d and a second part 92d defining a second portion of the inner surface. The second part 92d extends radially inwardly towards the drainage layer 20d, away from the first part 90d, when the fin 58d is fitted to the filter element 11d. The first part 90d provides a detent or recess which receives the second end cap 24d when the drainage promoter 56d is fitted.

The fins 58d are each generally T-shaped in cross-section, in their second parts 92d, comprising an outer part 112d which defines a top of the T, and an inner part in the form of a protrusion 98d which extends inwardly towards the filter element 11d. Drainage channels 94d and 96d extend along the length of each fin 58d between its free second end 70d, and its first end 69d.

Figure 26:
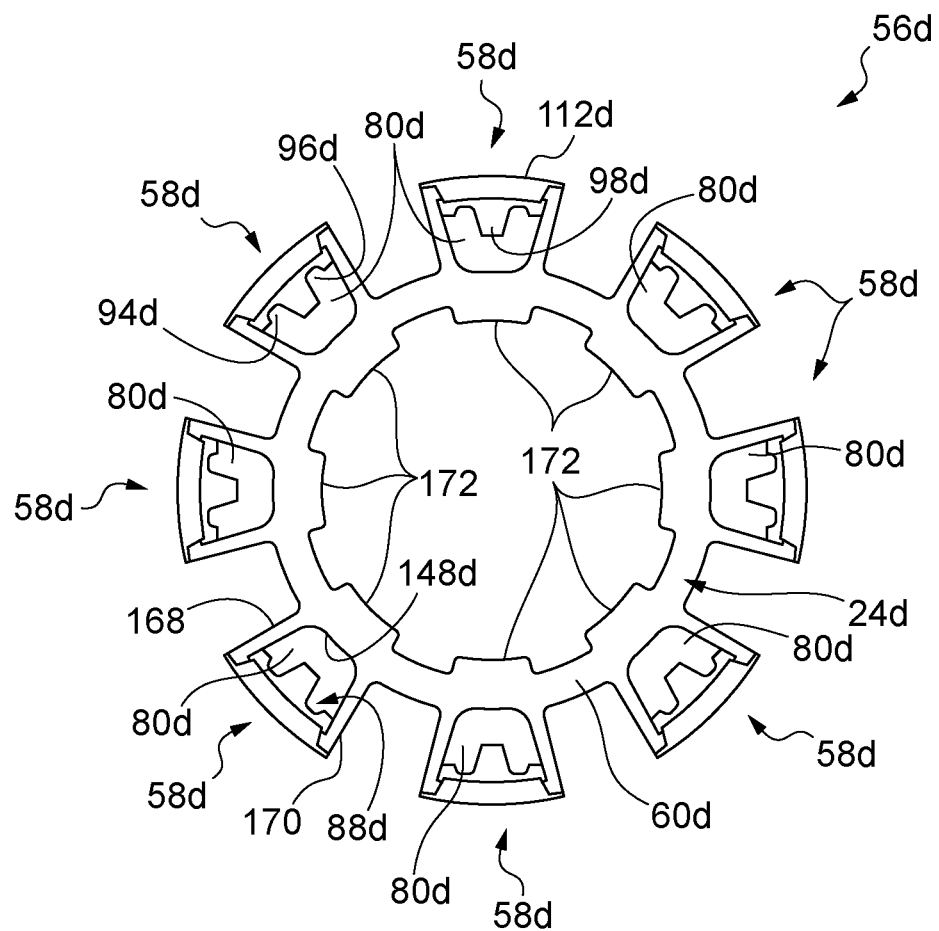
FIG. 26 is a plan view of a drainage promoter forming part of the filter element assembly of FIG. 24, shown separately from a filter element of the assembly.

The drainage promoter 56d also comprises drainage channels 80d, one associated with each fin 58d, which communicate with the inner surface 88d of the fin. The drainage channels 80d are defined partly by the annular support 60d, and partly by the fin 58d. As best shown in FIG. 26, the drainage channels 80d are defined between the inner surface 88d of the fin 58d, an outer surface 148d of the second end cap 24d, and walls 168 and 170 which extend between the fin 58d and the annular support 60d. The drainage channels 80d extend past or through the support 60d and communicate with the drainage channels 94d and 96d defined by the fin 58d, so that liquid oil running off the fin can flow past or through the support 60d, for discharge from the filter element assembly 10d, for example, into a filter sump. To facilitate this, the drainage channel 80d is substantially aligned with a longitudinal axis of the respective fin 58d, so that liquid can flow from the fin for subsequent discharge.

Figure 27:
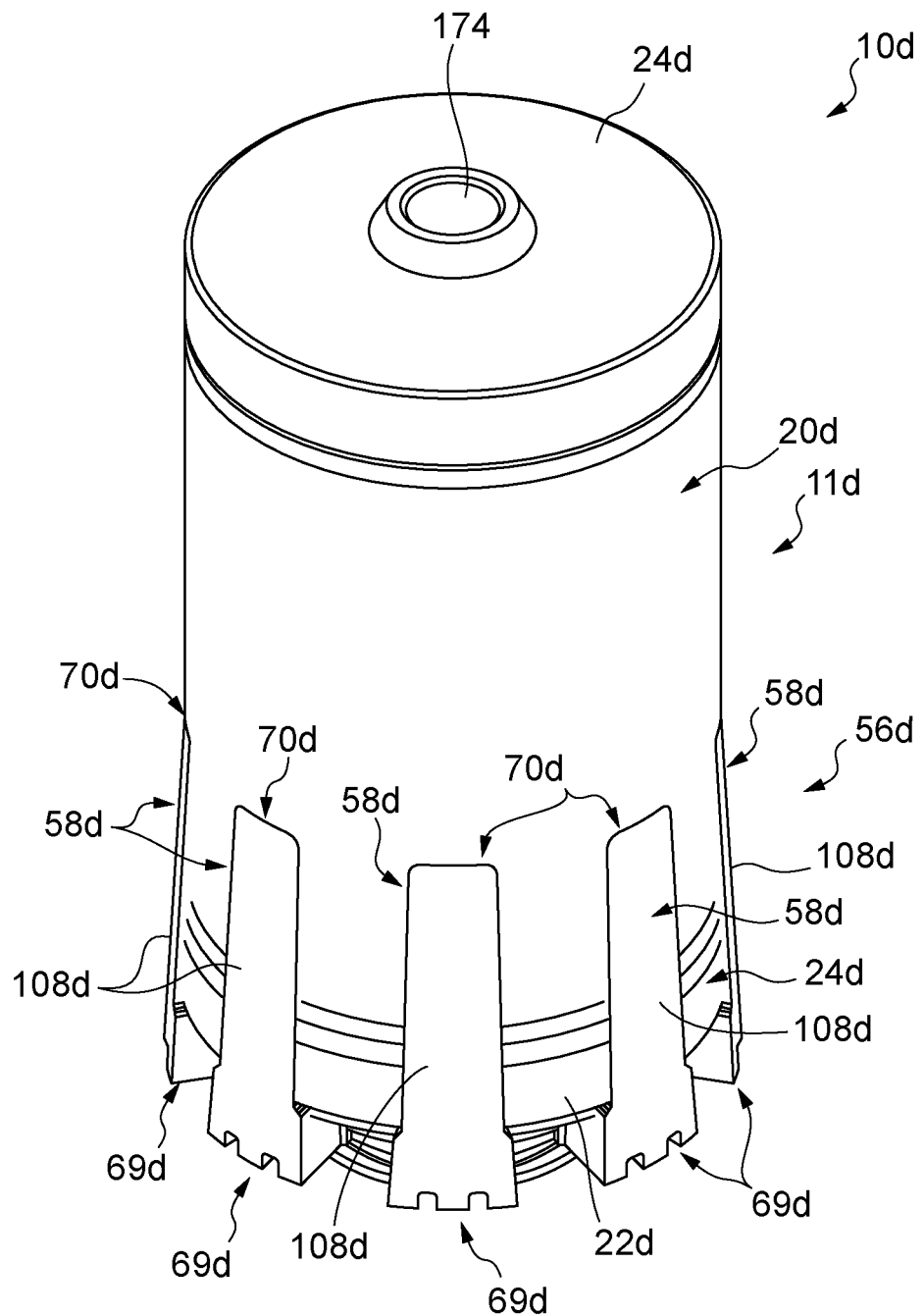
FIG. 27 is a perspective view of the filter element assembly shown in FIG. 24.

The drainage promoter 56d is snap-fitted to the filter element 11d, as described above, the fins 58d deflecting radially outwardly during passage over the first cap 22d. FIG. 27 is a perspective view showing the drainage promoter 56d fitted to the filter element 11d. The annular support 60d comprises a number of locating teeth 172 which extend radially inwardly and cooperate with corresponding locating recesses (not shown) on the filter element 11d, suitably on the first end cap 22d. This may be desirable in view of the port 26d being provided in the first end cap 22d, which will cooperate with a conduit of the filter. The second end cap 24d includes a blind bore 174, which serves for locating the filter element assembly 10d in a housing of the filter in a required location, for example on a locating boss or pin in the housing.

The fins 58d each have an outer surface 108d which is configured to cooperate with the filter housing, in particular with an internal wall of the housing, so that the fin is urged inwardly to compress the drainage layer 20d, or to enhance a compressive loading applied to the drainage layer by the fin, when the fin is fitted to the filter element. Outer extents of the fins 58d defined by the outer surfaces 108d intersect with a circle having a diameter $D_5$, which may be larger than an internal diameter (not shown) described by an adjacent portion of the filter housing which receives the filter element assembly 10d. It may be desirable to provide each fin 58d with an abutment portion, such as the portion 110 of the fin 58 forming part of the drainage promoter 56 shown in FIG. 1.

The filter element assembly 10d, comprising the drainage promoter 56d, has been described for us in a vacuum system type filter. It will be understood that the drainage promoter 56d shown in FIGS. 24 to 27 may be replaced by any of the drainage promoters described in this document, including those relating to pressurised systems. This might require appropriate modification of the filter element 11d. Similarly, the pressurised type filter element assemblies 10 to 10c shown in FIGS. 1 to 23 may comprise a drainage promoter of the type shown in FIG. 24 and so the drainage promoter 56d. Again, this may require appropriate modification of a filter element of the relevant assembly.

It will also be understood that features of the various filter element assemblies 10 to 10d disclosed in this document, in particular of their drainage promoters 56 to 56d, may be interchangeable. Accordingly, further filter element assemblies/drainage promoters can be conceived which comprise features derived from one or more of the different embodiments of filter element and/or drainage promoter disclosed in this document.

Filter element assemblies, and drainage promoters, have been described with reference to FIGS. 1 to 27. The present disclosure also encompasses a drainage promoter fin for a filter element, which may be any one of the fins 58 to 58d forming part of the drainage promoters 56 to 56d described above and shown in the accompanying drawings. Features of the drainage promoter fins may therefore be derived from the text set out above and the accompanying drawings.

In each embodiment of filter element assembly disclosed in this document, either of the first and second end caps may comprise a port for the entry of gas into the filter element. The discharge promoters disclosed in this document may be configured for connection to either of the first and second end caps of the filter elements. Factors affecting the end cap comprising the port, and the end cap to which a discharge promoter is fitted, may include whether an orientation of the filter element during use, and whether the filter is a pressurised or vacuum system.

Various modifications may be made to the foregoing without departing from the spirit or scope of the present invention.

Reference is generally made in this document to a filter element comprising a wall of a filtration medium which defines a hollow space for a gas stream to flow from the space through the wall to be filtered, and a drainage layer located outside the filtration layer in which liquid separated from the gas stream can collect, as well as to a drainage promoter which compresses the drainage layer to promote drainage of liquid which has collected in the drainage layer. Reference may however be made generally to a fluid stream (which may not specifically be a gas), and to the drainage of fluid (which may not specifically be a liquid) which has collected in the drainage layer. The fluid which is collected in the drainage layer may have been filtered from the fluid stream flowing through the wall of the filter element. The fluid stream may therefore comprise a first fluid and at least one further fluid, which further fluid may collect in the drainage layer.

In at least some embodiments, other materials and manufacturing techniques may be employed to form the drainage promoters and/or drainage promoter fins, including but not limited to die casting using an aluminium or zinc alloy, for example. This may be applicable particularly to the embodiments of FIGS. 14 to 23.

The invention claimed is:

1. A filter element assembly, comprising:
a filter element for location in a housing of a filter, the filter element comprising a wall of a filtration medium which defines a hollow space, for a gas stream to flow from the hollow space through the wall to be filtered, the filtration medium including a filtration layer, and a drainage layer located outside the filtration layer in which liquid separated from the gas stream can collect, and first and second end caps at opposite ends of the wall, the first end cap including a port for the gas stream which communicates with the hollow space within the wall; and
a drainage promoter comprising at least one fin configured to be fitted to the filter element so that it extends at least part way along the filter element, and which the at least one fin then compresses the drainage layer along its length to promote drainage of the liquid which has collected in the drainage layer;
in which the drainage promoter further comprises a support, the at least one fin being coupled to the support via a hinge so that the at least one fin is pivotable between a disengaged position, and an engaged position in which the at least one fin is configured to engage the filter element, the at least one fin comprising a latch feature for engaging the filter element.

2. The filter element assembly as claimed in claim 1, in which the drainage promoter is a unitary body comprising the support and the at least one fin.

3. The filter element assembly as claimed in claim 1, in which the support is adapted to be fitted to an end surface of the second end cap so that it abuts the second end cap.

4. The filter element assembly as claimed in claim 3, in which the support comprises at least one engaging feature, for engaging a cooperating engaging feature on the second end cap of the filter element, the engaging features on the support and on the filter element cooperating to restrict rotation of the support relative to the filter element.

5. The filter element assembly as claimed in claim 4, in which the support comprises one of a male engaging feature and a female engaging feature, and the filter element comprises the other one of the male and female engaging feature, the female engaging feature configured to receive the male engaging feature to facilitate connection of the drainage promoter and the filter element.

6. The filter element assembly as claimed in claim 1, in which the support defines an abutment surface which faces towards the second end cap of the filter element, when the drainage promoter is connected to the filter element, so that the second end cap is located between the latch feature of the at least one fin and the abutment surface of the support.

7. The filter element assembly as claimed in claim 1, in which the support is annular and has an outer periphery which is circular in plan view, the at least one fin extending from the support at the outer periphery of the support.

8. The filter element assembly as claimed in claim 7, in which the hinge is formed between the support and an end of the at least one fin, adjacent to the outer periphery of the support.

9. The filter element assembly as claimed in claim 1, in which the hinge is a living hinge defined by the drainage promoter.

10. The filter element assembly as claimed in claim 1, in which the drainage promoter comprises a plurality of fins, and in which the plurality of fins, in their disengaged positions, are radially arranged so that the fins fan radially outwardly from the support.

11. The filter element assembly as claimed in claim 1, in which, when the at least one fin is in a disengaged position, the drainage promoter is spider shaped.

12. The filter element assembly as claimed in claim 1, in which the support is disposed in a plane, and in which:
the at least one fin, when in its disengaged position, is disposed in the plane; and
the at least one fin, when in its engaged position, is disposed transverse to the plane.

13. The filter element assembly as claimed in claim 1, in which the latch feature is resiliently deformable, for engaging the filter element in a snap-fit.

14. The filter element assembly as claimed in claim 13, in which a portion of the at least one fin defining the latch feature is resiliently deformable.

15. The filter element assembly as claimed in claim 1, in which the latch feature is configured to engage an edge surface of one of the end caps, wherein the edge surface is disposed axially inwardly from an end of the filter element defined by one of the end caps.

16. The filter element assembly as claimed in claim 1, in which the latch feature is tapered, to facilitate engagement of the filter element.

17. The filter element assembly as claimed in claim 16, in which the latch feature defines a surface which faces towards the filter element, when the at least one fin is fitted to the filter element, and in which the surface is tapered.

18. The filter element assembly as claimed in claim 1, in which the latch feature projects along the length of the at least one fin in a direction towards the support, and in which the latch feature projects radially inwardly away from a main part of the at least one fin when the at least one fin is fitted to the filter element.

19. The filter element assembly as claimed in claim 1, in which an axial distance between an end of the latch feature, when the at least one fin is in its engaged position, and an abutment surface of the support adjacent to the at least one fin, is less than an axial length of the second end cap.

20. The filter element assembly as claimed in claim 1, in which the latch feature defines a recess configured to receive an edge surface of one of the end caps when the at least one fin is fitted to the filter element, and in which the recess is disposed radially outwardly of the latch feature and the latch feature is disposed radially inwardly of the edge surface of one of the end caps, when the at least one fin is fitted to the filter element.

21. The filter element assembly as claimed in claim 1, in which the latch feature is a finger and comprises an abutment surface which abuts the second end cap of the filter element when the at least one fin is in the engaged position.

22. A drainage promoter configured to be connected to a filter element, the drainage promoter comprising:
at least one fin configured to be fitted to the filter element so that it extends at least part way along the filter element, to compress a drainage layer of the filter element along its length and promote drainage of liquid which has collected in the drainage layer; and
a support, the at least one fin being coupled to the support via a hinge so that the at least one fin is pivotable between a disengaged position, and an engaged position in which the at least one fin is configured to engage the filter element, the at least one fin comprising a latch feature for engaging the filter element.

23. A filter element assembly comprising:
a. a filter element for location in a housing of a filter, the filter element comprising a wall of a filtration medium which defines a hollow space, for a gas stream to flow from the hollow space through the wall to be filtered, the filtration medium including a filtration layer, and a drainage layer located outside the filtration layer in which liquid separated from the gas stream can collect, and first and second end caps at opposite ends of the wall, the first end cap including a port for the gas stream which communicates with the hollow space within the wall; and b. a drainage promoter comprising a plurality of fins, in which the plurality of fins are each configured to be fitted to the filter element so that, in use, the plurality of fins extend at least part way along the filter element and compress the drainage layer along the lengths of the plurality of fins to promote drainage of liquid which has collected in the drainage layer;
in which the drainage promoter comprises a support, the plurality of fins being coupled to the support via a hinge so that the plurality of fins are pivotable between a disengaged position, and an engaged position in which the plurality of fins are configured to engage the filter element, wherein the plurality of fins are extending, in use, in a direction along the filter element when the drainage promoter is connected to the filter element, the plurality of fins being at least partially resiliently deformable to pass over one of the end caps for fitting the plurality of fins to the filter element, and the plurality of fins comprising a latch feature for engaging the filter element.

24. The filter element assembly as claimed in claim 23, in which the drainage promoter is cup-shaped, comprising a base defined by the support and a side defined by the plurality of fins.

25. The filter element assembly as claimed in claim 23, in which a hollow space is defined between the plurality of fins, which is shaped to receive the second end cap of the filter element.

26. The filter element assembly as claimed in claim 23, in which the drainage promoter has a rest state which it adopts in the absence of a force which is imparted on the plurality of fins during connection of the drainage promoter to the filter element.

27. The filter element assembly as claimed in claim 26, in which the hollow space has a maximum dimension, in the rest state of the drainage promoter, the maximum dimension being less than an outer dimension defined by the filter element.

28. The filter element assembly as claimed in claim 27, in which the maximum dimension of the drainage promoter, in the rest state, is less than an outer dimension defined by the second end cap to which the drainage promoter is configured to be fitted, and over which the plurality of fins pass for fitting to the filter element.

29. The filter element assembly as claimed in claim 23, in which the plurality of fins are elongate and have a first end and a second end, and in which the plurality of fins are coupled to the support adjacent their first ends and the second ends of the plurality of fins are free ends.

30. The filter element assembly as claimed in claim 23, in which the drainage promoter is a unitary body comprising the support and the plurality of fins.

31. The filter element assembly as claimed in claim 23, in which the drainage promoter is adapted to be fitted to one of the first and second end caps so that a hollow space exists between an axial end surface of the second end cap and the support.

32. The filter element assembly as claimed in claim 23, in which the support is annular, and has having an outer periphery which is circular in plan view, and in which the plurality of fins extend from the support at the outer periphery of the support.

33. The filter element assembly as claimed in claim 32, in which the plurality of fins each extend from the support at a different location around the outer periphery of the support, and are equally spaced.

34. The filter element assembly as claimed in claim 23, in which the support is disposed in a plane, and the plurality of fins are disposed transverse to the plane.

35. The filter element assembly as claimed in claim 23, in which a portion of the plurality of fins define the latch feature, the portion of the plurality of fins being resiliently deformable.

36. The filter element assembly as claimed in claim 35, in which at least one of the fins of the plurality of fins, including the portion defining the latch feature, is resiliently deformable.

37. The filter element assembly as claimed in claim 23, in which the drainage promoter comprises a drainage channel, to facilitate drainage of liquid from the drainage layer.

38. The filter element assembly as claimed in claim 37, in which the drainage channel is provided on or in an inner surface of the plurality of fins, which inner surface faces towards the filter element when the drainage promoter is connected to the filter element.

39. The filter element assembly as claimed in claim 37, in which the drainage channel is defined at least partly by the support and extends through the support so that liquid can run off at least one fin of the plurality of fins and through the support for discharge from the filter element assembly.

40. The filter element assembly as claimed in claim 39, in which the at least one fin is elongated, comprising a longitudinal axis, and the drainage channel is disposed parallel to and aligned with the longitudinal axis.

41. The filter element assembly as claimed in claim 23, in which at least one fin of the plurality of fins comprises a surface which faces towards the filter element when the at least one fin is fitted to the filter element, and a detent in the surface, the detent being configured so that one of the end caps is a snap-fit in the detent when the drainage promoter is fitted to the filter element, over the one end cap.

42. The filter element assembly as claimed in claim 23, in which at least one fin of the plurality of fins comprises a surface which faces-towards the filter element when the at least one fin is fitted to the filter element, and in which the at least one fin comprises a first part defining a first portion of the surface and a second part defining a second portion of the surface, the second part extending inwardly towards the drainage layer away from the first part when the at least one fin is fitted to the filter element.

43. The filter element assembly as claimed in claim 42, in which the at least one fin comprises a drainage protrusion which defines the second part of the surface, the drainage protrusion extending into an outer surface of the drainage layer when the at least one fin is fitted to the filter element.

44. The filter element assembly as claimed in claim 43, in which the drainage layer describes an outer perimeter and in which, when the at least one fin is fitted to the filter element, the drainage protrusion extends inwardly so that an inner extent of the drainage protrusion is located within the outer perimeter described by the drainage layer.

45. The filter element assembly as claimed in claim 44, in which the drainage promoter comprises the plurality of fins, and each fin of the plurality of fins includes a drainage protrusion with an inner extent located within the outer perimeter described by the drainage layer, and in which the inner extents of the drainage protrusions of the plurality of fins intersect with a circle having a diameter which is smaller than an outer diameter described by the drainage layer.

46. The filter element assembly as claimed in claim 23, in which at least one fin of the plurality of fins comprises a drainage protrusion configured to extend into the discharge layer of the filter element when the at least one fin is fitted to the filter element, the drainage promoter comprising a lead-in surface provided at a free end of the at least one fin.

47. The filter element assembly as claimed in claim 23, in which the at least one fin of the plurality of fins comprises at least one drainage channel which extends at least part way along a length of the at least one fin.

48. The filter element assembly as claimed in claim 47, in which the at least one drainage channel is disposed on or in a surface of the at least one fin which faces towards the filter element when the at least one fin is fitted to the filter element.

49. The filter element assembly as claimed in claim 48, in which the at least one fin comprises a recess in its surface which forms the drainage channel.

50. The filter element assembly as claimed in claim 47, in which the at least one fin comprises a protrusion which extends inwardly towards the filter element when the at least one fin is fitted to the filter element, the protrusion having at least one flank extending in a direction along a length of the at least one fin, the drainage channel being defined at an intersection between the flank and an adjacent portion of the at least one fin.

51. The filter element assembly as claimed in claim 50, in which the protrusion comprises first and second flanks, and in which drainage channels are provided which are defined at intersections between each flank of the protrusion and adjacent portions of the at least one fin.

52. The filter element assembly as claimed in claim 47, in which the at least one fin comprises a flow diverter for deflecting liquid flowing under gravity along the at least one drainage channel and off the at least one fin.

53. The filter element assembly as claimed in claim 23, in which at least one fin of the plurality of fins comprises a surface which faces outwardly away from the filter element, when the at least one fin is fitted to the filter element, the surface being configured to cooperate with the filter housing so that the at least one fin is urged inwardly to compress the drainage layer or to enhance a compressive loading applied to the drainage layer by the at least one fin, when the at least one fin is fitted to the filter element.

54. The filter element assembly as claimed in claim 53, in which the at least one fin comprises at least one abutment portion which extends away from the outwardly facing surface of the at least one of fin, the abutment portion defining an outer abutment surface of the at least one fin.

55. The filter element assembly as claimed in claim 54, in which the abutment portion is a protrusion which defines the outer abutment surface of the at least one fin, the abutment portion extending at least part way along a length of the at least one fin.

56. The filter element assembly as claimed in claim 23, in which at least a portion of at least one fin of the plurality of fins is T-shaped, comprising an outer portion which defines a top of the T and an inner portion connected to the outer portion which defines a leg of the T.

57. The filter element assembly as claimed in claim 56, in which the inner portion of the at least one fin is disposed transverse to the outer portion and defines a protrusion which extends inwardly towards the filter element in use, a first drainage channel being defined at an intersection between a first flank of the inner portion and the outer portion, and a second drainage channel being defined at an intersection between a second flank of the inner portion and the outer portion.

58. The filter element assembly as claimed in claim 57, in which a part of the outer portion adjacent to one or both of the first and second flanks is recessed.

59. The filter element assembly as claimed in claim 23, in which at least a portion of at least one fin of the plurality of fins is W-shaped, comprising a centre portion, a first outer portion connected to a first side of the centre portion and defining a first drainage channel, and a second outer portion connected to a second side of the centre portion and defining a second drainage channel.

60. The filter element assembly as claimed in claim 59, in which the centre portion extends inwardly toward the filter element when the at least one fin is fitted to the filter element and is V-shaped, and in which the first and second outer portions extend outwardly from the filter element and are V-shaped.

61. The filter element assembly as claimed in claim 60, in which the centre portion defines a protrusion which extends inwardly towards the filter element, when the at least one fin is fitted to the filter element, and in which the first and second outer portions define respective first and second abutment portions.

62. The filter element assembly as claimed in claim 23, in which at least a portion of at least one fin of the plurality of fins is V-shaped, and in which the portion of the at least one fin extends outwardly from the filter element, when the at least one fin is fitted to the filter element, so that an apex of the V-shaped portion of the at least one fin faces outwardly from the filter element, a drainage channel being defined by an inner surface of the V-shaped portion of the at least one fin.

63. The filter element assembly as claimed in claim 62, in which flanks of said V-shaped portion of the at least one fin define protrusions which extend inwardly towards the filter element, and an apex of said V-shaped portion of the at least one fin defines an outer abutment portion.

64. A drainage promoter configured to be connected to a filter element, the drainage promoter comprising:
a plurality of fins each configured to be fitted to the filter element so that, in use, the plurality of fins extend at least part way along the filter element, to compress a drainage layer of the filter element along the lengths of the plurality of fins and promote drainage of liquid which has collected in the drainage layer; and
a support, the plurality of fins being coupled to the support via a hinge so that the plurality of fins are pivotable between a disengaged position, and an engaged position in which the plurality of fins are configured to engage the filter element, wherein the plurality of fins are extending, in use, in a direction along the filter element when the drainage promoter is connected to the filter element, the plurality of fins being at least partially resiliently deformable so that they can pass over an end cap of the filter element for fitting the plurality of fins to the filter element, and the plurality of fins comprising a latch feature for engaging the filter element.

65. A filter element for location in a housing of a filter, the filter element comprising:
a wall of a filtration medium which defines a hollow space, for a fluid stream to flow from the hollow space through the wall to be filtered, the filtration medium including a filtration layer, and a drainage layer located outside the filtration layer in which fluid separated from the fluid stream can collect;
first and second end caps at opposite ends of the wall, one of the end caps including a port for the fluid stream which communicates with the hollow space within the wall; and
at least one engaging feature on one of the end caps which is configured to cooperate with an engaging feature on a drainage promoter, to compress the drainage layer along its length to promote drainage of fluid which has collected in the drainage layer.

66. A filter element assembly, comprising:
a filter element for location in a housing of a filter, the filter element comprising a wall of a filtration medium which defines a hollow space, for a gas stream to flow from the hollow space through the wall to be filtered, the filtration medium including a filtration layer, and a drainage layer located outside the filtration layer in which liquid separated from the gas stream can collect, and first and second end caps at opposite ends of the wall, the first end cap including a port for the gas stream which communicates with the hollow space within the wall; and
a drainage promoter comprising at least one fin fitted to the filter element so that it extends at least part way along the filter element, and which the at least one fin compresses the drainage layer along its length to promote drainage of liquid which has collected in the drainage layer during use;
in which the drainage promoter further comprises a support, the at least one fin being coupled to the support via a hinge so that the at least one fin is pivotable between a disengaged position, and an engaged position in which the at least one fin is configured to engage the filter element, the at least one fin comprising a latch feature engaging the filter element.

67. The filter element assembly as claimed in claim 65, wherein the engaging feature on the drainage promoter is a fin.

68. The filter element assembly as claimed in claim 67, wherein the fin is configured to be pivotable between a disengaged position and an engaged position.

* * * * *